US012445698B2

(12) United States Patent
Sahasi et al.

(10) Patent No.: US 12,445,698 B2
(45) Date of Patent: Oct. 14, 2025

(54) METHODS, SYSTEMS, AND APPARATUSES FOR GENERATING PERSONALIZED CONTENT

(71) Applicant: ON24, Inc., San Francisco, CA (US)

(72) Inventors: Jayesh Sahasi, Los Altos, CA (US); Stephen Andrew Sims, Foster City, CA (US); Jaimini Labhashankar Joshi, Dublin, CA (US); Joshua Mark Hornik, Alamo, CA (US); Brian Quantz Streit, Denver, CO (US); Jairo Andres Diaz Rodriguez, Alliston (CA); Mario Andres Martinez Botero, Cartagena (CO)

(73) Assignee: ON24, Inc., San Francisco, CA (US)

( * ) Notice: Subject to any disclaimer, the term of this patent is extended or adjusted under 35 U.S.C. 154(b) by 30 days.

(21) Appl. No.: 18/493,455

(22) Filed: Oct. 24, 2023

(65) Prior Publication Data
US 2025/0133275 A1 Apr. 24, 2025

(51) Int. Cl.
H04N 21/854 (2011.01)
G11B 27/031 (2006.01)
H04N 21/442 (2011.01)

(52) U.S. Cl.
CPC ......... H04N 21/854 (2013.01); G11B 27/031 (2013.01); H04N 21/44222 (2013.01)

(58) Field of Classification Search
CPC .......... H04N 21/854; H04N 21/44222; G11B 27/031
See application file for complete search history.

(56) References Cited

U.S. PATENT DOCUMENTS

| 6,560,637 | B1 | 5/2003 | Dunlap et al. |
| 8,332,947 | B1 | 12/2012 | Bregman et al. |
| 9,219,790 | B1 | 12/2015 | Filev et al. |
| 9,336,268 | B1 | 5/2016 | Moudy |

(Continued)

FOREIGN PATENT DOCUMENTS

| JP | 2016167290 A | 9/2016 |
| KR | 10-1680507 B1 | 11/2016 |

(Continued)

OTHER PUBLICATIONS

International Search Report & Written Opinion for PCT/US24/049168, mailed on Jan. 10, 2025 (8 pages).

(Continued)

Primary Examiner — Mishawn N. Hunter
(74) Attorney, Agent, or Firm — Ballard Spahr LLP

(57) ABSTRACT

Methods, systems, and apparatuses for identifying key moments of a media asset are described herein. Key moments may be identified, for example, based on analyzing data associated with the media asset and user engagement data associated with the media asset. The data associated with the media asset may be provided to a machine learning model configured to determine one or more first segments of the media asset that satisfy a first threshold. The user engagement data may be analyzed to determine one or more second segments of the media asset that satisfy a second threshold. A compilation of segments of the media asset, representing the key moments thereof, may be generated based on the one or more first segments and the one or more second segments.

20 Claims, 22 Drawing Sheets

(56) References Cited

U.S. PATENT DOCUMENTS

| | | |
|---|---|---|
| 9,396,195 B1 | 7/2016 | Beguelin |
| 9,720,577 B1 | 8/2017 | Sahasi |
| 10,878,335 B1 | 12/2020 | Waugh |
| 10,909,604 B1 | 2/2021 | Zappella |
| 11,037,222 B1 | 6/2021 | Natesh et al. |
| 11,297,388 B2 | 4/2022 | Menendez |
| 11,809,969 B2 | 11/2023 | Sinn et al. |
| 11,836,181 B2 | 12/2023 | Saggi et al. |
| 11,962,857 B2 | 4/2024 | Sahasi et al. |
| 2003/0174160 A1 | 9/2003 | Deutscher et al. |
| 2005/0015719 A1 | 1/2005 | Marchon et al. |
| 2010/0138370 A1 | 6/2010 | Wu et al. |
| 2010/0250341 A1 | 9/2010 | Hauser |
| 2011/0069940 A1 | 3/2011 | Shimy et al. |
| 2011/0276921 A1 | 11/2011 | Long |
| 2012/0290508 A1 | 11/2012 | Bist |
| 2013/0080428 A1 | 3/2013 | Wang et al. |
| 2013/0159885 A1 | 6/2013 | Yerli |
| 2013/0167168 A1 | 6/2013 | Ellis et al. |
| 2013/0218806 A1 | 8/2013 | Daly |
| 2014/0129942 A1 | 5/2014 | Rathod |
| 2014/0244612 A1 | 8/2014 | Bhasin et al. |
| 2014/0278766 A1 | 9/2014 | Dudkiewicz et al. |
| 2015/0007065 A1 | 1/2015 | Krishnamoorthy et al. |
| 2015/0088684 A1 | 3/2015 | Nygaard et al. |
| 2015/0088955 A1 | 3/2015 | Hendrick et al. |
| 2015/0278351 A1 | 10/2015 | Messina et al. |
| 2015/0312709 A1 | 10/2015 | Azcona Dominici et al. |
| 2016/0036900 A1 | 2/2016 | Gallagher et al. |
| 2016/0167290 A1 | 6/2016 | Esser |
| 2016/0294907 A1 | 10/2016 | Conklin et al. |
| 2017/0250930 A1 | 8/2017 | Ben-Itzhak |
| 2017/0286534 A1 | 10/2017 | Arora et al. |
| 2017/0289629 A1 | 10/2017 | Zhou |
| 2017/0344665 A1 | 11/2017 | Bangalore et al. |
| 2018/0198748 A1 | 7/2018 | Bastide et al. |
| 2018/0246973 A1 | 8/2018 | Zhao et al. |
| 2018/0268318 A1 | 9/2018 | Matam et al. |
| 2018/0302302 A1 | 10/2018 | Doggett et al. |
| 2018/0341875 A1 | 11/2018 | Carr |
| 2018/0365580 A1 | 12/2018 | Musuvathi et al. |
| 2019/0012701 A1 | 1/2019 | Mannix et al. |
| 2019/0110096 A1 | 4/2019 | Shaw et al. |
| 2019/0179915 A1 | 6/2019 | Yoon et al. |
| 2019/0354552 A1 | 11/2019 | Maharajh et al. |
| 2020/0058039 A1 | 2/2020 | Russo et al. |
| 2020/0196012 A1 | 6/2020 | Rajagopal et al. |
| 2021/0304285 A1 | 9/2021 | Alahmady |
| 2021/0406325 A1* | 12/2021 | Sinn ............... G06F 18/24 |
| 2022/0114616 A1 | 4/2022 | Ingram et al. |
| 2022/0327402 A1* | 10/2022 | Tiwari ............... G06N 5/04 |
| 2022/0383196 A1 | 12/2022 | Porat et al. |
| 2023/0021689 A1 | 1/2023 | Luis |
| 2023/0099627 A1 | 3/2023 | Duckworth et al. |
| 2023/0188792 A1 | 6/2023 | Sahasi et al. |

FOREIGN PATENT DOCUMENTS

| | | |
|---|---|---|
| KR | 20190107614 A | 9/2019 |
| KR | 10-2336480 B1 | 12/2021 |
| KR | 10-2023-0001453 A | 1/2023 |
| WO | 2016196694 A1 | 12/2016 |

OTHER PUBLICATIONS

International Search Report and Written Opinion issued in application No. PCT/US22/52210 mailed Apr. 10, 2023.

International Search Report and Written Opinion issued in related application No. PCT/US2022/026400 mailed Aug. 8, 2022.

Extended European Search Report issued in related application No. EP22834249.9 dated Nov. 12, 2024.

Deldjoo, Y et al., "Movie genome: alleviating new item cold start in movie recommendation," User Modeling and User-Adapted Interaction, vol. 29, No. 2, 2019, pp. 291-343.

S. Wan, C. Paris and D. Georgakopoulos, "Social Media Data Aggregation and Mining for Internet-Scale Customer Relationship Management," 2015 IEEE International Conference on Information Reuse and Integration, San Francisco, CA, USA, 2015, pp. 39-48, doi: 10.1109/IRI.2015.17 (Year: 2015).

International Search Report and Written Opinion issued in related application No. PCT/US22/35792 mailed Oct. 18, 2022.

Extended European Search Report issued in related application No. EP22834252.3 mailed Mar. 19, 2025.

* cited by examiner

FIG. 13A
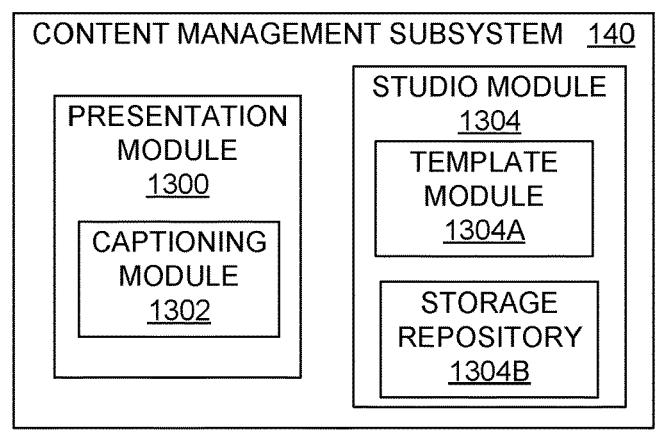
FIG. 13B
FIG. 13C
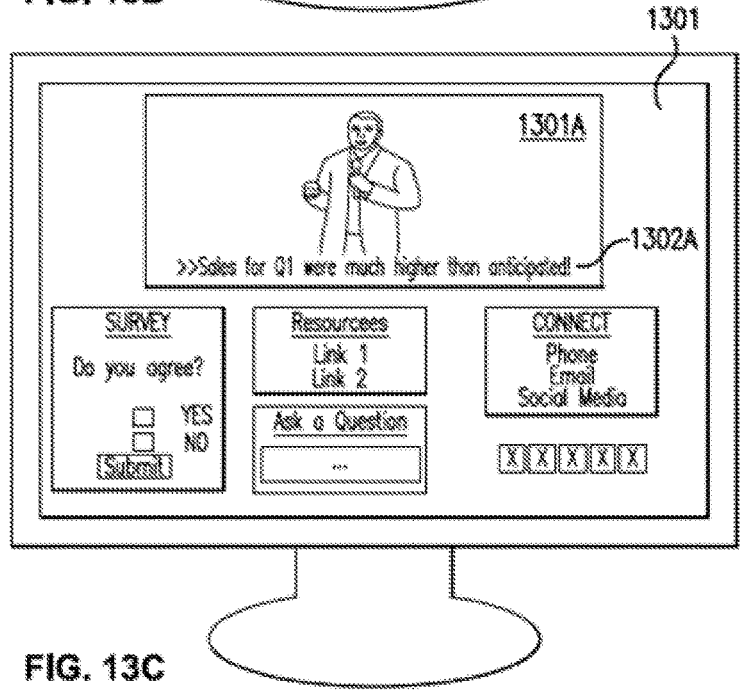

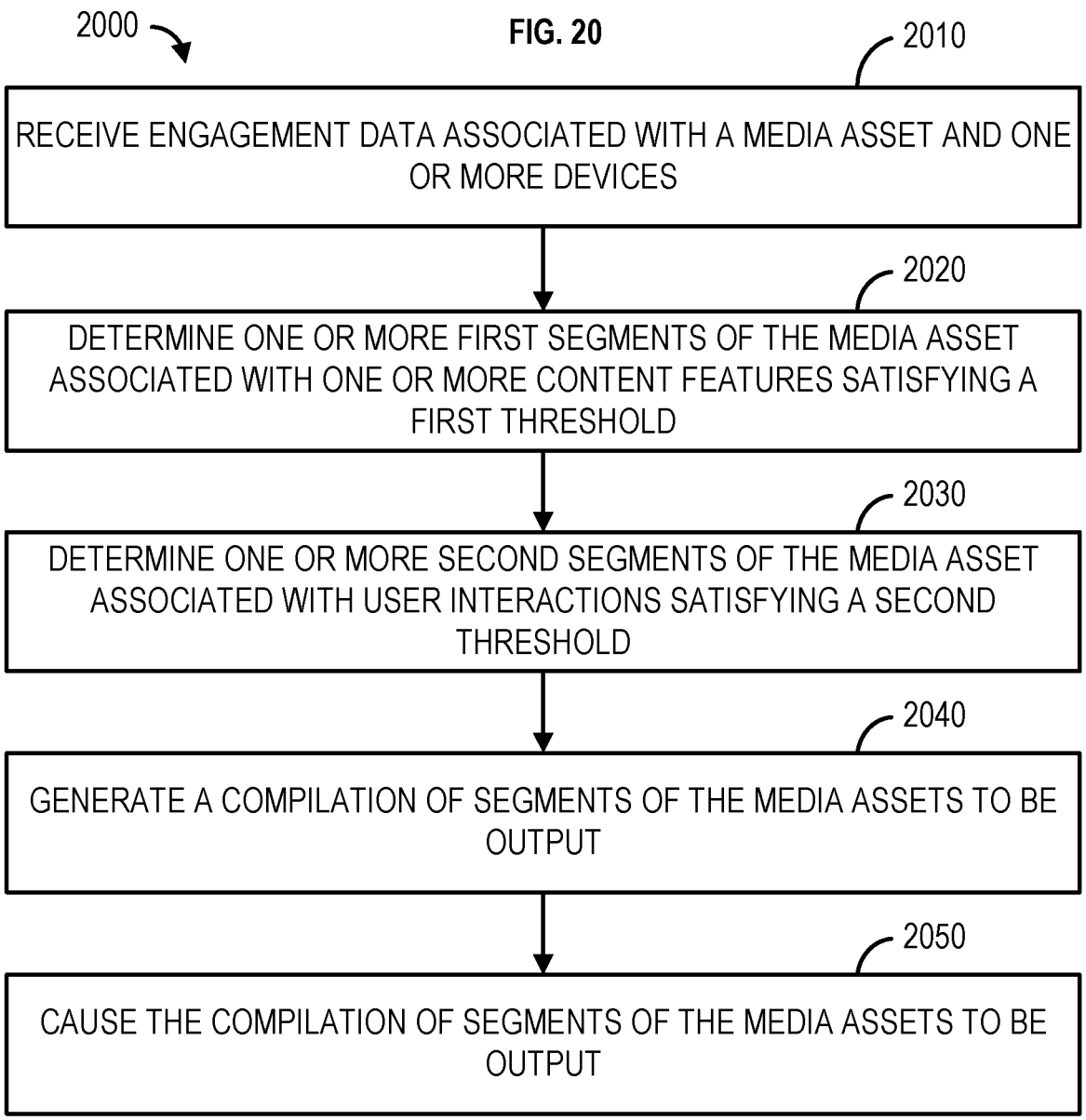

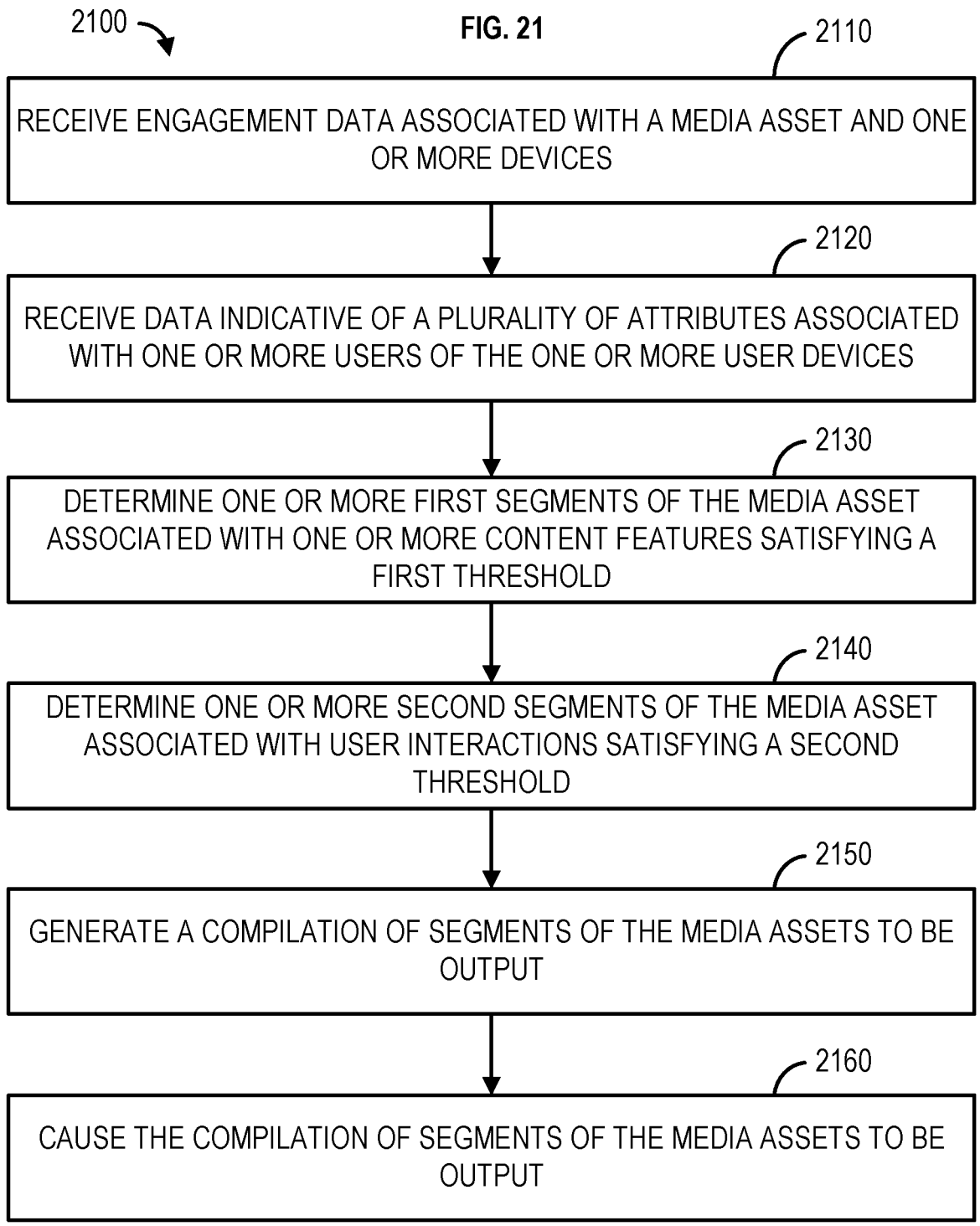

METHODS, SYSTEMS, AND APPARATUSES FOR GENERATING PERSONALIZED CONTENT

BACKGROUND

Content platforms may provide a variety of content for users, such as for example, videos, slideshows, reading material, audio presentations, webinars, etc. Such content may be associated with an in-person/live event that may be recorded and/or streamed. Conventional systems and methods used by existing content platforms to provide such content do not efficiently or adequately determine the most important portions of the content provided, such as those that may highly interest a viewer(s) of the recording and/or stream. These and other considerations are discussed herein.

SUMMARY

It is to be understood that both the following general description and the following detailed description are illustrative and explanatory only and are not restrictive. Methods, systems, and apparatuses for generating targeted content are described herein. A presentation platform may comprise a system of computing devices, servers, software, etc. that is configured to provide a plurality of media assets (e.g., content) at a plurality of user devices. Users of the plurality of user devices may engage with (e.g., interact with) the plurality of media assets via a client application, resulting in engagement data. The presentation platform may comprise an analytics subsystem that is configured to receive and analyze the engagement data.

In one example, the analytics subsystem may divide a media asset into one or more segments and generate a compilation of segments of the media asset based on one or more segments. The analytics subsystem may extract data (e.g., a content type, a content rating, content metadata, a date of creation, a content tag, content category, a transcript, a content filter, language, text data, a content description, speaker identification data, talk time data, sentiment data, engagement data, etc.) from the media asset. In addition, the analytics subsystem may determine engagement data associated with the media asset and one or more user devices. The analytics subsystem may determine one or more first segments of the media asset associated with content features that satisfy a first threshold. For example, the one or more first segments may be determined (e.g., selected for the compilation) via a machine learning model, which may receive the data extracted from the media asset and determine which segment(s) satisfy the first threshold. The analytics subsystem may determine one or more second segments of the media asset associated with user interactions satisfying a second threshold. For example, the one or more second segments may be determined (e.g., selected for the compilation) based on the engagement data for the one or more second segments indicating the respective user interactions satisfy the second threshold. The analytics subsystem may generate the compilation of segments based on the one or more first segments satisfying the first threshold and the one of more second segments satisfying the second threshold. The compilation of segments may be output, caused to be output, sent, stored, etc.

In a further example, the analytics subsystem may use the compilation of segments to generate directed content. For example, the analytics subsystem may generate the directed content based on a plurality of attributes (e.g., user demographics, interests, past content consumption, etc.), the compilation of segments, the data extracted from the media asset, etc. The plurality of attributes may be associated with one or more users of the one or more user devices (e.g., a user(s) who previously viewed the media asset). The directed content can include digital media of various types. The directed content may be output, caused to be output, sent, stored, etc.

Additional elements or advantages of this disclosure will be set forth in part in the description which follows, and in part will be apparent from the description, or may be learned by practice of the subject disclosure. The advantages of the subject disclosure can be attained by means of the elements and combinations particularly pointed out in the appended claims.

BRIEF DESCRIPTION OF THE DRAWINGS

The annexed drawings are an integral part of the disclosure and are incorporated into the subject specification. The drawings illustrate example embodiments of the disclosure and, in conjunction with the description and claims, explain at least in part various principles, elements, or aspects of the disclosure. Embodiments of the disclosure are described more fully below with reference to the annexed drawings. However, various elements of the disclosure can be implemented in many different forms and should not be construed as limited to the implementations set forth herein. Like numbers refer to like elements throughout.

FIG. 13A illustrates example components of a content management subsystem, in accordance with one or more embodiments of this disclosure.

FIG. 13B illustrates an example of a digital experience, in accordance with one or more embodiments of this disclosure.

FIG. 13C illustrates another example of a digital experience, in accordance with one or more embodiments of this disclosure.

FIG. 20 illustrates a flowchart for an example method, in accordance with one or more embodiments of this disclosure.

FIG. 21 illustrates a flowchart for an example method, in accordance with one or more embodiments of this disclosure.

DETAILED DESCRIPTION

Figure 1:
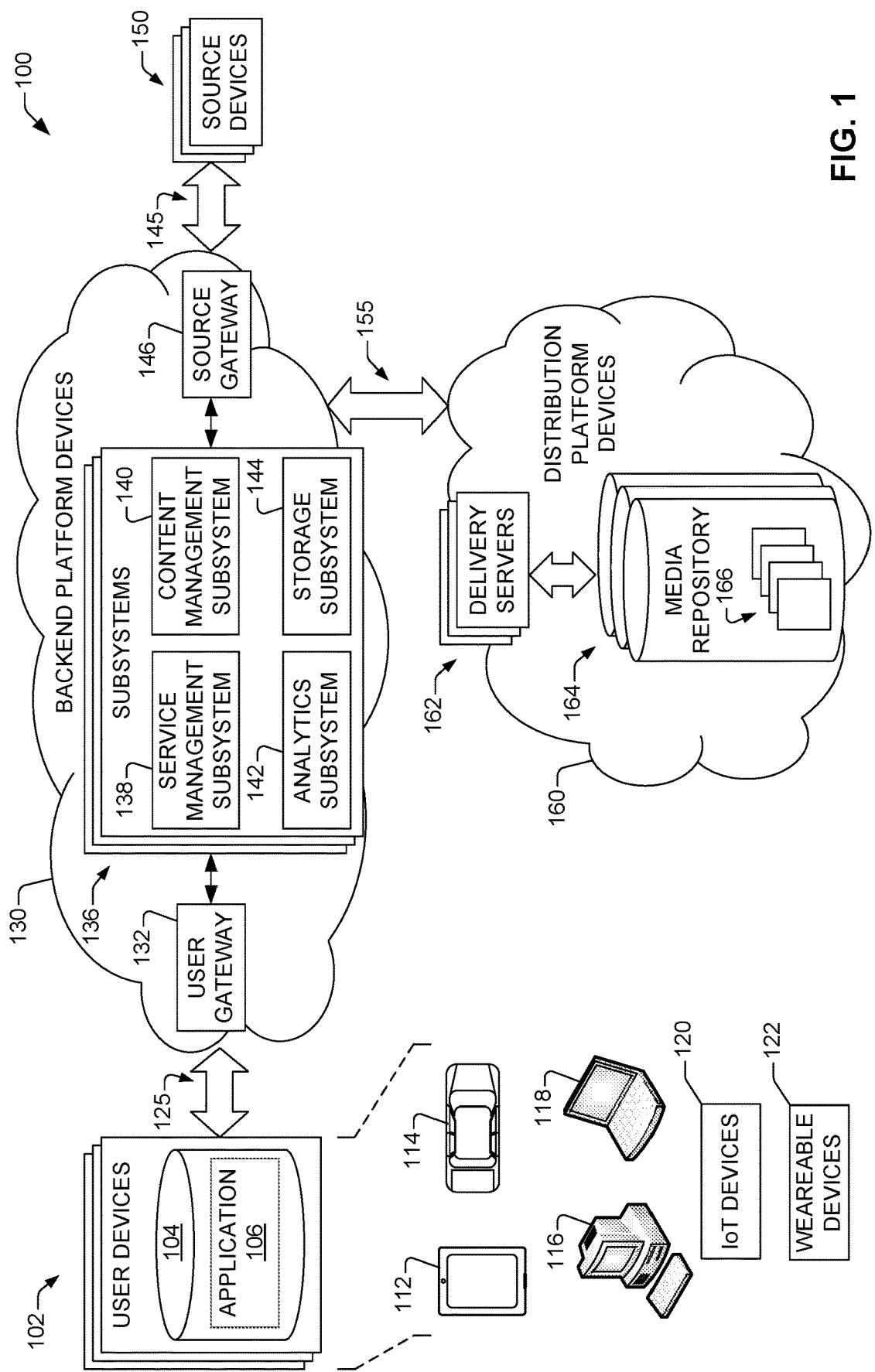
FIG. 1 illustrates an example of an operational environment that includes a presentation platform for presentation of digital content, in accordance with one or more embodiments of this disclosure.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, the methods and systems may take the form of a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Methods, systems, and apparatuses for generating personalized content are described herein. FIG. 1 illustrates an example of an presentation platform for presentation of digital content 100, in accordance with one or more embodiments of this disclosure. The presentation platform 100 can include backend platform devices 130 and, in some cases, distribution platform devices 160. In other cases, the distribution platform devices 160 can pertain to a third-party provider. Regardless of its type, the backend platform devices 130 and the distribution platform devices 160 can be functionally coupled by a network architecture 155. The network architecture 155 can include one or a combination of networks (wireless or wireline) that permit one-way and/or two-way communication of data and/or signaling. The digital content can include, for example, 2D content, 3D content, or 4D content or other types of immersive content. Besides digital content that is static and, thus, can be consumed in time-shifted fashion, digital content that can be created and consumed contemporaneously also is contemplated. In an example, the digital content may include one or more of a virtual event, webinar, a video, a document, and/or a webpage.

The digital content can be consumed by a user device of a group of user devices 102. The user device can consume the content as part of a presentation that is individual or as part of a presentation involving multiple parties. Regardless of its type, a presentation can take place within a session to consume content. Such a session can include, for example, a call session, videoconference, a downstream lecture (a seminar, a class, a tutorial, a webinar, or the like, for example).

The group of user devices 102 can include various types of user devices, each having a particular amount of computing resources (e.g., processing resources, memory resources, networking resources, and I/O elements) to consume digital content via a presentation. In some cases, the group of user devices 102 can be homogeneous, including devices of a particular type, such as high-end to medium-end mobile devices, IoT devices 120, or wearable devices 122. A mobile device can be embodied in, for example, a handheld portable device 112 (e.g., a smartphone, a tablet, or a gaming console); a non-handheld portable device 118 (e.g., a laptop); a tethered device 116 (such as a personal computer); or an automobile 114 having an in-car infotainment system (IVS) having wireless connectivity. A wearable device can be embodied in goggles (such as augmented-reality (AR) goggles) or a helmet mounted display device, for example. An IoT device can include an appliance having wireline connectivity and/or wireless connectivity. In other cases, the group of user device 102 can be heterogeneous, including devices of a various types, such as a combination of high-end to medium-end mobile devices, wearable devices, and IoT devices.

To consume digital content, a user device of the group of user devices 102 can execute a client application 106 retained in a memory device 104 that can be present in the user device. A processor (not depicted in FIG. 1) integrated into the user device can execute the application 106. The client application 106 can include a mobile application or a web browser, for example. Execution of the client application 106 can cause initiation of a presentation session. Accordingly, execution of the client application 106 can result in the exchange of data and/or signaling with a user gateway 132 included in the backend platform devices 130. The user device and the user gateways 132 can be functionally coupled by a network architecture 125 that can include one or a combination of networks (wireless or wireline) that permit one-way and/or two-way communication of data and/or signaling. Specifically, the user device can receive data defining the digital content. Such data can be embodied in one or multiple streams defining respective elements of the digital content. For instance, a first stream can define imaging data corresponding to video content, and a second stream can defined audio data corresponding to an audio channel of the digital content. In some cases, a third stream defining haptic data also can be received. The haptic data can dictate elements of 4D content or another type of immersive content.

Figure 6:
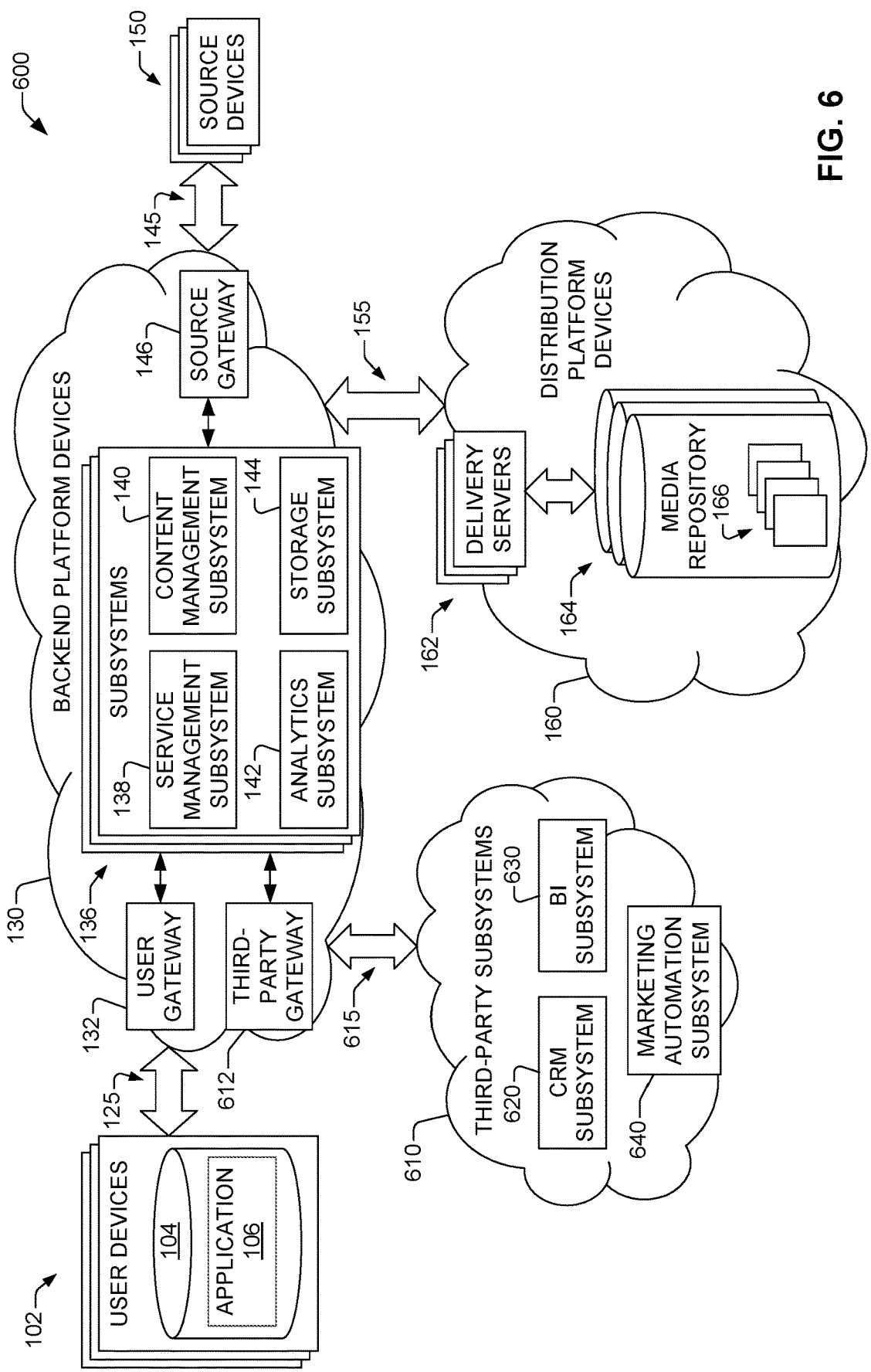
FIG. 6 illustrates an example of an operational environment that includes integration with third-party subsystems, in accordance with one or more embodiments of this disclosure.

The user gateway 132 can provide data defining the digital content by identifying a particular delivery server of multiple delivery servers 162 included in the distribution platform devices 160, and then supplying a request for content to that particular delivery server. That particular delivery server can be embodied in an edge server in cases in which the distributed platform devices 160 include a content delivery network (CDN). In some examples, the particular media server may be associated with a third-party provider. For example, the particular media server may be integrated with a third-party platform, such as the third-party subsystems 610, as shown in FIG. 6. In some configurations, the particular delivery server can have a local instance of digital content to be provided to a user device. The local instance of digital content can be obtained from one or several media repositories 164, where each one of the media repositories 164 contain media assets 166. Such assets can be static and can be consumed in time-shifted fashion. At least some of the media assets 166 can be specific to a media repository or can be replicated across two or more media repositories. The media assets 166 can include, for example, a video segment, a webcast, an RSS feed, or another type of digital content that can be streamed by the user gateway 132 and/or other devices of the backend platform devices 130. The media assets 166 are not limited to digital content that can be streamed. In some cases, at least some of the media assets 166 can include static and dynamic digital content, such as an image, a webpage, or a document (e.g., downloaded documents such as PDFs, office documents, etc.).

The particular delivery server can provide digital content to the user gateway 132 in response to the request for content. The user gateway 132 can then send the digital content to a user device. The user gateway 132 can send the digital content according to one of several communication protocols (e.g., IPv4 or IPv6, for example).

In some embodiments, the digital content that is available to a user device or set of multiple user devices (e.g., a virtual classroom or a recital) can be configured by content management subsystem 140. To that end, the content management subsystem 140 can identify corpora of digital content applicable to the user device(s). Execution of the client application 106 can result in access to a specific corpus of digital content based on attributes of the user and/or user device or a combination of the set of multiple devices. As an example, the attributes may be associated with a user of the user device. For example, the attributes may comprise one or more of an age, a gender, a location, a profile title, an interest, past content consumption, a professional affiliation, a professional experience, an educational background or experience, a professional certification or license, a BIC keyword, etc.

The subsystems 136 also include an analytics subsystem 142 that can generate intelligence and/or knowledge about content consumption behavior of a user and/or a user device (e.g., one of the user devices 102). The analytics subsystem 142 can retain the intelligence and/or knowledge in a storage subsystem 144. Both the intelligence and knowledge can be generated using historical data identifying one or more types of activities of the user interacting with the digital content via a device. The activities can be related to consumption of digital content. In some configurations, the client application 106 can send activity data during consumption of digital content. The activity data can identify an interaction or a combination of interactions of a user via the user device with the digital content. An example of an interaction is trick play (e.g., fast-forward or rewind) of the digital content. Another example of an interaction is reiterated playback of the digital content. Another example of an interaction is aborted playback, e.g., playback that is terminated before the endpoint of the digital content. In another example, the interaction can include a submission (or "share") of the digital content to a user account in a social media platform. In another example, the interaction can be associated with whether the digital content was obstructed or whether the digital content was out of focus. In another example, the interaction can include a quantity of times the digital content was output, a duration the digital content was output, a quantity of mute actions, a level of volume, and/or a duration of inactivity during the output of the digital content. Thus, the activity data can characterize engagement with the digital content.

The analytics subsystem 142 can then utilize the activity data to assess a degree of interest of the user on the digital content. To that end, in some embodiments, the analytics subsystem 142 can train a classification model to discern a degree of interest on digital content among multiple interest levels. The classification model can be trained using unsupervised training, for example, and multiple features determined using digital content and the activity data. By applying the trained classification model to new activity data in production (or prediction) mode, an interest attribute can be generated. The interest attribute represents one of the multiple interest levels and, thus, quantifies interest on the digital content, or one or more segments/portions of the digital content, on part of the user.

By evaluating interest of a user on different types of digital content, the analytics subsystem 142 can generate a user profile for the user. Such an evaluation can be implemented for multiple users and therefore multiple user profiles can be generated. A user profile can include a user or business interest cloud (UIC). The UIC can thus identify types of digital content—and/or features thereof—likely to be of interest to a user corresponding to a UIC likely to be consumed by a user via a user device. For example, a UIC may comprise a tag cloud that includes interest tags, which correspond to respective interests of a user. An interest of a user can be derived from user activity data. For example, the analytics subsystem 142 can receive activity data indicative of multiple engagements of a user device, associated with the user, with multiple media assets (e.g., digital content). For example, the multiple engagements may be associated with each segment/portion of one or more segments/portions of the media assets. The analytics subsystem 142 can receive the activity data via the client application 106 executing on the user device. Each one of the multiple media assets can include a plurality of content features, as is further described herein. The analytics subsystem 142 can generate a UIC associated with that particular user and/or user device. The UIC can include at least one content feature of the plurality of content features (e.g., representing content features associated with content with which the user has engaged). The UIC also can include, as is further described herein, at least one interest attribute representing a level of interest for each one of the media assets, and/or one or more portions of each one of the media asset, consumed by the user/user device. As is further described herein, the UIC can be used by a machine learning model to identify one or more of the media assets 166 that are likely to be of interest to a user corresponding to the UIC.

Figure 2:
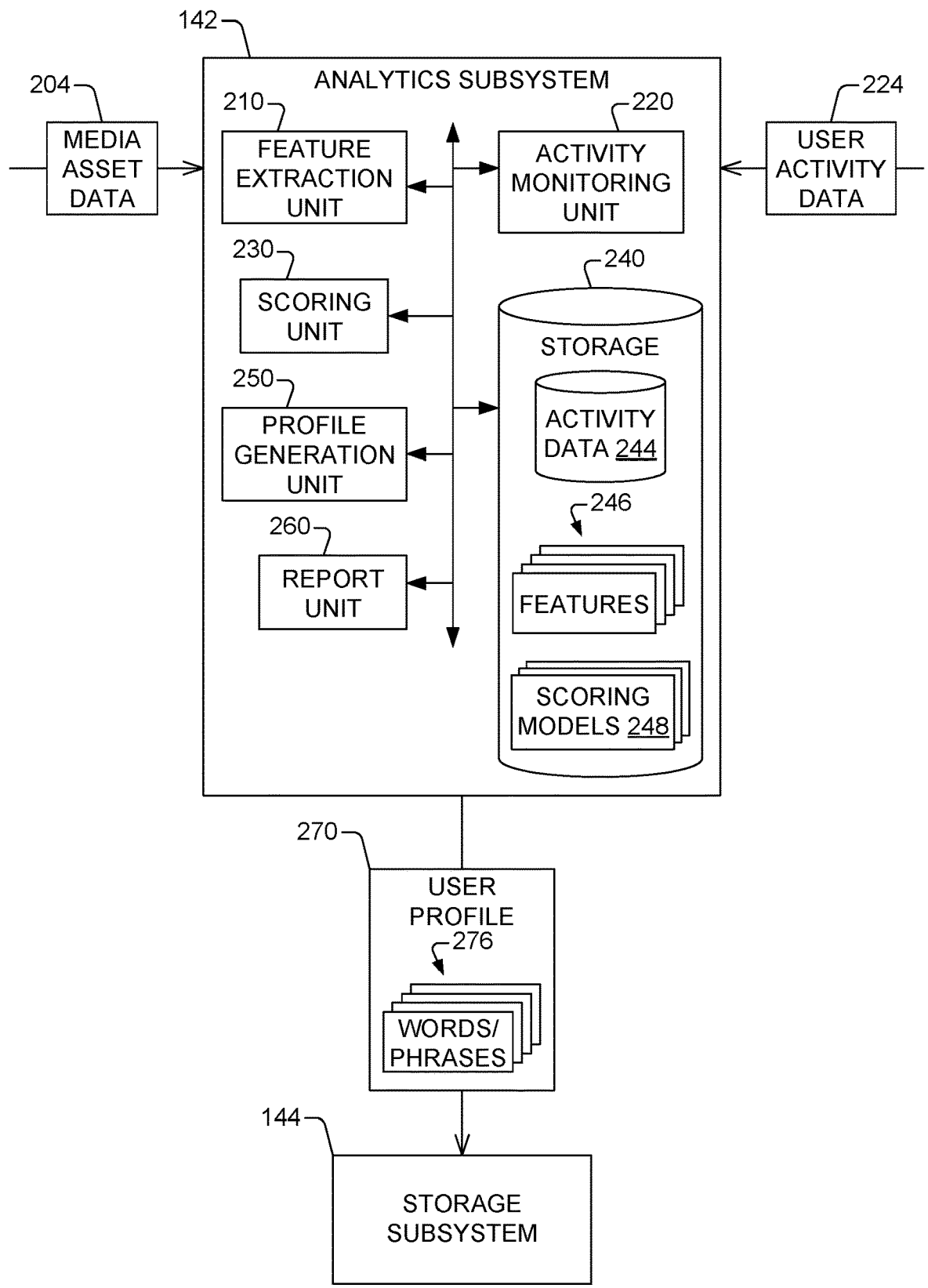
FIG. 2 illustrates an example of an analytics subsystem included in a presentation platform for presentation of digital content, in accordance with one or more embodiments of this disclosure.

As shown in FIG. 2, the analytics subsystem 142 can include multiple units that permit generating a user profile. The analytics subsystem 142 can include a feature extraction unit 210 that can receive media asset data 204 defining a media asset of the media assets 166 (FIG. 1). As mentioned, the media asset can be a virtual event, webinar, video and/or audio content, a document, a webpage, a promotional webpage, a combination thereof, and/or the like. The feature extraction unit 210 can then determine one or several content features for the media asset. Examples of content features that can be determined for the media asset include content type (video, webinar, PDF, web page, etc.), content rating; author information (e.g., academic biography of a lecturer); date of creation; content tag; content category; content filter; language of the content; text of the content; speaker identification; and content description (summary, takeaway, bullet point list, a combination thereof, and/or the like).

As an example, the content description can include an abstract or a summary, such as a promotional summary, a social media summary, and an on-demand summary. The feature extraction unit 210 can determine the content feature(s) for the media asset prior to consumption of the media asset. In this way, the determination of a user profile can be more efficient. The feature extraction unit 210 can retain data indicative of the determined content feature(s) in storage 240, within memory elements 246 (represented features 246).

In addition, the analytics subsystem 142 can include an activity monitoring unit 220 that can receive user activity data 224 for a user and/or user device (e.g., via data associated with a user profile for the user and/or associated with the user device). As mentioned, the client application 106 (FIG. 1) includes in the user device can send the user activity data 224. The user activity data 224 can identify an interaction or a combination of interactions of the user and/or the user device with the media asset, and/or one or more portions of the media asset. Again, an interaction can include one of trick play, reiterated playback, aborted play, social media share, or similar associated with the media asset and/or one or more portions of the media asset. In another example, an interaction can include a quantity of times the media asset was output, a duration the media asset was output, a quantity of mute actions, a level of volume, and/or a duration of inactivity during the output of the media asset. The activity monitoring unit 220 can then generate one or several engagement features using the user activity data 224. In some configurations, an engagement feature can quantify the engagement of the user and/or the user device with the media asset or specific portions of the media asset. For instance, the engagement feature can be a numerical weight ascribed to a particular type of user activity data 224. For example, a reaction (e.g., thumbs up/down, comments, chat messages, etc.) to the media asset can be ascribed a first numerical weight and social media share can be ascribed a second numerical weight, where the first numerical weight is less than the second numerical weight. Other numerical weights can be ascribed to a quantity of times a media asset was output or a duration of output of the media asset. In an example, the quantity of times the media asset was output and the duration of output of the media asset can determine the magnitude of respective numerical weights. The feature extraction unit 210 can retain data indicative of the determined engagement feature(s) in the storage 240, within the features 244.

The analytics subsystem 142 also can include a scoring unit 230 that can determine an interest level for the media asset, and/or one or more portions of the media asset, corresponding to the determined content feature(s) and engagement feature(s). To that end, the scoring unit 230 can apply a defined scoring model of the scoring models 248 to those features, where the defined scoring model can be a trained classification model that resolves a multi-class classification task. Specifically, in some embodiments, the scoring unit 230 can generate a feature vector including determined content feature(s) and engagement feature(s) for the media asset, and/or one or more portions of the media asset. The number and arrangement of items in such a feature vector is the same as those of features vectors used during training of the defined scoring model of the scoring models 248. The scoring unit 230 can then apply the defined scoring model to the feature vector to generate an interest attribute representing a level of interest on the media asset, and/or one or more portions of the media asset. The interest attribute can be a numerical value (e.g., an integer number) or textual label that indicates the level of interest (e.g., "high," "moderate," "low").

A profile generation unit 250 can determine, in some instances, that interest attribute for a segment or portion of a media asset meets or exceeds a defined level of interest. In those instances, the profile generation unit 250 can select words or phrases, or both, from content features determined for the segment or portion of the media asset. Simply for purposes of illustrations, the profile generation unit 250 can select one or more categories of the media asset, and/or the segment or portion of the media asset, and a title of the media asset as is defined within a description of the media asset. A selected word or phrase represents an interest of the user on the media asset. The profile generation unit 250 can then generate a user profile 270 that includes multiple entries 276, each one corresponding to a selected word or phrase. The profile generation unit 250 can then retain the user profile 270 in the storage subsystem 144.

Figure 3A:
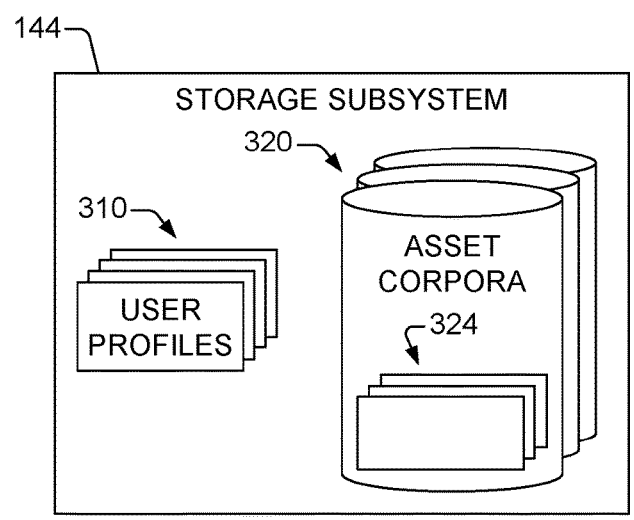
FIG. 3A illustrates an example of a storage subsystem included in a presentation platform for presentation of digital content, in accordance with one or more embodiments of this disclosure.

By receiving user activity data 224 from different users and/or user devices, the analytics subsystem 142 can generate respective user profiles for those users and/or user devices. Thus, as is illustrated in FIG. 3A, the storage subsystem 144 can include user profiles 310. In addition, or in some embodiments, the content management subsystem 140 (FIG. 1) can then configure digital content that is of interest to the user. As a result, a particular group of the media assets 166 can be made available to a particular user and/or a particular user device. Such a group defines a corpus of digital content. In some embodiments, the content management subsystem 140 also can determine digital content that is similar to other digital content that is present in a corpus digital content for a user. The content management subsystem 140 can generate a recommendation for the similar content and can then send the recommendation to a user and/or a user device of the user.

In some embodiments, a user profile and/or a corpus of digital content associated with a user and/or a user device also can constitute a UIC for the user. In addition, or in other embodiments, the content management subsystem 140 can configure one or more functions to interact with digital content. Those function(s) can include, for example, one or a combination of translation functionality (automated or otherwise), social-media distribution, formatting functionality, or the like. The content management subsystem 140 can include at least one of the function(s) in the business interest cloud.

The content management subsystem 140 can retain data defining a UIC within the storage subsystem 144. Accordingly, the storage subsystem 144 can include asset corpora 320 (FIG. 3) that retains a corpora of media assets 324 for respective user profiles 310. Multiple memory devices can constitute the asset corpora 320. Those memory devices can be distributed geographically, in some embodiments. One or many database management servers (not depicted in FIG. 3A) can manage the asset corpora 320. The database management server(s) can be included in the content management subsystem 140 (FIG. 1).

A user profile may be referred to as an interest cumulus and, as mentioned, the user profile can constitute a UIC. Thus, at least a subset of the user profiles 310 can correspond to respective ones of the interest cumuli. In other words, a first user profile of the user profiles 320 can be logically associated with a first interest cumulus of the interest cumuli, a second user profile can be logically associated with a second interest cumulus of the interest cumuli, and so forth. A logical association can be provided by a unique identifier (ID) for an interest cumulus corresponding to a user profile. The unique ID can be retained in the user profile.

As is described herein, each UIC may be derived from user activity data 224 indicative of a plurality of engagements of a user and/or a user device with a plurality of media assets (e.g., digital content), and/or one or more portions of the plurality of media assets. The analytics subsystem 142 may receive the activity data via the client application 106 executing on the user device. The analytics subsystem 142 may generate a UIC associated with that particular user and/or user device. The UIC may include at least one content feature of a plurality of content features (e.g., representing content features associated with content with which the user has engaged). The UIC may also include, as further described herein, at least one interest attribute representing a level of interest for each of the media assets, and/or for one or more portions of each media asset, consumed by the user/user device. Each of the plurality of media assets 166 may comprise a plurality of content features including, but not limited to, at least one of: content format/type (e.g., video, audio, webcast, webinar, PDF, webpage, etc.); content rating (e.g., an audience/aggregated review score, such as 4/5 stars, 88%, etc.); demographic information associated with presenters; date of creation/upload/availability; engagement score of other users (e.g., as described herein with reference to FIG. 5); metadata (e.g., tags, categories, filters, etc.); description/abstract/summary; language(s) spoken/shown; functionality feature(s), as further described herein; a combination thereof, and/or the like.

Figure 3B:
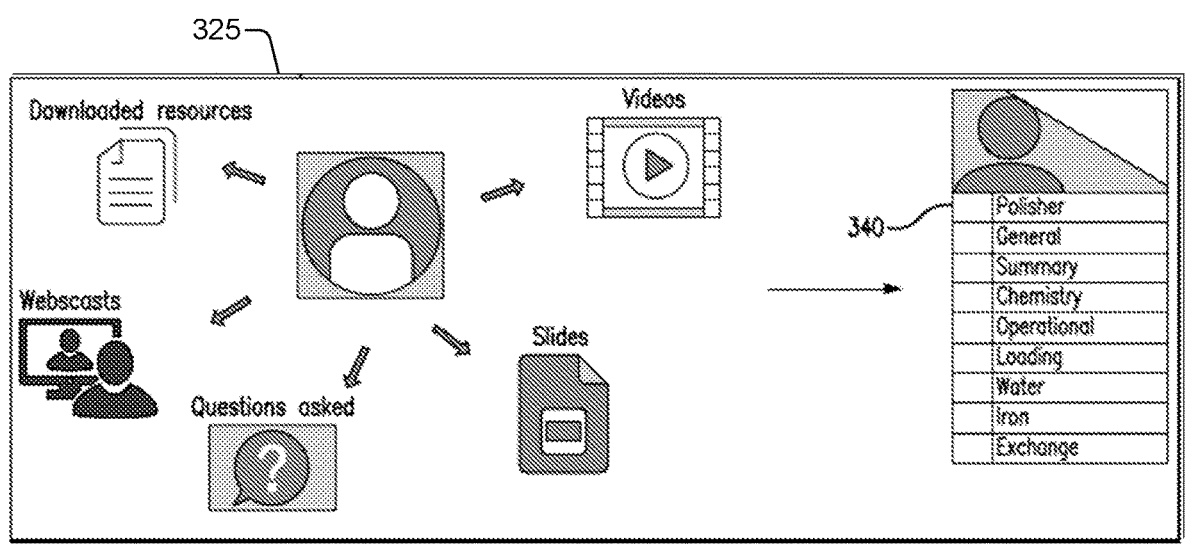
FIG. 3B illustrates an example visual representation of a user interest cloud, in accordance with one or more embodiments of this disclosure.

FIG. 3B shows an example visual representation 325 of how a UIC is determined (e.g., generated, curated, etc.). As shown in the visual representation 325, the UIC may be based on, for example, the user activity data 224 indicative of the plurality of engagements with one or more of the plurality of media assets, and/or one or more portions of the plurality of media asset. The media assets may include, as an example only, downloaded resources (e.g., media assets and related content); videos; audio; webcasts/webinars; questions asked (e.g., via the client application 106); documents;

and slides. As further described herein, a user profile, which may comprise the UIC, may include multiple entries 276 of words and/or phrases. An example of words and/or phrases that may be included in the multiple entries 276 is shown in the right-hand side of the visual representation 325 of the UIC. These words and/or phrases may represent interests of the corresponding user that are derived as described herein based on the user activity data 224.

Returning to FIG. 1, multiple source devices 150 can create digital content for presentation at a user device (e.g., one of the user devices 102). At least a subset of the source devices 150 can constitute a source platform. Such digital content can include, for example, static assets that can be retained in a media repository, as part of the media assets 166. The source device can provide the created digital content to a source gateway 146. The source device can be coupled to the source gateway by a network architecture 145. The network architecture 145 can include one or a combination of networks (wireless or wireline) that permit one-way and/or two-way communication of data and/or signaling. The source gateway 140 can send the digital content to the content management subsystem 140 for provisioning of the digital content in one or several of the media repositories 164.

In addition, or in some cases, a source device can configure the manner of creating digital content contemporaneously by means of the client application 106 and other components available to a user device. That is, the source device can build the client application 106 to have specific functionality for generation of digital content. The source device can then supply an executable version of the client device to a user device. Digital content created contemporaneously can be retained in the storage subsystem 144, for example.

The subsystems 136 also can include a service management subsystem 138 than can provide several administrative functionalities. For instance, the service management subsystem 138 can provide onboarding for new service providers. The service management subsystem 138 also can provide billing functionality for extant service providers. Further, the service management subsystem can host an executable version of the client application 106 for provision to a user device. In other words, the service management subsystem 136 can permit downloading the executable version of the client application 106.

With further reference to FIG. 2, the analytics subsystem 142 can retain user activity data 224 over time in an activity data repository 244 (referred to as activity data 244). The time during which the user activity data 224 can be retained can vary, ranging from a few days to several years.

The analytics subsystem 142 can include a report unit 260 that can generate various views of the activity data 244 and can operate on at least a subset of the activity data 244. The report unit 260 also can cause a user device to present a data view and/or one or several results from respective operations on the activity data 244. To that end, the user device can include the application 106 and the report unit 260 can receive from the application 106 a request message to provide the data view or the result(s), or both. Further, in response to the request message, the report unit 260 generate the data view and the result(s) and can then cause the application 106 to direct the user device to present a user interface conveying the data view or the result(s). The UI can be presented in a display device integrated into, or functionally coupled to, the user device. The user device can be one of the user devices 102 (FIG. 1).

The request message can be formatted according to one of several communication protocols (e.g., HTTP) and can control the number and type of data views and results to be presented in the user device. The request message can thus include payload data identifying a data view and/or a result being requested. In some cases, the request message can be general, where the payload data identify data view(s) and result(s) defined by the analytics subsystem. For instance, the payload data can be a string, such as "report_all" or "dashboard," or another alphanumeric code that conveys that a preset reporting option is being requested. In other cases, the request message can be customized, where the payload data can include one or more first codes identifying respective data views and/or one or more second codes identifying a particular operation on available activity data 244.

Figure 4:
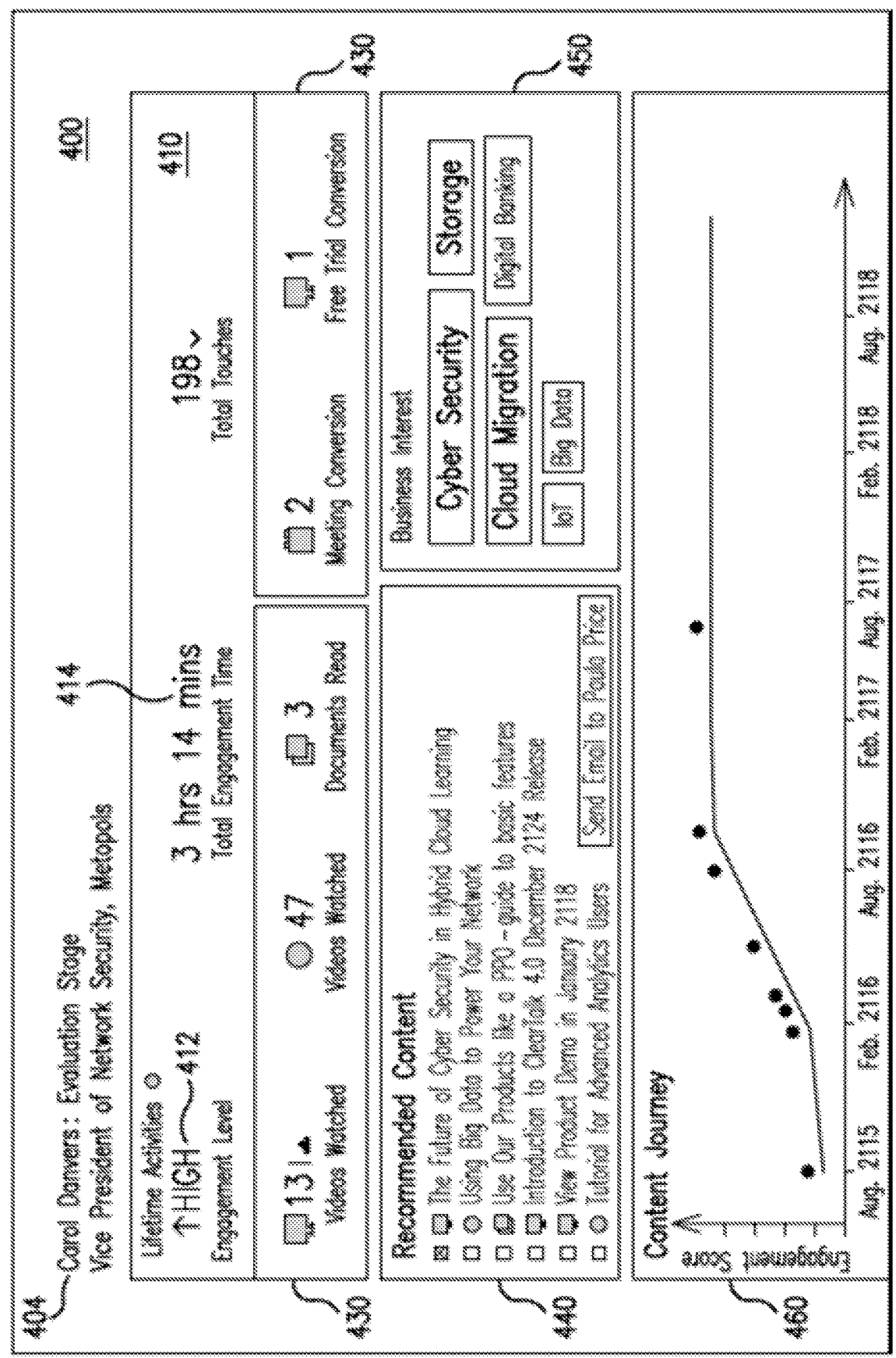
FIG. 4 illustrates an example of a user interface (UI) that presents various types of engagement data for a user device, in accordance with one or more embodiments of this disclosure.

FIG. 4 illustrates an example of a UI 400 that presents various types of engagement data that can be obtained from the activity data 244 for a particular end-user, in accordance with one or more embodiments of this disclosure. The UI 400 can be referred to as engagement dashboard. The data conveyed in the UI 400 can be obtained in response to a request message including the "dashboard" code or a similar payload data. As is illustrated in FIG. 4, the UI 400 includes indicia 404 identifying an end-user and various panes, each presenting a particular data view or an aggregated result. Specifically, the UI 400 includes a first pane 410 that presents engagement level 412 and engagement time 414. The UI 400 also includes a second pane 420 that presents engagement activity and a third pane 430 that presents buying activity. In addition.

UI 400 includes a fourth pane 440 that presents a menu of content recommendations and a fifth pane 450 that presents at least some of the words/phrases 276 (FIG. 2) pertaining to the end-user. The words and phrases that are presented can be formatted in a way that pictorially ranks the interests of the end-user—e.g., greater font size represents greater interest. Further, the UI 400 also includes a sixth pane 460 that presents an amount of content consumed as a function of time. Such temporal dependence of content consumption can be referred to as "content journey." By making available the types of engagement data illustrated in the UI 400, a source device can access valuable and actionable insights to optimize a digital experience (or media asset).

The analytics subsystem 142 (FIG. 2) also can contain other scoring models besides the scoring model that can be applied to generate interest level on particular content. By using those other scoring models, the analytics subsystem 142 can generate information identifying features of a digital experience (or media asset) that cause satisfactory engagement (e.g., most engagement, second most engagement, or similar) with a user. Accordingly, the analytics subsystem 142 can predict how best to personalize digital experiences (or media assets) for particular customers based on their prior behavior and interactions with media assets supplied by the distribution platform devices 160 (FIG. 1). Accordingly, a source device can access valuable and actionable insights to optimize a digital experience.

More specifically, in some embodiments, the scoring unit 230 (FIG. 2) can apply a defined scoring model to user activity data 224 to evaluate a set of functionality features present in several media assets. Evaluating a functionality feature f includes generating a score S for f. Thus, for a set of multiple functionality features $\{f_0, f_1, f_2 \ldots, f_{N-1}\}$, with N a natural number greater than unity, application of defined scoring model can result in a set of respective scores $\{S_0, S_1, S_2, \ldots, S_{N-1}\}$. The defined scoring model can be one of the scoring models 248 and can be trained using historical user activity data for many users and media assets.

Simply for purposes of illustration, the functionality features can include (i) real-time translation, (ii) real-time transcription (e.g., captioning) in same language; (iii) real-time transcription in a different language; (iv) access to documents (scientific publications, scientific preprints, or whitepapers, for example) mentioned in a presentation; (v) detection of haptic capable device and provisioning of 4D experience during presentation; (vi) "share" function to custom set of recipients within or outside a social network; (vii) access to recommended content, such as copies of or links to similar presentations and/or links to curated content (e.g., "because you watched "Content A" you might enjoy "Content B"); (viii) messaging with links to cited, recommended, or curated content; (ix) scheduler function that prompts to add, adds, or sends invites for, live presentations of interest that occur during times that end-user is free; automatically populates a portion of the calendar with those presentations, amount of calendar that can be populated is determined by end-user; or similar functions. Access to a document can include provision of a copy of the document or provision of a link to the document. Similarly, access to content can include provision of a copy of the content or provision of a link to the content.

Figure 5:
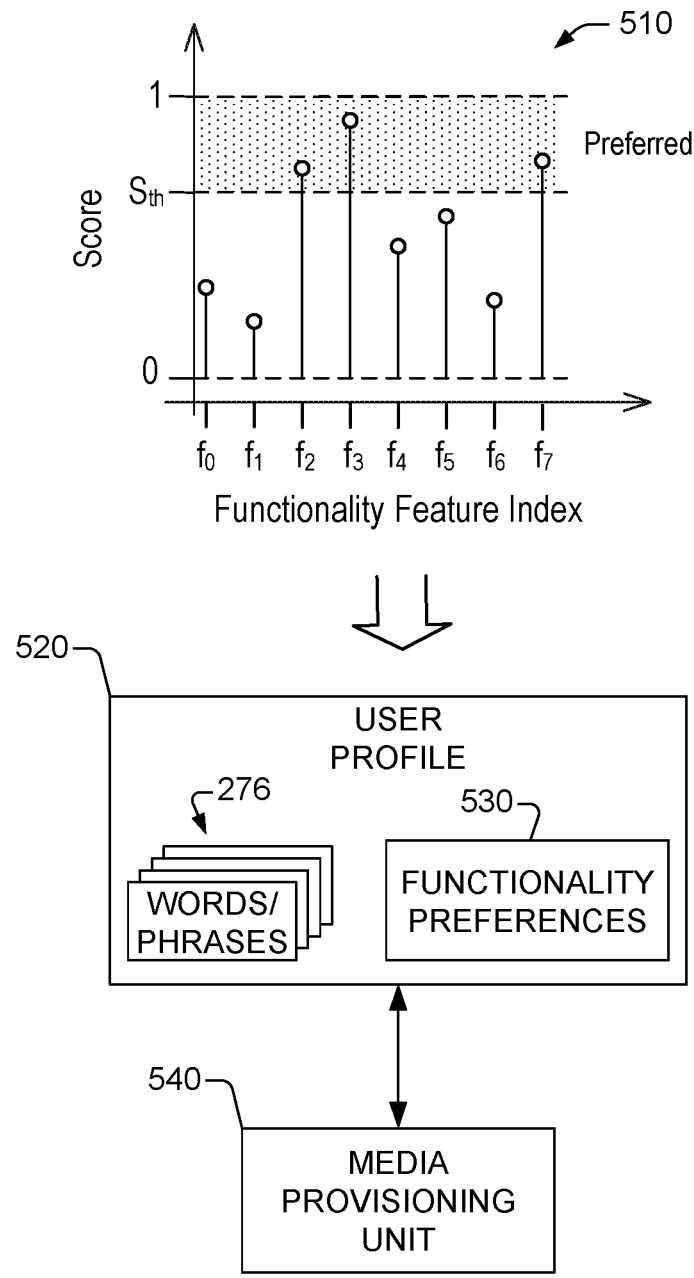
FIG. 5 schematically depicts engagement scores for example functionality features available per digital experience (or media asset), for a particular end-user, in accordance with one or more embodiments of this disclosure.

Diagram 510 in FIG. 5 schematically depicts engagement scores for an example case in which N=8 functionality features are available per digital experience (or media asset), for a particular end-user. Each of the features $f_0$, $f_1$, $f_2$, $f_3$, $f_4$, $f_5$, $f_6$, and $f_7$ have respective scores. Some of the scores are less than a threshold score $S_{th}$ and other scores are greater than $S_{th}$. The threshold score is a configurable parameter that the profile generation unit 250 (FIG. 2) can apply to determine if a functionality feature is preferred by the particular end-user. As is depicted with a dotted area in FIG. 5, a functionality feature f is preferred if the corresponding engagement score S is greater than or equal to $S_{th}$. The score structure for that set of functionality features can differ from end-user to end-user, thus revealing which functionality features are preferred for the end-user. The profile generation unit 250 can determine that respective engagement scores for one or several functionality features are greater than $S_{th}$. In response, the profile generation unit 250 can update a user profile 520 with preference data identifying the functionality feature(s). Thus, the user profile 520 can include words/phrases 276 and functionality preference 530 including that preference data.

In the example depicted in FIG. 5, functionality features $f_2$, $f_3$ and $f_7$ have engagement scores greater than $S_{th}$. Thus, the profile generation unit 250 (FIG. 2) can determine that those features are preferred by the particular end-user. In one example, $f_2$ can be real-time translation, $f_3$ can be real-time transcription in a different language from the language of a presentation, and $f_1$ can be access to documents. The profile generation unit 250 can determine that respective engagement scores for those features are greater than $S_{th}$, and can then update a user profile 520 with preference data identifying features functionality features $f_2$, $f_3$ and $f_7$. As such, the user profile 520 can include words/phrases 276 and functionality preference 530 including that preference data.

The content management subsystem 140 can personalize the digital experiences for an end-user by including the functionality features 530 defined in the user profile 520 pertaining to the end-user. In some embodiments, the content management subsystem 140 can include a media provisioning unit 540 that access the functionality preferences 530 and can then generate a UI that is personalized according to the functionality preferences 530. That personalized UI can include the functionality features identified in the functionality preferences 530.

In addition, or in other embodiments, the media provisioning unit 540 also can generate a layout of content areas that is personalized to end-user. The personalized layout can include a particular arrangement of one or several UI elements for respective preferred functionalities of the end-user. Further, or in other embodiments, the media provisioning unit 540 can generate a presentation ticker (such as a carousel containing indicia) identifying live-action presentations near a location of a user device presenting the personalized UI. In addition, or in some cases, the presentation ticker also can include indicia identifying digital experiences (or media assets) that occur during times shown as available in a calendar application of the end-user.

It is noted that the analytics subsystem 142 is not limited to scoring models. Indeed, the analytics subsystem 142 can include and utilize other machine-learning (ML) models to provide various types of predictive functionalities. Examples of those functionalities include predictive engagement levels for users; Q&A autonomous modules to answer routine support questions; and platform audience and presenter load predictions. For example, a machine learning model may be configured to determine a prediction that one or more segments/portions of a media asset are of interest to a particular user or not of interest to a particular user. In an example, the one or more segments/portions of the media asset determined by the machine learning model may be assigned a first weight and segments/portions of the media asset determined based on engagement data may be assigned a second weight. The first and second weights may be compared to each other in order to further refine the determination of the one or more segments/portions of the media asset that may be of interest to the particular user. The service management subsystem 138 (FIG. 1) can use load predictions to identify and configure operational resources and provide oversight. The operational resources include computing resources, such as processing units, storage units, and cloud services, for example.

The presentation platform described in this disclosure can be integrated with a third-party platform. FIG. 6 illustrates an example of an operational environment 600 that includes a presentation platform integrated with third-party subsystems, in accordance with one or more embodiments of this disclosure. Integration of the presentation platform can be accomplished by functional coupling with third-party subsystems 610 via a third-party gateway 612 and a network architecture 615. The network architecture 615 can include one or a combination of networks (wireless or wireline) that permit one-way and/or two-way communication of data and/or signaling.

The third-party subsystem 610 can include various type of subsystems that permit first-person insights generated by the analytics subsystem 142 to be extracted and leveraged across business systems of a source platform. As is illustrated in FIG. 6, the third-party subsystems 610 can include a Customer Relationship Management (CRM) subsystem 620, a business intelligence (BI) subsystem 630, and a marketing automation subsystem 640. Each third-party subsystem 610 may be referred to herein as a "client system" or simply as a "client". The presentation platform described herein may access, control, etc., each of the third-party subsystems 610.

Figure 7A:
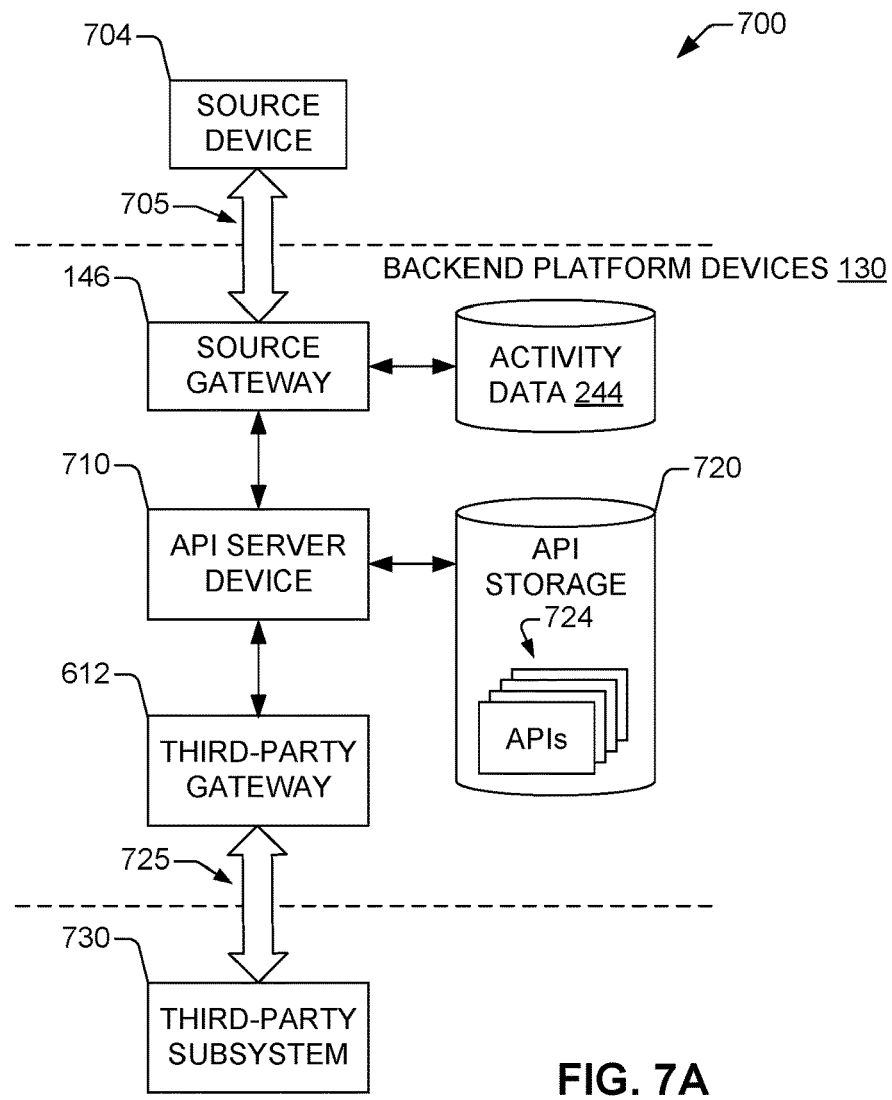
FIG. 7A illustrates another example of an operational environment for integration with a third-party subsystem, in accordance with one or more embodiments of this disclosure.

As is illustrated in FIG. 7, a source device 704 can access an API server device 710 within the backend platform device 130 (FIG. 1 or FIG. 4) by means of the source gateway 146. The API server device 710 can expose multiple application programming interfaces (APIs) 724 retained in API storage 720. One or many of the APIs 724 can be exposed to the source device 704 in order to access a third-party subsystem 730 and functionality provided by such subsystem. The exposed API(s) can permit executing respective sets of function calls. That is, a first exposed API can permit accessing a first group of function calls for defined functionality, and a second exposed API can permit accessing a second group of function calls for defined second functionality. The function calls can operate on data that is contained in the soured device 704 and/or a storage system functionally coupled to the source device 704. The function calls also can operate on activity data 244, with result(s) being pushed to the source device 704.

Data and/or signaling associated with execution of such function calls can be exchanged between the API server device 710 and the third-party subsystem 730 via a third-party gateway 612. In addition, other data and/or signaling can be exchanged between the API server device 710 and the source device 704 via the source gateway 146.

In some cases, the API server device 710 also can expose one or many of the APIs 724 to the third-party subsystem 730. In that way, the third-party subsystem 730 (or, in some cases, a third-party device, such as a developer device) can create applications that utilize some of the functionality of the backend platform devices 130.

Figure 7B:
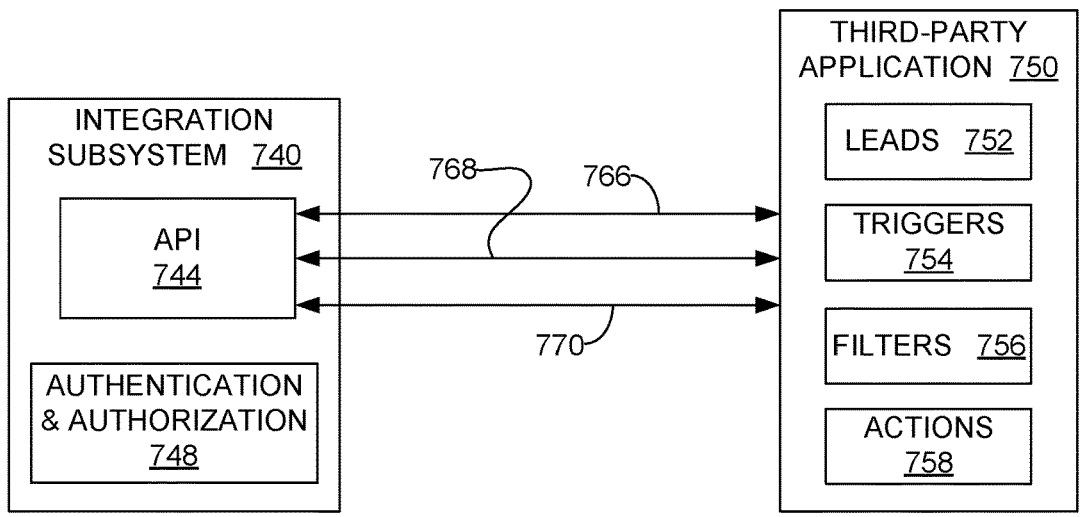
FIG. 7B illustrates example components of an integration subsystem, in accordance with one or more embodiments of this disclosure.

FIG. 7B illustrates example components of the integration subsystem 740. The integration subsystem 740 supports an ecosystem of third-party application integrations and APIs that enable the first-person insights generated by the analytics subsystem 142 to be extracted and leveraged across customer business systems for more intelligent sales and marketing. The integration subsystem 740 can include an API 744 that may be configured to exchange data with one or more third-party applications 750. The one or more third party applications 750 may be, for example, a sales application, a marketing automation application, a CRM application, a Business Intelligence (BI) application, and/or the like. The third-party application 750 may be configured to leverage data received from and/or sent to the integration subsystem 740, via the API 744.

In order to exchange data and provide control over defined functionality via the API 744, the integration subsystem 744 may use an authentication and authorization unit 748 to generate an access token. The access token may comprise a token key and a token secret. The access token may be associated with a client identifier. Authentication for API requests may be handled via custom HTTP request headers corresponding to the token key and the token secret. The client identifier may be included in the path of an API request URL.

The API 744 may comprise a set of routines, protocols, and/or tools for building software applications. The API 744 may specify how software components should interact. In an embodiment, the API 744 may be configured to send data 766, receive data 768, and/or synchronize data 770. In some cases, the API 744 may be configured to send data 766, receive data 768, and/or synchronize data 770 in substantially real-time, at regular intervals, as requested, and/or the like. The API 744 may be configured to provide the one or more third party applications 750 the ability to access a digital experience (or media asset) functionality, including, for example, event management (e.g., create a webinar, delete a webinar), analytics, account level functions (e.g., event, registrants, attendees), event level functions (e.g., metadata, usage, registrants, attendees), and/or registration (e.g., webinar, or an online portal product as is described below).

The integration subsystem 740, via the API 744, may be configured to deliver attendance/registration information to the third party application 750 to update contact information for leads 752. The third-party application 750 can use attendance/registration information for lead segmentation, lead scoring, lead qualification, and/or targeted campaigns. Engagement data (such as viewing duration, engagement scores, resource downloads, poll/survey responses) associated with webinars may be provided to the third-party application 750 for use in lead scoring and lead qualification to identify leads and ensure effective communication with prospects and current customers.

The integration subsystem 740, via the API 744, may be configured to enable the third-party application 750 to use data provided by the integration subsystem 740, via the API 744, to automate workflows. Engagement data (such as viewing duration, engagement scores, resource downloads, poll/survey responses) associated with webinars may be provided to the third-party application 750 for use in setting one or more triggers 754, filters 756, and/or actions 758. The third-party application 750 may configure a trigger 754. The trigger 754 may be a data point and/or an event, the existence of which may cause an action 758 to occur. The third-party application 750 may configure a filter 754. The filter 754 may be a threshold or similar constraint applied to the data point and/or the event to determine whether any action 758 should be taken based on occurrence of the trigger 758 or determine which action 758 to take based on occurrence of the trigger 754. The third-party application 750 may configure an action 758. The action 758 may be an execution of a function, such as updating a database, sending an email, activating a campaign, etc. The third-party application 750 may receive data (such as engagement data) from the integration subsystem 740, via the API 744, determine if the data relates to a trigger 754, apply any filters 756, and initiate any actions 758. As an example, the third-party application 750 may receive engagement data from the integration subsystem 740 that indicates a user from a specific company watched 30 minutes of a 40 minute video. A trigger 754 may be configured to identify any engagement data associated with the specific company. A filter 756 may be configured to filter out any engagement data associated with viewing times of less than 50% of a video. An action 758 may be configured to send an email to the user inviting the user to watch a related video.

In some embodiments, the content management subsystem 140 (FIG. 1) can provide an online resource portal product that permits providing rich digital experiences for an audience of prospective end-user to find, consume, and engage with interactive webinar experiences and other media assets, such as videos and whitepapers. The online resource portal product can be referred to as an "engagement hub," simply for the sake of nomenclature.

Figure 8:
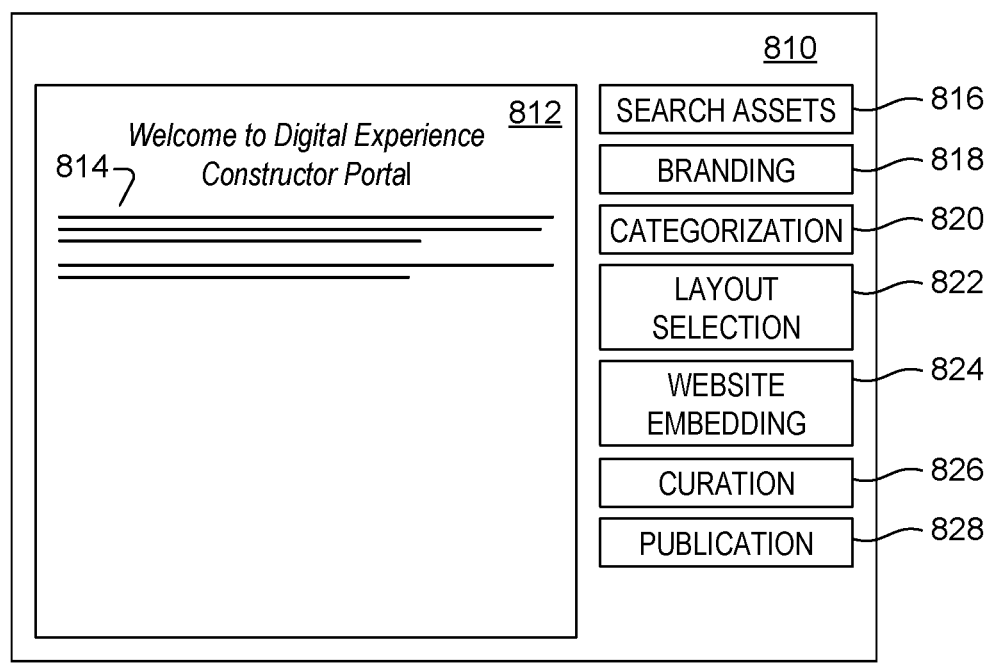
FIG. 8 illustrates an example of a UI representing a landing page for configuration of aspects of a digital experience, in accordance with one or more embodiments of this disclosure.
Figure 9:
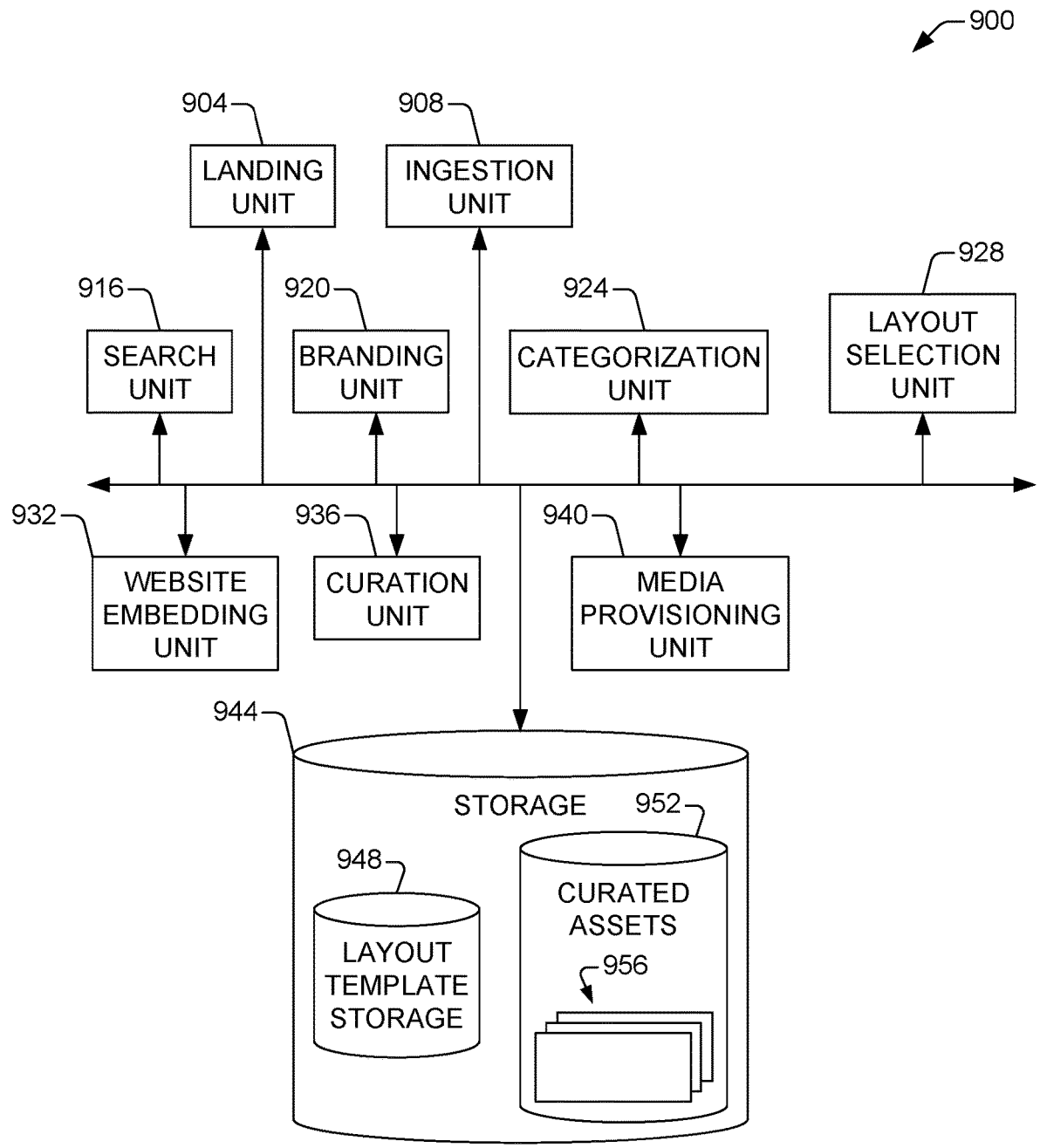
FIG. 9 illustrates an example of a subsystem for configuration of aspects of a digital experience, in accordance with one or more embodiments of this disclosure.

The online portal product provides various functionalities to generate a digital experience (or media asset). As an illustration, FIG. 8 presents an example of a UI 810 representing a landing page of the online portal product, and FIG. 9 illustrates an example of a portal subsystem 900 that provides the functionality of the online portal product. As is illustrated in FIG. 8, the landing page include a pane 812 that includes a title and a UI element 814 that includes digital content describing the functionality of the online portal product. The title is depicted as "Welcome to Digital Experience Constructor Portal," simply as an example. A landing unit 904 in the portal subsystem 900 (FIG. 9) can cause the presentation of the UI 900 in response to receiving a request message to access the online portal product from a source device.

The UI 810 (FIG. 8) also includes several selectable UI elements identifying respective examples of the functionalities that can be provided by the online portal product. Specifically, the selectable UI elements include, for example, a selectable UI element 816 corresponding to a search function; a selectable UI element 818 corresponding to a branding function; a selectable UI element 820 corresponding to a categorization function; a selectable UI element 822 corresponding to a layout selection function (from defined content layouts), a website embedding function, a curation function, and a provisioning function. The provisioning function also can be referred to a publication function.

Selection of the selectable UI element 816 can cause the source device that presents the UI 810 to present another UI (not depicted) to search for a media asset to be augmented with directed content. To that end, in some embodiments, the portal subsystem 900 can include a search unit 916. In this disclosure, directed content refers to digital media configured for a particular audience, or a particular outlet channel (such as a website, a streaming service, or a mobile application), or both. Directed content, as further described herein, can include, for example, digital media of various types, such as an advertisement(s); a curated e-mail(s), a survey(s) or other type(s) of questionnaire(s); a motion picture(s), an animation(s), or other types of video segments; a podcast(s); an audio segment(s) of defined durations (e.g., a portion of a speech or tutorial); media combination thereof, and/or the like. In an example, the directed content can be generated, via a machine learning model, based on data extracted from one or more media assets, and/or based on engagement data associated with the one or more media assets. For example, directed content may be generated based on a plurality of similar user profiles (e.g. similar UICs). The plurality of similar user profiles may be determined based on a first interest cloud associated with a first user profile, wherein the plurality of similar user profiles are associated with corresponding interest clouds that are similar to the first interest cloud.

Selection of the selectable UI element 818 can cause the source device to present another UI (not depicted) that permits obtaining digital content to incorporate into a particular media asset. The digital content can identify the particular media asset as pertaining to a source platform that includes the source device. In some cases, the digital content can be embodied in as a still image (e.g., a logotype), an audio segment (e.g., a jingle), or an animation. In some embodiments, the portal subsystem 900 can include a branding unit 920 that can direct the source device to present a UI in response to selection of the selectable UI element 818. The portal subsystem 900 also can include an ingestion unit 908 that can obtain the digital content from the storage subsystem 144 (FIG. 1) for example.

Selection of the selectable UI element 820 can cause the source device to present another UI (not depicted) to categorize multiple media assets according to multiple categories. In some embodiments, the portal subsystem 900 can include a categorization unit 924 that can cause presentation of the other UI in response to selection of the selectable UI element 820. The categorization unit 924 also can classify a media asset according to one of the several categories.

Selection of the selectable UI element 822 can cause the source device to present another UI (not depicted) to select a layout of areas for presentation of digital content. A first area of the layout of areas can be assigned for presentation of a media asset that is being augmented with directed content. At least one second area of the layout of areas can be assigned for presentation of the directed content. In some embodiments, the portal subsystem 900 can include a layout selection unit 928 that can cause presentation of the other UI in response to selection of the selectable UI element 822. The layout selection unit 928 can cause presentation of a menu of defined layout templates. Data defining such a menu can be retained in a layout template storage 948. In response to receiving input information identifying a selection of the particular defined layout template, the layout selection unit 928 can configure that particular defined layout for presentation of the media asset and directed content.

Figure 10:
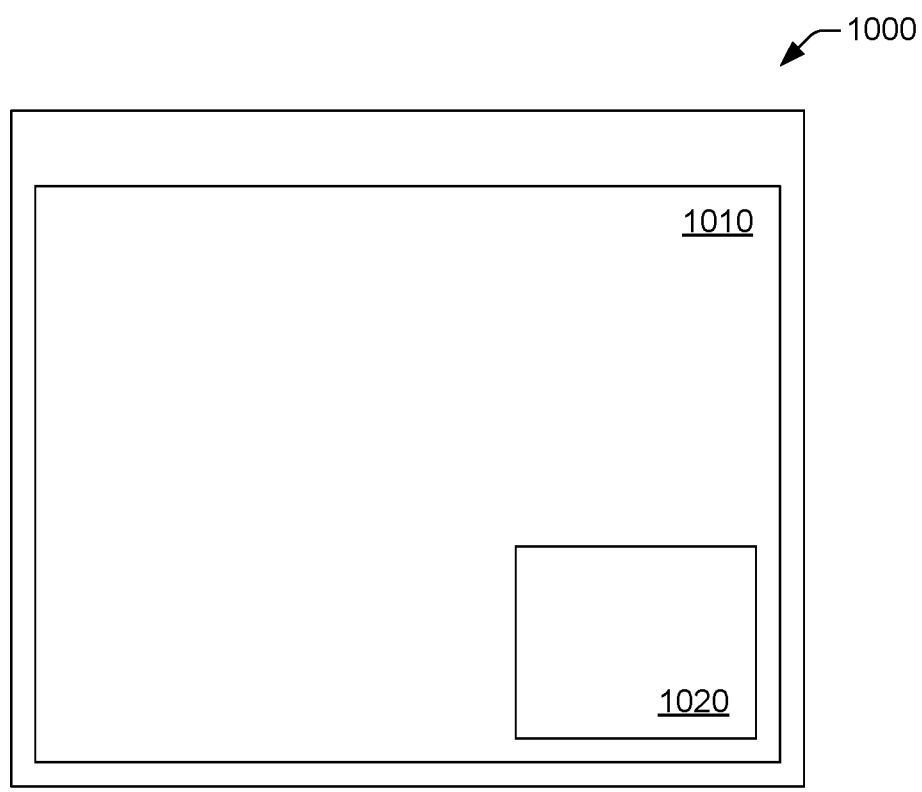
FIG. 10 illustrates a schematic example of a layout template for presentation of a media asset and directed content, in accordance with one or more embodiments of this disclosure.
Figure 11:
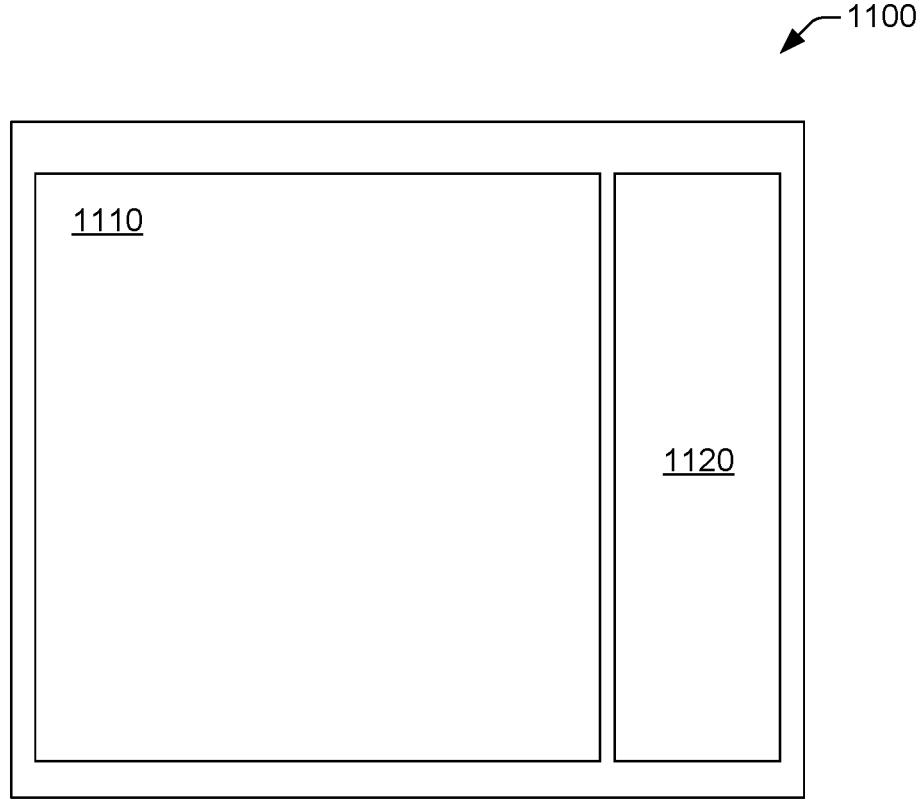
FIG. 11 illustrates another schematic example of a layout template for presentation of a media asset and directed content, in accordance with one or more embodiments of this disclosure.

FIG. 10 and FIG. 11 illustrate respective examples of layout templates. In FIG. 10, an example layout template 1000 includes a first area 1010 that can be allocated to the media asset and a second area 1020 that can be allocated to the directed content. As is shown in FIG. 10, the directed content can be overlaid on the media asset. In FIG. 11, an example layout template 1100 includes a first area 1110 that can be allocated to the media asset and a second area 1120 that can be allocated to the directed content. The second area 1120 is adjacent to first area 1110. Thus, rather than presenting the directed content as an overlay, the directed content is presented adjacent to the media asset.

With further reference to FIG. 8, selection of the selectable UI element 824 can cause the source device that presents the UI 810 to present another UI (not depicted) to configure website-embedding of directed content. To that end, in some embodiments, the portal subsystem 900 can include a website embedding unit 932.

Selection of the selectable UI element 826 can cause the source device to present another UI (not depicted) to curate directed content that can be presented in conjunction with media assets. In some embodiments, the ingestion unit 908 can obtain multiple directed content assets and can cause the source device to present such assets. The multiple directed content assets can be presented in various formats. In one example, the multiple directed content assets can be presented as respective thumbnails. In another example, the multiple directed content assets can be presented in a selectable carousel area. The portal subsystem 900 also can include a curation unit 936 that causes presentation of the other UI in response to selection of the selectable UI element 826. In addition, in some cases, the curation unit 936 can receive input information indicating approval of one or several directed content assets for presentation with media assets. In other cases, the curation unit 936 can evaluate each one the multiple directed content assets obtained by the ingestion component 908. An evaluation that satisfies one or more defined criteria results in the directed content asset being approved for presentation with media assets.

Regardless of approval mechanism, the curation unit 936 can then configure each one of the approved directed content asset(s) as being available for presentation. The approval and configuration represent the curation of those assets. The curation unit 936 can update a corpus of curated directed content assets 956 within a curated asset storage 952 in response to curation of one or many directed content assets.

The portal subsystem 900 also can include a media provisioning unit 940 that can configure presentation of a media asset based on one or a combination of the selected digital content that identifies the source platform, one or several curated directed content assets, and a selected defined layout. To that end, in some cases, the media provisioning unit 940 can generate formatting information identifying the media asset, the selected digital content, the curated directed content asset(s), and the selected defined layout. In addition, or in other cases, the media provisioning unit 940 also can configure a group of rules that controls presentation of directed content during the presentation of the media asset. As an example, the media provisioning unit 940 can define a rule that dictates an instant in which the presentation of the directed content begins and a duration of that presentation. Further, or as another example, the media provisioning unit 940 can configure another rule that dictates a condition for presentation of the directed content and a duration of the presentation of the directed content. Examples of the condition include presence of a defined keyword or keyphrase, or both, in the media asset, and/or one or more portions of the media asset; presence of defined attributes of an audience consuming the media asset, and/or one or more portions of the media asset; or similar conditions. An attribute of an audience includes, for example, location of the audience, size of the audience, type of the audience (e.g., students or C-suite executives, for example), or level of engagement of the audience. In some embodiments, an autonomous component (referred to as a bot) can listen to a presentation and can perform keyword spotting or more complete speech recognition to detect defined keywords or keyphrases.

The media provisioning unit 940 can integrate the formatting information into the media asset as metadata. The metadata can control some aspects of the digital experience that includes the presentation of the media asset. As a result, the online portal product provides a straightforward and efficient way for a source device to seamlessly publish, curate, and promote their interactive webinar experiences alongside directed content that a source device can upload and host inside presentation platform described herein in connection with FIG. 1 or FIG. 4, or both.

Figure 12:
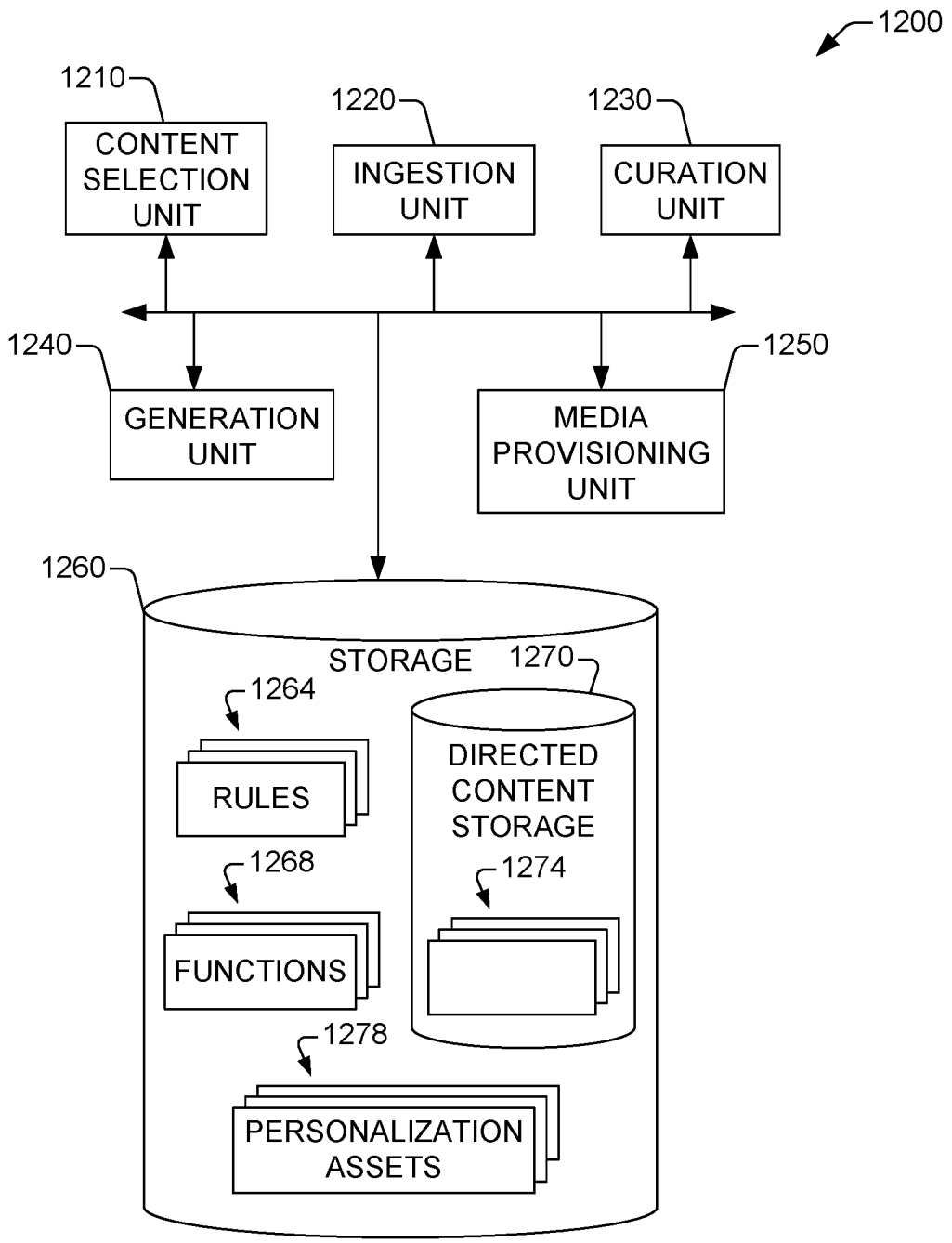
FIG. 12 illustrates an example of a personalization subsystem in a presentation platform for presentation of digital content, in accordance with one or more embodiments of this disclosure.

Besides the online portal product, or in some embodiments, the content management subsystem 130 can include a personalization subsystem 1200 as is illustrated in FIG. 12. The personalization subsystem 1200 can be a part of the content management subsystem 140 and can permit creating a personalized media asset that incorporates directed content. The personalization subsystem 1200 can permit, for example, generating, curating, and/or disseminating interactive webinar and video experiences and other multimedia content to distributed audience segments with relevant messaging, offers, and calls-to-action (e.g., view video, listen to podcast, signup for newsletter, attend a tradeshow, etc.).

The personalization subsystem 1200 can include a directed content selection unit 1210 that can identify directed content assets that can be relevant to a user and/or a user device consuming a media asset. For example, the directed content selection unit 1210 can identify directed content assets based on a plurality of attributes associated with a user (e.g., UIC) and/or user device and data extracted from one or more media assets (e.g., media assets consumed by a user and/or output by a user device). For example, the directed content selection unit 1210 can identify directed content assets as further described in FIGS. 19A-19B. In an example, the content selection unit 1210 can direct an ingestion unit 1220 to obtain a group of directed content assets from directed content storage 1280 retaining a corpus of directed content assets 1284. In some cases, the corpus of directed content assets 1264 can be categorized according to attributes of an end-user. The attributes can include, for example, market type, market segment, geography, business size, business type, revenue, profits, and similar. Accordingly, for a particular user device for which the personalization is being implemented, the content selection unit 1210 can direct the ingestions unit 1220 to obtain directed content assets having a particular set of attributes. Simply as an illustration, the ingestion unit 1220 can obtain multiple directed content assets having the following attributes: industrial equipment, small-medium business (SMB), and U.S. Midwest.

In some cases, the ingestion unit 1220 can cause a source device to present the multiple directed content assets according to one of various formats. As mentioned, the multiple directed content assets can be presented as respective thumbnails or in a selectable carousel area.

The personalization subsystem 1200 also can include a curation unit 1230 that can receive input information indicating approval of one or several directed content assets for presentation with media assets. The input information can be received from the source device that personalizes the media asset. In other cases, the curation unit 1230 can evaluate each one the multiple directed content assets obtained by the ingestion unit 1220. An evaluation that satisfies one or more defined criteria results in the directed content asset being approved for presentation with media assets.

Regardless of approval mechanism, the curation unit 936 can then configure each one of the approved directed content asset(s) as being available for personalization. As mentioned, the approval and configuration represent the curation of those assets. The ingestion unit 1220 can update a corpus of personalization assets 1278 to include directed content assets that have been curated for a particular user-device, within a storage 1260.

The personalization subsystem 1200 also can include a generation unit 1240 that can select one or several personalization assets of the personalization assets 1278 and can then incorporate the personalization asset(s) into a media asset being personalized.

Incorporation of a personalization asset into the media asset can include, in some cases, adding one or several overlays to the media asset. A first overlay can include notes on a product described in the media asset. The overlay can be present for a defined duration that can be less than or equal to the duration of the media asset. Simply as an illustration, for industrial equipment, the note can be a description of capacity of a mining sifter or stability features of vibrating motor. A second overlay can include one or several links to respective documents (e.g., product whitepaper) related to the product. Further, or as another alternative, a third overlay can include a call-to-action related to the product.

Further, or in some cases, the generation unit 1240 can configure one or several functionality features to be made available during presentation of the media asset. Examples of the functionality features include translation, transcription, read-aloud, live chat, trainer/presenter scheduler, or similar. The type and number of functionality features that are configured can be based on the respective scores as is described above.

The generation unit 1240 can generate formatting information defining presentation attributes of one or several overlays to be included in the media asset being personalized. In addition, or in some cases, the generation unit 1240 also can generate second formatting information identifying the group of functionality features to be included with the media asset.

The media provisioning unit 940 can integrate available formatting information into the media asset as metadata. The metadata can control some aspects of the personalized digital experience that includes the presentation of the media asset. The media provisioning unit 1260, in some cases, also can configure one or more platforms/channels (web, mobile web, mobile app) to present the media asset. In addition, or in other cases, the media provisioning unit 1250 also can configure a group of rules that controls presentation of the media asset. As an example, the media provisioning unit 940 can define a rule that dictates that directed content is presented during specific time intervals during certain days. Further, or as another example, the media provisioning unit 1250 can configure another rule that dictates that directed content is presented during a particular period. For example, the particular period can be a defined number of days after initial consumption of the media asset. As yet another example, the media provisioning unit 1250 can define yet another rule that dictates that directed content is presented a defined number of times during a particular period.

FIG. 13A shows example components of the content management subsystem 140. Digital content (e.g., the media assets 166) as described herein may be provided by a presentation module 1300 of the content management subsystem 140. For example, the media assets 166 may comprise interactive webinars. The webinars may comprise web-based presentations, livestreams, webcasts, etc. The phrases "webinar" and "communication session" may be used interchangeably herein. A communication session may comprise an entire webinar or a portion (e.g., component) of a webinar, such as a corresponding chat room/box. The presentation module 1300 may provide webinars at the user devices 102 via the client application 106. As further described herein, the webinars may be provided via a user interface(s) 1301 of the client application 106.

The webinars may comprise linear content (e.g., live, real-time content) and/or on-demand content (e.g., pre-recorded content). For example, the webinars may be livestreamed. As another example, the webinars may have been previously livestreamed and recorded. Previously-recorded webinars may be stored in the media repository 164 and accessible on-demand via the client application 106. As further described herein, a plurality of controls provided via the client application 106 may allow users of the user devices 102 to pause, fast-forward, and/or rewind previously-recorded webinars that are accessed/consumed on-demand.

As shown in FIG. 13A, the content management subsystem 140 may comprise a studio module 1304. The studio module 1304 may comprise a production environment (not shown). The production environment may comprise a plurality of tools that administrators and/or presenters of a webinar may use to record, livestream, and/or upload multimedia presentations/content for the webinar.

The studio module 1304 may comprise a template module 1304A. The template module 1304A may be used to customize the user experience for a webinar using a plurality of stored templates (e.g., layout templates). For example, administrators and/or presenters of a webinar may use the template module 1304A to select a template from the plurality of stored templates for the webinar. The stored templates may comprise various configurations of user interface elements, as further described below with respect to FIG. 13B. For example, each template of the plurality of stored templates may comprise a particular background, font, font size, color scheme, theme, pattern, a combination thereof, and/or the like. The studio module 1304 may comprise a storage repository 1304B that allows any customization and/or selection made within the studio module 1304 to be saved (e.g., as a template).

FIG. 13B shows an example of a user interface 1301 of an example webinar. The user interface 1301 may be generated by the presentation module 1300 and presented at the user devices 102 via the client application 106. The user interface 1301 for a particular webinar may comprise a background, font, font size, color scheme, theme, pattern, a combination thereof, and/or the like. The user interface 1301 may comprise a plurality of interface elements (e.g., "widgets") 1301A-1301F. The user interface 1301 and the plurality of interface elements 1301A-1301F may be configured for use on any computing device, mobile device, media player, etc. that supports rich web/Internet applications (e.g., HTML5, Adobe Flash™, Microsoft Silverlight™, etc.).

As shown in FIG. 13B, the user interface 1301 may comprise a media player element 1301A. The media player element 1301A may stream audio and/or video presented during a webinar. The media player element 1301A may comprise a plurality of controls (not shown) that allow users of the client application 106 to adjust a volume level, adjust a quality level (e.g., a bitrate), and/or adjust a window size. For webinars that are provided on-demand, the plurality of controls of the media player element 1301A may allow users of the client application 106 to pause, fast-forward, and/or rewind content presented via the media player element 1301A.

As another example, as shown in FIG. 13B, the user interface 1301 may comprise a Q&A element 1301B. The Q&A element 1301B may comprise a chat room/box that allows users of the client application 106 to interact with other users, administrators, and/or presenters of the webinar. The user interface 1301 may also comprise a resources element 1301C. The resources element 1301C may include a plurality of internal or external links to related content associated with the webinar, such as other webinars, videos, audio, images, documents, websites, a combination thereof, and/or the like.

The user interface 1301 may comprise a communication element 1301D. The communication element 1301D may allow users of the client application 106 to communicate with an entity associated with the webinar (e.g., a company, person, website, etc.). For example, the communication element 1301D may include links to email addresses, websites, telephone numbers, a combination thereof, and/or the like.

The user interface 1301 may comprise a survey/polling element 1301E. The survey/polling element 1301E may comprise a plurality of surveys and/or polls of various forms. The surveys and/or polls may allow users of the client application 106 to submit votes, provide feedback, interact with administrators and/or presenters (e.g., for a live webinar), interact with the entity associated with the webinar (e.g., a company, person, website, etc.), a combination thereof, and/or the like.

The user interface 1301 may comprise a plurality of customization elements 1301F. The plurality of customization elements 1301F may be associated with one or more customizable elements of the webinar, such as backgrounds, fonts, font sizes, color schemes, themes, patterns, combinations thereof, and/or the like. For example, the plurality of customization elements 1301F may allow the webinar to be customized via the studio module 1304. The plurality of customization elements 1301F may be customized to enhance user interaction with any of the plurality of interface elements (e.g., "widgets") described herein. For example, the plurality of customization elements 1301F may comprise a plurality of control buttons associated with the webinar, such as playback controls (e.g., pause, FF, RWD, etc.), internal and/or external links (e.g., to content within the webinar and/or online), communication links (e.g., email links, chat room/box links), a combination thereof, and/or the like.

Users may interact with the webinars via the user devices 102 and the client application 106. User interaction with the webinars may be monitored by the client application 106. For example, the user activity data 224 associated with the webinars provided by the presentation module 1300 may be monitored via the activity monitoring engine 220. Examples of the user activity data 224 associated with the webinars includes, but is not limited to, interaction with the user interface 1301 (e.g., one or more of the elements 1301A-1301F), interaction with the studio module 1304, a duration of a webinar consumed (e.g., streamed, played), a duration of inactivity during a webinar (e.g., inactivity indicated by the user device 102), a frequency or duration of movement (e.g., movement indicated by indicated by the user device 102), a combination thereof, and/or the like. The user activity data 224 associated with the webinars may be provided to the analytics subsystem 142 via the activity monitoring engine 220.

As shown in FIG. 13A, the presentation module 1300 may comprise a captioning module 1302. The captioning module 1302 may receive user utterance data and/or audio data of a webinar. The user utterance data may comprise one or more words spoken by a presenter(s) (e.g., speaker(s)) and/or an attendee(s) of a webinar. The audio data may comprise audio portions of any media content provided during a webinar, such as an audio track(s) of video content played during a webinar. The captioning module 1302 may convert the user utterance data and/or the audio data into closed captioning/subtitles. For example, the captioning module 1302 may comprise—or otherwise be in communication with—an automated speech recognition engine (not shown).

The automated speech recognition engine may process the user utterance data and output a transcription(s) of the one or more words spoken by the presenter(s) and/or the attendee(s) of the webinar in real-time or near real-time (e.g., for livestreamed content). Similarly, the automated speech recognition engine may process the audio data and output a transcription(s) of the audio portions of the media content provided during the webinar in real-time or near real-time (e.g., for livestreamed content). The captioning module 1302 may generate closed captioning/subtitles corresponding to the transcription(s) output by the automated speech recognition engine. The closed captioning/subtitles may be provided as an overlay 1302A of a webinar, as shown in FIG. 13C.

Figure 14A:
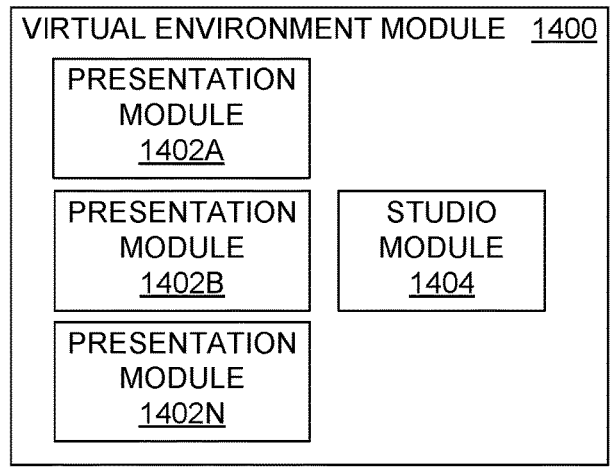
FIG. 14A illustrates a virtual environment module, in accordance with one or more embodiments of this disclosure.
Figure 14B:
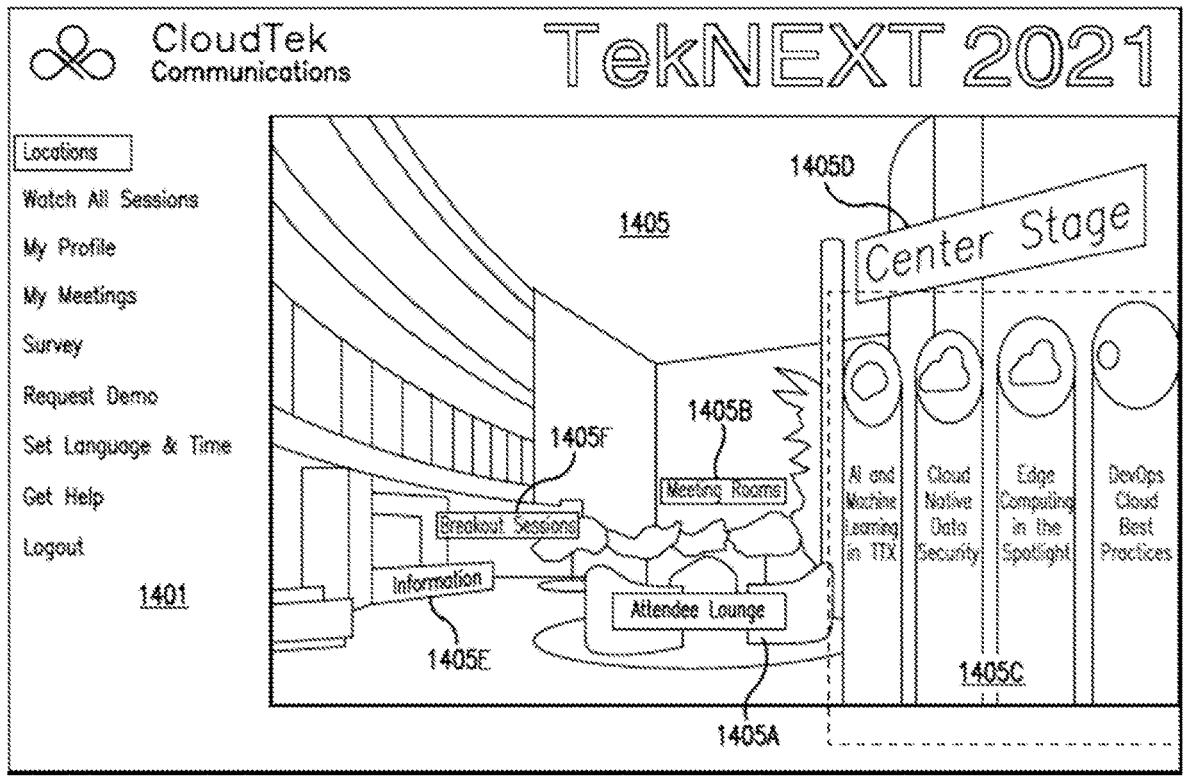
FIG. 14B illustrates an example of an interactive virtual environment, in accordance with one or more embodiments of this disclosure.

FIG. 14A shows a virtual environment module 1400. The virtual environment module 1400 may be a component of the content management subsystem 140. The virtual environment module 1400 may facilitate presentation of, and interactive with, a plurality of the media assets 166 in an interactive virtual environment 1401, as shown in FIG. 14B. For example, the virtual environment module 1400 may facilitate presentation of, and interactive with, a plurality of webinars at the user devices 102 via the client application 106 within the interactive virtual environment 1401. For example, as described herein, the media assets 166 may comprise interactive webinars (e.g., web-based presentations, livestreams, webcasts, etc.) that may be provided via the client application 106 by the presentation module 1300 within the interactive virtual environment 1401.

As shown in FIG. 14A, the virtual environment module 1400 may comprise a plurality of presentation modules 1402A, 1402B, 1402N. Each presentation module of the plurality of presentation modules 1402A, 1402B, 1402N may comprise an individual session, instance, virtualization, etc., of the presentation module 1300. For example, the plurality of presentation modules 1402A. 1402B, 1402N may comprise a plurality of simultaneous webinars (e.g., media assets 166) that are provided by the presentation module 1300 and via the client application 106. The virtual environment module 1400 may enable users of the user devices 102 to interact with each webinar via the interactive virtual environment 1401 and the client application 106.

Each of the plurality of presentation modules 1402A, 1402B, 1402N may comprise a communication session/webinar, such as a chat room/box, an audio call/session, a video call/session, a combination thereof, and/or the like. As an example, and as further described herein, the interactive virtual environment 1401 may comprise a virtual conference/tradeshow, and each of the plurality of presentation modules 1402A, 1402B, 1402N may comprise a communication session that may function as a virtual "vendor booth," "lounge," "meeting room," "auditorium," etc., at the virtual conference/tradeshow. In this way, the plurality of presentation modules 1402A, 1402B, 1402N may enable users at the user devices 102 to communicate with other users and/or devices via the interactive virtual environment 1401 and the client application 106.

Users of the user devices 102 may interact with the interactive virtual environment 1401 via the client application 106. The service management subsystem 138 may administer (e.g., control) such interactions between the user devices 102 and the interactive virtual environment 1401. For example, the service management subsystem 138 may generate a session identifier (or any other suitable identifier) for each of the communication sessions (e.g., webinars)—or components thereof (e.g., chat rooms/boxes)—within the interactive virtual environment 1401. The service management subsystem 138 may use the session identifiers to ensure that only the user devices 102 associated with a particular communication session (e.g., via registration/sign-up, etc.) may interact with the particular communication session.

As described herein, the media assets 166 may comprise interactive webinars (e.g., web-based presentations, livestreams, webcasts, etc.) that may be provided via the client application 106 by the presentation module 1300 within the interactive virtual environment 1401. The media assets 166 may comprise linear content (e.g., live, real-time content) and/or on-demand (e.g., pre-recorded content). For example, the media assets 166 may be livestreamed within the interactive virtual environment 1401 according to a schedule of a corresponding virtual conference/tradeshow (e.g., a "live" conference/tradeshow). As another example, the media assets 166 corresponding to another virtual conference/tradeshow may be pre-recorded, and the media assets 166 may be accessible via the media repository 164 on-demand via the client application 106. For virtual conferences/tradeshows that are not live or real-time (e.g., the corresponding media assets are pre-recorded), the interactive virtual environment 1401 may nevertheless allow a user(s) of a user device(s) 102 to interact with the virtual conference/tradeshow as if it were live or being held in real-time. As an example, the interactive virtual environment 1401 may allow the user(s) of the user device(s) 102 to interact with an on-demand virtual conference/tradeshow as if the user(s) were actually present when the corresponding communication sessions (e.g., webinars) were being held/recorded. In this way, the user(s) of the user device(s) 102 may interact with the on-demand virtual conference/tradeshow as an observer in simulated-real-time. The user(s) may navigate to different communication sessions of the on-demand virtual conference/tradeshow via the interactive virtual environment 1401, and the user-experience may only be limited in that certain aspects, such as chat rooms/boxes, may not be available for direct interaction. The user(s) may navigate within the on-demand virtual conference/tradeshow via the interactive virtual environment 1401 in 1:1 simulated-real-time or in compressed/shifted time. For example, the user(s) may "fast-forward" or "rewind" to different portions of the on-demand virtual conference/tradeshow via the interactive virtual environment 1401. In this way, the user(s) may be able to skip certain portions of a communication session and/or re-experience certain portions of a communication session of the on-demand virtual conference/tradeshow.

As shown in FIG. 14A, the virtual environment module 1400 may comprise a studio module 1404. The studio module 1404 may function similar to the studio module 1304 described herein. For example, the studio module 1404 may allow administrators and/or presenters of a virtual conference/tradeshow—or a session/webinar thereof—to record, livestream, and/or upload multimedia presentations/content for the virtual conference/tradeshow. The studio module 1404 may allow administrators and/or presenters of a virtual conference/tradeshow—or a session/webinar thereof—to customize the user experience using the template module 1304A and the plurality of templates (e.g., layouts) stored in the storage repository 1304B. For example, administrators and/or presenters of a virtual conference/tradeshow—or a session/webinar thereof—may use the studio module 1404 to select a template from the plurality of templates stored in the storage repository 1304B. The studio module 1404 may store/save any customization and/or selection made within the studio module 1404 to the storage repository 1304B.

User interaction with virtual conferences/tradeshows via the interactive virtual environment 1401, whether the virtual conferences/tradeshows are real-time or on-demand, may be monitored by the client application 106. For example, user interaction with virtual conferences/tradeshows via the interactive virtual environment 1401 may be monitored via the activity monitoring engine 220 and stored as user activity data 224. The user activity data 224 associated with the virtual conferences/tradeshows may include, as an example, interaction with the user interface 1301 (e.g., one or more of the elements 1301A-401F) within a particular communication session/webinar. As another example, the user activity data 224 associated with the virtual conferences/tradeshows may include interaction with the studio module 1404. Further examples of the user activity data 224 associated with the virtual conferences/tradeshows include, but are not limited to, a duration of a communication session/webinar consumed (e.g., streamed, played), a duration of inactivity during a communication session/webinar (e.g., inactivity indicated by the user device 102), a frequency or duration of movement (e.g., movement indicated by the user device 102), a combination thereof, and/or the like. The user activity data 224 associated with the virtual conferences/tradeshows may be provided to the analytics subsystem 142 via the activity monitoring engine 220.

FIG. 14B shows an example lobby 1405 of a virtual conference/tradeshow within the interactive virtual environment 1401. The interactive virtual environment 1401 provided via the client application 106 may enable a visual, audible, and/or physical interaction between the users of the user devices 102 and areas/events within a virtual conference/tradeshow, as indicated by the lobby 1405. For example, as shown in the lobby 1405 in FIG. 14B, the interactive virtual environment 1401 may provide the users of the user devices 102 with a rendered scene of a virtual conference/tradeshow. As discussed above, the interactive virtual environment 1401 may allow the users of the user devices 102 to interact with the virtual conference/tradeshow in real-time or on-demand. The manner in which the users of the user devices 102 interact with the virtual conference/tradeshow may correspond to capabilities of the user devices 102. For example, if a particular user device 102 is a smart phone, user interaction may be facilitated by a user interacting with a touch screen of the smart phone. As another example, if a particular user device 102 is a computer or gaming console, user interaction may be facilitated by a user via a keyboard, mouse, and/or a gaming controller. Other examples are possible as well. The user devices 102 may include additional components that enable user interaction, such as sensors, cameras, speakers, etc. The interactive virtual environment 1401 of a virtual conference/tradeshow may be presented via the client application 106 in various formats such as, for example, two-dimensional or three-dimensional visual displays (including projections), sound, haptic feedback, and/or tactile feedback. The interactive virtual environment 1401 may comprise, for example, portions using augmented reality, virtual reality, a combination thereof, and/or the like.

A user may interact with the lobby 1405 via the interactive virtual environment 1401 and the user interface(s) 1301 of the client application 106. As an example, as shown in FIG. 14B, the lobby 1405 may allow a user to navigate to a virtual attendee lounge 1405A, meeting rooms 1405B, a plurality of presentations 1405C at a virtual auditorium ("Center Stage") 1405D, an information desk 1405E, and breakout sessions 1405F. The virtual attendee lounge 1405A, the meeting rooms 1405B, each of the plurality of presentations 1405C at the virtual auditorium 1405D, the information desk 1405D, and the breakout sessions 1405F may be facilitated by the virtual environment module 1400 and the plurality of presentation modules 1402A, 1402B, 1402N.

The presentation module 1402A may be associated with a first part of the virtual conference/tradeshow, such as the virtual attendee lounge 1405A, the presentation module 1402B may be associated with another part of the virtual conference/tradeshow, such one or more of the breakout sessions 1405F, and the presentation module 1402N may be associated with a further part of the virtual conference/tradeshow, such as one or more of the plurality of presentations 1405C in the virtual auditorium ("Center Stage") 1405D. As an example, a user may choose to view one of the plurality of presentations 1405C. As discussed herein, the user device(s) 102 may be smart phones, in which case the user may touch an area of a screen of the smart phone displaying the particular presentation of the plurality of presentations 1405C he or she wishes to view. The presentation module 1402N may receive a request from the smart phone via the client device 106 indicating that the user wishes to view the particular presentation. The presentation module 1402N may cause the smart phone, via the client application 106, to render a user interface associated with the particular presentation, such as the user interface 1301. The user may view the particular presentation and interact therewith via the user interface in a similar manner as described herein with respect to the user interface 1301. The user interface associated with the presentation may comprise an exit option, such as a button (e.g., a customization element 1301F), which may cause the smart phone, via the client application 106, to "leave" the presentation and "return" the user to the lobby 1405. For example, the user may press on an area of the smart phone's screen displaying the exit option/button, and the presentation module 1402N may cause the smart phone, via the client application 106, to render the lobby 1405 (e.g., "returning" the user to the lobby of the virtual conference/tradeshow).

Figure 15A:
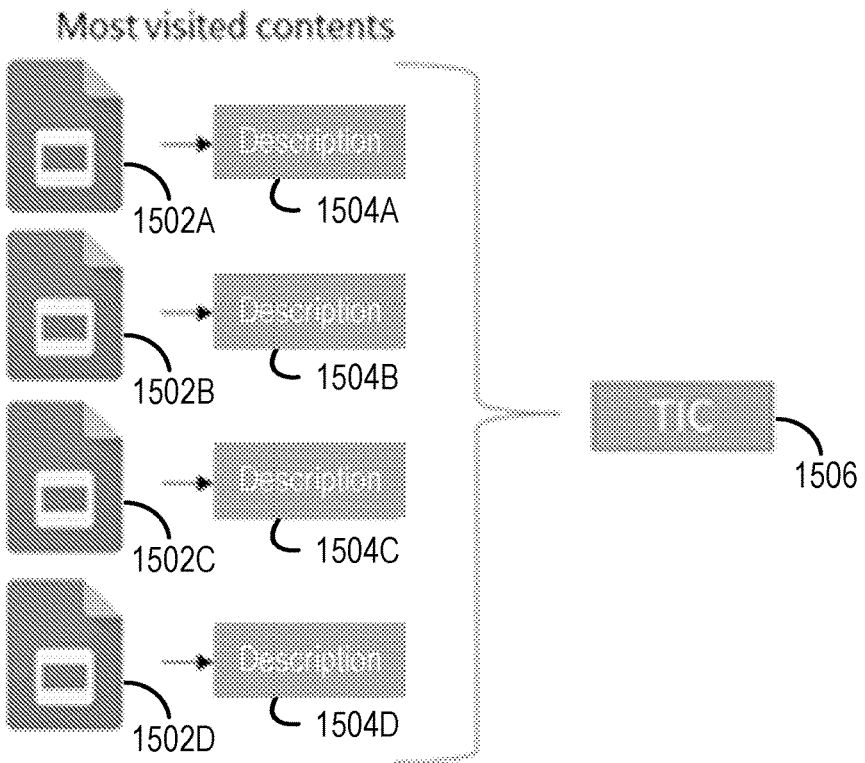
FIGS. 15A-15D illustrate example systems, in accordance with one or more embodiments of the disclosure.
Figure 15B:
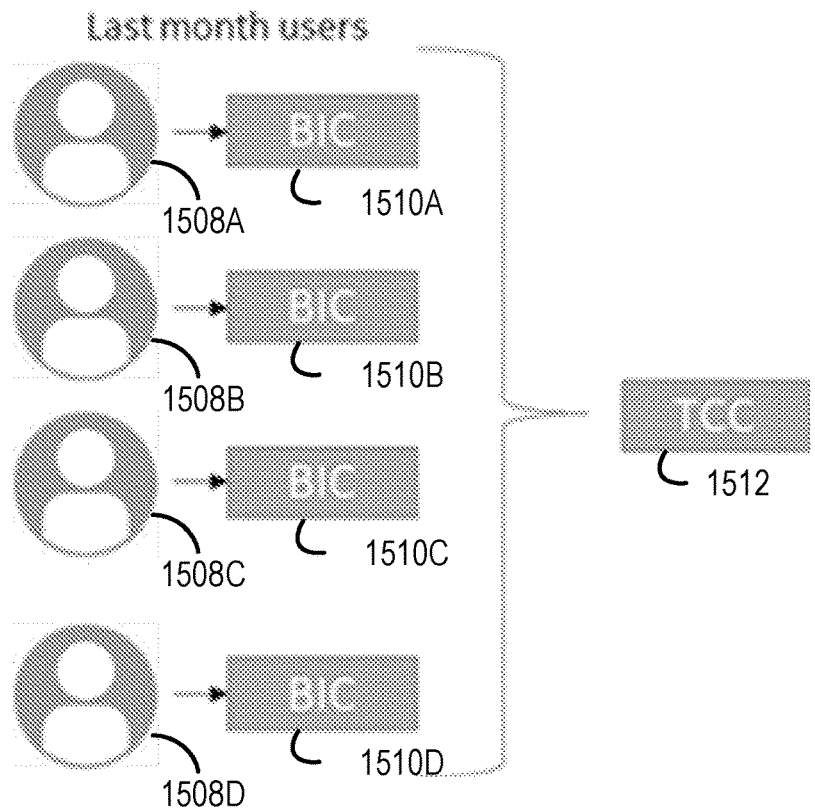

FIGS. 15A and 15B show example systems for user engagement analysis. As described herein, a third-party subsystem 610 can include various type of subsystems that permit first-person insights generated by the analytics subsystem 142 to be extracted and leveraged across business systems of a source platform. Each third-party subsystem 610 may be referred to herein as a "client system" or simply as a "client." The presentation platform described herein may access, control, etc., each of the third-party subsystems 610. Each third-party subsystem 610 may be associated with a unique client identifier assigned by the analytics subsystem 142.

FIG. 15A shows an example system for user engagement analysis. As described herein, the presentation platform may comprise a system of computing devices, servers, software, etc. that is configured to provide a plurality of media assets 1502A-1502D (e.g., content) at a plurality of user devices 102. Users of the plurality of user devices 102 may engage with (e.g., interact with) the plurality of media assets 1502A-1502D may via the client application 106, resulting in a plurality of activity data 224. As described herein, the analytics subsystem 142 may be configured to receive and analyze the plurality of activity data 224. The plurality of activity data 224 may be received in real-time corresponding to a plurality of engagements as users associated with a particular client are engaging with the client application 106. The plurality of activity data 224 may be associated with a period of time (e.g., collected at a set interval(s) at a set frequency).

The analytics subsystem 142 may receive the plurality of activity data 224, which may be associated with a plurality of engagements of the plurality of user devices 102 with the plurality media assets 1502A-1502D, and/or one or more portions of the plurality of media assets 1502A-1502D. The plurality of engagements may comprise or be indicative of, as an example, several user interactions with a user interface of the client application 106; a quantity of time(s) that each media asset was output; a quantity of mute actions; a level of volume; a duration(s) of inactivity of the client application 106; etc.

The analytics subsystem 142 may analyze the plurality of activity data 224 to generate a plurality of user profiles and corresponding user interest clouds (e.g., the UICs described herein) for each user and/or for each user device of the plurality of user devices 102. The corresponding user interest clouds may each comprise, as an example, at least one content feature associated with each media asset, and/or one or more portions of each media asset, of the plurality media assets. Additionally, the corresponding user interest clouds may each comprise, as an example, an interest attribute associated with each media asset, and/or one or more portions of each media asset, of the plurality media assets. An interest attribute may comprise, for example, a numerical indication of a level of interest (e.g., a percentage, rating, etc.) or a textual indication of a level of interest (e.g., "high," "low," etc.).

When generating the plurality of user profiles and corresponding user interest clouds for each user and/or for each user device of the plurality of user devices 102, the analytics subsystem 142 may determine a feature vector associated with each user and/or with each user device of the plurality of user devices 102. For example, the analytics subsystem 142 may determine each feature vector based on the plurality of activity data 224 and the plurality of engagements. Each feature vector may comprise the at least one content feature and at least one engagement feature associated with each media asset, and/or one or more portions of each media asset. The at least one engagement feature of each feature vector may comprise at least one of: a quantification of an engagement with each media asset or a numerical weight associated with an engagement type. Based on each feature vector associated with each user and/or each user device of the plurality of user devices 102, the analytics subsystem 142 may generate the plurality of user profiles and corresponding user interest clouds. The corresponding user interest clouds may comprise the at least one content feature and an associated interest attribute. The analytics subsystem 142 may use a scoring model to determine the associated interest attribute for each of the corresponding user interest clouds. The associated interest attribute for each of the corresponding user interest clouds may comprise at least one of: a numerical indication of a level of interest associated with each media asset or a textual indication of the level of interest associated with each media asset.

Each of the plurality of media assets 1502A-1502D, and/or one or more portions of each of the plurality of media assets 1502A-1502D, may comprise a number of content features 1504A-1504D such as, for example, a content type, a content rating, content metadata, a date of creation, a content tag, a content category, transcript, a content filter, a language, text data, or one or more words of a content description, speaker identification, talk time, etc. The analytics subsystem 142 may determine (e.g., identify) a plurality of content features associated with interest attributes that meet or exceed an interest threshold. For example, as shown in FIG. 15A, the number of content features 1504A-1504D may be associated with a content description for each media asset. Accordingly, the interest threshold may comprise a threshold level of interest associated with one or more words of the content description. The interest threshold may include, for example, numerical levels of interest greater than 75% and textual levels of interest including "high" and "medium."

The analytics subsystem 142 may determine the plurality of content features that meet or exceed the interest threshold based on the at least one content feature (e.g., the content description) and the associated interest attribute of each of the corresponding user interest clouds. The plurality of activity data 224 may be associated with a client identifier. For example, the presentation platform may provide/distribute media assets for a number of different clients (e.g., third-party subsystems as described herein), and each client may be associated with a unique client identifier. The analytics subsystem 142 may generate a first interest cloud 1506, shown in FIG. 15A as a Trending Interest Cloud (TIC) 1506, that is associated with the particular client identifier. For example, the analytics subsystem 142 may generate the first interest cloud 1506 based on the interest attribute meeting or exceeding the interest threshold. The interest attribute may be associated with the corresponding content description.

FIG. 15B shows another example system for user engagement analysis. As discussed herein, the analytics subsystem 142 may analyze the plurality of activity data 224 in order to generate the plurality of user profiles, which are shown in FIG. 15B as user profiles 1508A-1508D, and corresponding user interest clouds for each user and/or for each user device of the plurality of user devices 102, which are shown in FIG. 15B as interest clouds 1510A-1510D.

The analytics subsystem 142 may determine (e.g., identify) a subset of the plurality of segments or portions of media assets 1502A-1502D associated with a threshold quantity of engagements. Each media asset of the subset may be associated with an average quantity of engagements by one or more users of one or more of the plurality of user devices 102. The threshold quantity of engagements for a particular media asset of the subset may, as an example, be a number of engagements that is greater than or equal to the corresponding average quantity of engagements for that particular media asset. The analytics subsystem 142 may generate a second interest cloud 1512, shown in FIG. 15A as a Trending Content Cloud (TCC) 1512, that is associated with the particular client identifier. For example, the analytics subsystem 142 may generate the second interest cloud 1512 based on the subset of the plurality of media assets 1502A-1502D associated with the threshold quantity of engagements. From the subset of the plurality of media assets 1502A-1502D, the analytics subsystem 142 may determine a subset of the plurality of content features. For example, the analytics subsystem 142 may determine the content description for each media asset of the subset of the plurality of media assets 1502A-1502D. A scoring system may be used to determine the subset of the plurality of content features based on top words and/or phrases within each of these content descriptions. For example, the scoring system may determine the top words and/or phrases based on words, phrases, metadata, etc. associated with each of the subset of the plurality of content features. The second interest cloud 1512 may be indicative of/comprise these top words and/or phrases.

Figure 15C:
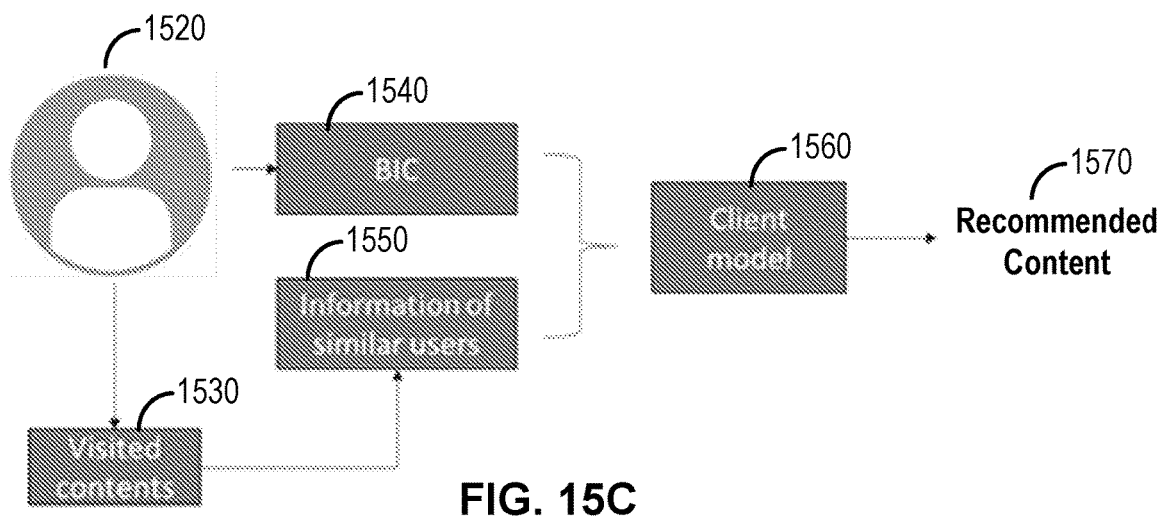
Figure 15D:
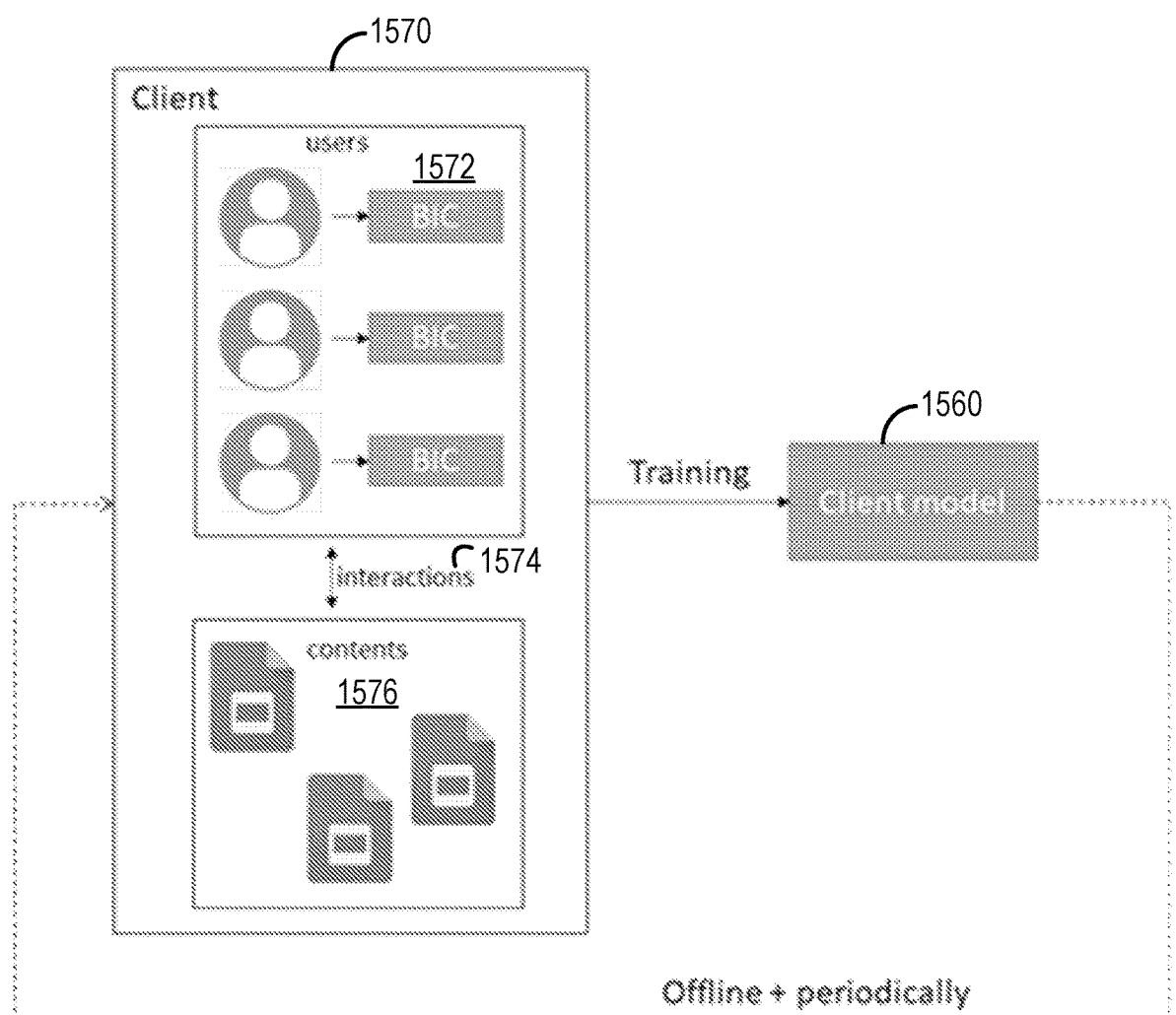

FIGS. 15C and 15D show example systems for model selection and content recommendations. As described herein, a third-party subsystem 610 can include various type of subsystems that permit first-person insights generated by the analytics subsystem 142 to be extracted and leveraged across business systems of a source platform. Each third-party subsystem 610 may be referred to herein as a "client system" or simply as a "client". The presentation platform described herein may access, control, etc., each of the third-party subsystems 610. FIG. 15C shows an example system for providing a recommendation for similar content as described herein. Each third-party subsystem 610 may be associated with a unique client model 1560, and each unique client model 1560 may be maintained by the analytics subsystem 142 (e.g., each client model 1560 may be accessible by the analytics subsystem 142). Each client model 1560 may comprise at least one of: the feature extraction unit 210, the activity monitoring unit 220, the scoring unit 230, the scoring model(s) 248, or the profile generation unit 250 as described herein. Each client model 1550 may be customized based on a number of media assets (e.g., digital content) the particular client has uploaded/produced for distribution by the present distribution platform.

The system shown in FIG. 15C may relate to an "online" or "live" service. For example, the "online" or "live" service may provide a recommendation for content (e.g., a media asset(s)) in real-time as users associated with the particular client are engaging with the client application 106. The system shown in FIG. 15D may relate to "offline" services. For example, the "offline" services may be used to update UICs and each client model 1550 periodically or based on a triggering event as described herein.

As shown in FIG. 15C, a user 1520 may generate activity data 1530 ("visited contents") indicative of a plurality of engagements with a plurality of media assets, and/or one or more portions of the plurality of media assets, via a user device associated with the user 1520 (e.g., via the client application 106). The analytics subsystem 142 may receive the activity data 1530 via the client application 106 executing on the user device. The analytics subsystem 142 may generate a user interest cloud 1540 (business interest cloud, or "BIC") associated with the user device. For example, the analytics subsystem 142 may generate the user interest cloud 1540 based on the activity data 1530. The user interest cloud 1530 may include at least one content feature of a plurality of content features as well as at least one interest attribute of a plurality of interest attributes, as described herein. The plurality of content features and the plurality of interest attributes may be associated with each media asset, and/or one or more portions of each media asset, of the plurality media assets. The client model 1560 (e.g., a machine learning model) may determine at least one content recommendation 1570 based on the user interest cloud 1540 and the activity data 1530. The client model 1560 may have been trained using historical user activity data, as further described herein. The client model 1560 may determine the at least one content recommendation 1570 based on activity/interest data 1550 associated with other users. For example, the activity/interest data 1550 may comprise activity data for one or more other users who engaged with one or more media assets, and/or one or more portions of the one or more media assets, that the user 1520 engaged with. As another example, the activity/interest data 1550 may comprise UICs for other users that are similar to the UIC of the user 1520 in terms of interests, etc. The analytics subsystem 142 may select the client model 1560 based on the particular client associated with the user 1520. In this way, the present distribution platform, may use both a content-based filtering (CBF) and collaborative filtering (CF) approach when determining the at least one content recommendation 1570.

In another example, the client model 1560 may not be client-specific. For example, the client model 1560 may comprise a first machine learning model of a plurality of machine learning models. The plurality of machine learning models may be associated with a plurality of client identifiers. The analytics subsystem 142 may select the client model 1560 from the plurality of machine learning models based on a size and dispersion of the activity data for each client.

Additionally, or in the alternative, the analytics subsystem 142 may select the client model 1560 from the plurality of machine learning models based on clusters of clients with similar characteristics. For example, the particular client associated with the user 1520 may be associated with a first client identifier of a plurality of client identifiers. The analytics subsystem 142 may determine a first client interest cloud associated with the first client identifier. The analytics subsystem 142 may also determine a plurality of client interest clouds associated with each remaining client identifier of the plurality of client identifiers. Each client interest cloud may be based on a corresponding plurality of media assets (e.g., media assets associated with each client identifier) and corresponding activity data (e.g., activity data associated with each client identifier). The corresponding activity data may be indicative of corresponding engagements of user devices associated with the corresponding client identifier. Based on the first client interest cloud and the plurality of client interest clouds, the analytics subsystem 142 may determine a plurality of client clusters. The analytics subsystem 142 may determine the plurality of client clusters using an unsupervised machine learning model. Each client cluster may be indicative of one or more client identifiers that are associated with similar client interest clouds. For example, one or more client identifiers may be associated with similar client interest clouds based on similar media assets offered by each client (e.g., based on content features, interest attributes, etc.) and/or similar engagements associated with each client (e.g., based on user interactions).

The analytics subsystem 142 may select the client model 1560 based on the particular client cluster in which the first client identifier is clustered/associated with. For example, the first client identifier may be part of a first client cluster comprising at least one additional client identifier. The first client identifier and the at least one additional client identifier may each be associated with separate machine learning models. The analytics subsystem 142 may select one of the separate machine learning models as the client model 1550 based on an Area Under the Curve (AUC) calculation and/or a Mean Average Recall at K (MAR@K) calculation, where K is defined depending on the cluster. Additionally, or in the alternative, the analytics subsystem 142 may select one of the separate machine learning models as the client model 1560 based on a particular use case. For example, the analytics subsystem 142 may select the client model 1560 from the plurality of machine learning models based on a recommendation type associated with the at least one content recommendation. The recommendation type may comprise, for example, a media asset recommendation, an engagement recommendation, a combination thereof, and/or the like.

The client model 1560 may determine the at least one content recommendation 1570 based on the plurality of engagements (e.g., activity data 1530) and the user interest cloud 1540. The at least one content recommendation 1570 may include—or be associated with—at least one media asset of the plurality of media assets. The client model 1560 may then cause the user device to output the at least one content recommendation 1570. For example, the client model 1560 may cause the client application 106 to output (e.g., present, display, show, etc.) a media asset associated with the at least one content recommendation 1570.

The at least one content recommendation 1570 may be accompanied by a certainty match (e.g., cosine similarity between two embedding vectors). As long as the certainty match is above a configurable threshold (e.g., 0.8), it may be considered suitable for presentation to the user 1520. In some cases, multiple recommendations 1570 may be presented, and in others, only one may be presented. These recommendations 1570 may also be filtered for content the user 1520 has already encountered in the past, so the user 1520 is not provided with a recommendation 1570 that includes content with which the user 1520 has already engaged.

As described herein, the analytics subsystem 142 may retrain the machine learning model. For example, the analytics subsystem 142 may retrain the client model 1560 on a periodic basis or in response to a triggering event. The analytics subsystem 142 may receive further activity data 1574 associated with a plurality of users 1572 of a client 1570 (e.g., a third-party subsystem 610). The further activity data 1574 may be indicative of at least one further engagement of a user device associated with at least one of the user 1572 with at least one further media asset of a plurality media assets 1576.

The analytics subsystem 142 may update the user interest clouds corresponding to the users 1572 based on the further activity data 1574. The user interest clouds may each be indicative of a level of interest associated with each media asset of the plurality of media assets 1576. The analytics subsystem 142 may determine at least one triggering event associated with the client application 106. For example, the analytics subsystem 142 may determine (e.g., identify/detect) the at least one triggering event based on a threshold quantity of time that the client application 106 is inactive at one or more of the user devices associated with the users 1572. As another example, the analytics subsystem 142 may determine the at least one triggering event based on an expiration of a quantity of time since the client model 1560 was trained (e.g., a predetermined/preset amount of time). As a further example, the analytics subsystem 142 may determine the at least one triggering event based on a threshold quantity of new media assets 1576 associated with the client application 106 and/or the particular client 1570. In still a further example, the analytics subsystem 142 may determine the at least one triggering event based on the plurality of further activity data 1574 (e.g., new activity data). In response to determining the at least one triggering event, the analytics subsystem 142 may retain the client model 1560.

Any of the machine learning models or scoring models described herein, such as the scoring models 248 or the client model 1560, may be trained and/or retrained using training datasets comprising user activity data and/or UICs. The training datasets may comprise UICs associated with users who interacted with (e.g., engaged with) a plurality of media assets. The UICs that are used during training and/or retraining may comprise interest attributes, interest levels, functionality features, a content features, a combination thereof, and/or the like. A machine learning module, such as the machine learning module 1620 shown in FIG. 16, may then determine which features in the UICs correlate with the particular features of the plurality of media assets. The machine learning models, once trained (or retrained as the case may be), may provide a recommendation for a user(s) and a media asset(s) based on the corresponding UIC(s) and the features of that media asset.

Figure 16:
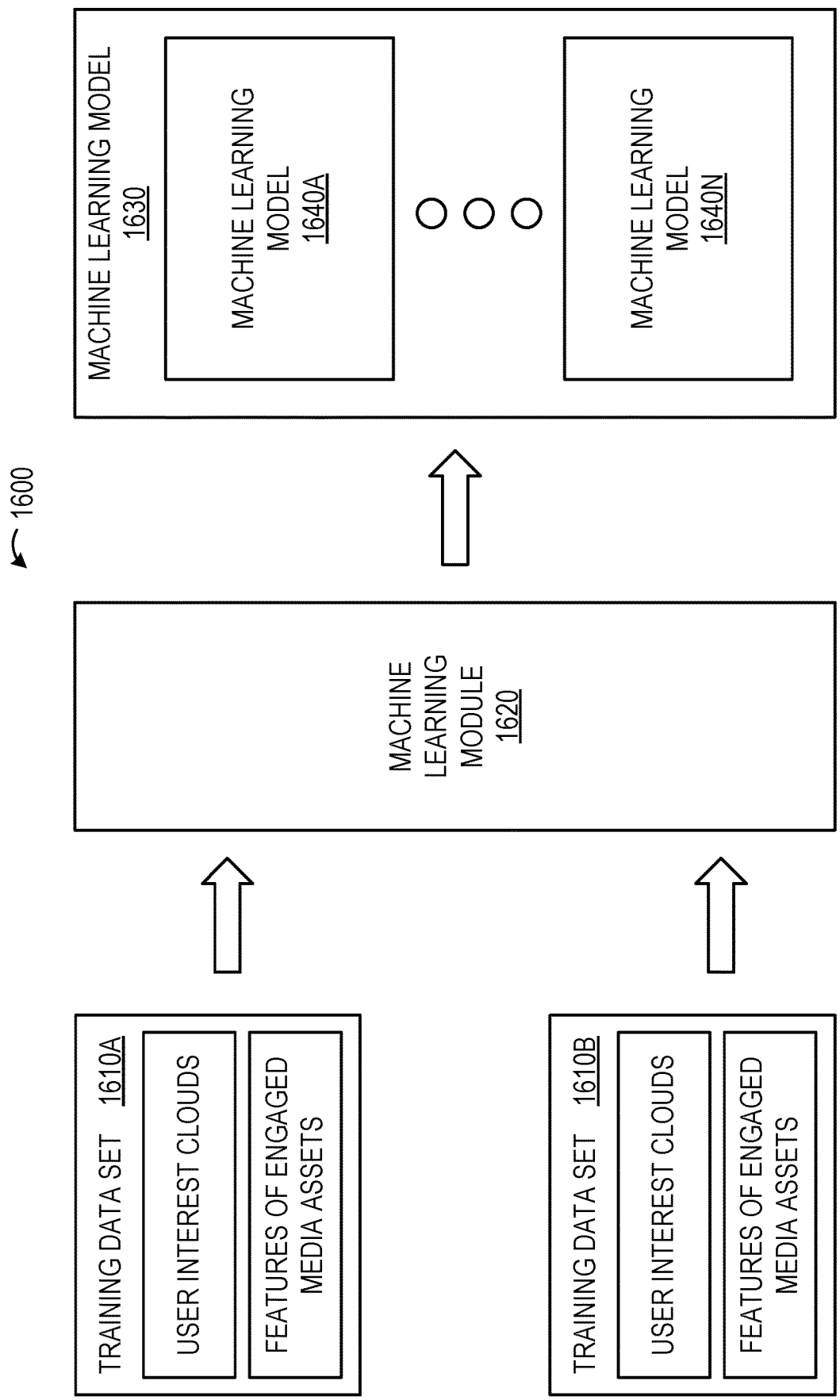
FIG. 16 illustrates an example system, in accordance with one or more embodiments of the disclosure.

Any of the machine learning models or scoring models described herein may be referred to as "at least one machine learning model 1630" or simply the "machine learning model 1630," as shown in FIG. 16. The at least one machine learning model 1630 may be trained by a system 1600 shown in FIG. 16. The system 1600 may be configured to use machine learning techniques to train, based on an analysis of one or more training datasets 1610A-1610B by a machine learning module 1620, the at least one machine learning model 1630. The at least one machine learning model 1630, once trained, may be configured to determine a prediction that a media asset is of interest to a particular user or not of interest to the particular user. A dataset indicative of a plurality of media assets and a labeled (e.g., predetermined/known) prediction indicating whether the corresponding media assets are of interest to a particular user (e.g., contain one or more content features that may be of interest) or not may be used by the machine learning module 1620 to train the at least one machine learning model 1630. Each of the plurality of media assets in the dataset may be associated with a plurality of features that are present within each corresponding media asset. The plurality of features and the labeled predictions may be used to train the at least one machine learning model 1630.

The training dataset 1610A may comprise a first portion of the plurality of media assets in the dataset. Each media asset in the first portion may have a labeled (e.g., predetermined) prediction and one or more labeled features. The training dataset 1610B may comprise a second portion of the plurality of media assets in the dataset. Each media asset in the second portion may have a labeled (e.g., predetermined) prediction and one or more labeled features. The plurality of media assets may be randomly assigned to the training dataset 1610A, the training dataset 1610B, and/or to a testing dataset. In some implementations, the assignment of media assets to a training dataset or a testing dataset may not be completely random. In this case, one or more criteria may be used during the assignment, such as ensuring that similar numbers of media assets with different predictions and/or features are in each of the training and testing datasets. In general, any suitable method may be used to assign the media assets to the training or testing datasets, while ensuring that the distributions of predictions and/or features are somewhat similar in the training dataset and the testing dataset.

The machine learning module 1620 may use the first portion and the second portion of the plurality of media assets to determine one or more features that are indicative of a high prediction. That is, the machine learning module 1620 may determine which features present within the plurality of media assets are correlative with a high prediction. The one or more features indicative of a high prediction may be used by the machine learning module 1620 to train the machine learning model 1630. For example, the machine learning module 1620 may train the machine learning model 1630 by extracting a feature set (e.g., one or more features) from the first portion in the training dataset 1610A according to one or more feature selection techniques. The machine learning module 1620 may further define the feature set obtained from the training dataset 1610A by applying one or more feature selection techniques to the second portion in the training dataset 1610B that includes statistically significant features of positive examples (e.g., high predictions) and statistically significant features of negative examples (e.g., low predictions). The machine learning module 1620 may train the machine learning model 1630 by extracting a feature set from the training dataset 1610B that includes statistically significant features of positive examples (e.g., high predictions) and statistically significant features of negative examples (e.g., low predictions).

The machine learning module 1620 machine learning module 1620 may extract a feature set from the training dataset 1610A and/or the training dataset 1610B in a variety of ways. For example, the machine learning module 1620 may extract a feature set from the training dataset 1610A and/or the training dataset 1610B using a classification module (e.g., a machine learning model). The machine learning module 1620 may perform feature extraction multiple times, each time using a different feature-extraction technique. In one example, the feature sets generated using the different techniques may each be used to generate different machine learning models 1640. For example, the feature set with the highest quality features (e.g., most indicative of interest or not of interest to a particular user(s)) may be selected for use in training. The machine learning module 1620 may use the feature set(s) to build one or more machine learning models 1640A-1640N that are configured to determine a prediction for a new, unseen media asset.

The training dataset 1610A and/or the training dataset 1610B may be analyzed to determine any dependencies, associations, and/or correlations between features and the labeled predictions in the training dataset 1610A and/or the training dataset 1610B. The identified correlations may have the form of a list of features that are associated with different labeled predictions (e.g., of interest to a particular user vs. not of interest to a particular user). The term "feature," as used herein, may refer to any characteristic of an item of data that may be used to determine whether the item of data falls within one or more specific categories or within a range. By way of example, the features described herein may comprise one or more features present within each of the media assets that may be correlative (or not correlative as the case may be) with a particular media asset being of interest to a particular user or not. As another example, the features described herein may comprise an interest attribute, an interest level, a functionality feature, or a content feature (e.g., a content topic, a content concept, content subject matter, a content them, etc.) as further described and defined herein.

A feature selection technique may comprise one or more feature selection rules. The one or more feature selection rules may comprise a feature occurrence rule. The feature occurrence rule may comprise determining which features in the training dataset 1610A occur over a threshold number of times and identifying those features that satisfy the threshold as candidate features. For example, any features that appear greater than or equal to 5 times in the training dataset 1610A may be considered as candidate features. Any features appearing less than, for example, 5 times may be excluded from consideration as a candidate feature. Other threshold numbers may be used as well.

A single feature selection rule may be applied to select features or multiple feature selection rules may be applied to select features. The feature selection rules may be applied in a cascading fashion, with the feature selection rules being applied in a specific order and applied to the results of the previous rule. For example, the feature occurrence rule may be applied to the training dataset 1610A to generate a first list of features. A final list of features may be analyzed according to additional feature selection techniques to determine one or more candidate feature groups (e.g., groups of features that may be used to determine a prediction). Any suitable computational technique may be used to identify the feature groups using any feature selection technique such as filter, wrapper, and/or embedded methods. One or more candidate feature groups may be selected according to a filter method. Filter methods include, for example, Pearson's correlation, linear discriminant analysis, analysis of variance (ANOVA), chi-square, combinations thereof, and the like. The selection of features according to filter methods are independent of any machine learning algorithms used by the system 1600. Instead, features may be selected on the basis of scores in various statistical tests for their correlation with the outcome variable (e.g., a prediction).

As another example, one or more candidate feature groups may be selected according to a wrapper method. A wrapper method may be configured to use a subset of features and train the machine learning model 1630 using the subset of features. Based on the inferences that may be drawn from a previous model, features may be added and/or deleted from the subset. Wrapper methods include, for example, forward feature selection, backward feature elimination, recursive feature elimination, combinations thereof, and the like. For example, forward feature selection may be used to identify one or more candidate feature groups. Forward feature selection is an iterative method that begins with no features. In each iteration, the feature which best improves the model is added until an addition of a new variable does not improve the performance of the model. As another example, backward elimination may be used to identify one or more candidate feature groups. Backward elimination is an iterative method that begins with all features in the model. In each iteration, the least significant feature is removed until no improvement is observed on removal of features. Recursive feature elimination may be used to identify one or more candidate feature groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more candidate feature groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the machine learning module 1620 has generated a feature set(s), the machine learning module 1620 may generate the one or more machine learning models 1640A-1640N based on the feature set(s). A machine learning model (e.g., any of the one or more machine learning models 1640A-1640N) may refer to a complex mathematical model for data classification that is generated using machine-learning techniques as described herein. In one example, a machine learning model may include a map of support vectors that represent boundary features. By way of example, boundary features may be selected from, and/or represent the highest-ranked features in, a feature set.

The machine learning module 1620 may use the feature sets extracted from the training dataset 1610A and/or the training dataset 1610B to build the one or more machine learning models 1640A-1640N for each classification category (e.g., "of interest to a particular user media asset" and "not of interest to the particular user media asset"). In some examples, the one or more machine learning models 1640A-340N may be combined into a single machine learning model 1640 (e.g., an ensemble model). Similarly, the machine learning model 1630 may represent a single classifier containing a single or a plurality of machine learning models 1640 and/or multiple classifiers containing a single or a plurality of machine learning models 1640 (e.g., an ensemble classifier).

The extracted features (e.g., one or more candidate features) may be combined in the one or more machine learning models 1640A-1640N that are trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting machine learning model 1630 may comprise a decision rule or a mapping for each candidate feature in order to assign a prediction to a class (e.g., of interest to a particular user vs. not of interest to the particular user). As described herein, the machine learning model 1630 may be used to determine predictions for media assets. The candidate features and the machine learning model 1630 may be used to determine predictions for media assets in the testing dataset (e.g., a third portion of the plurality of media assets).

Figure 17:
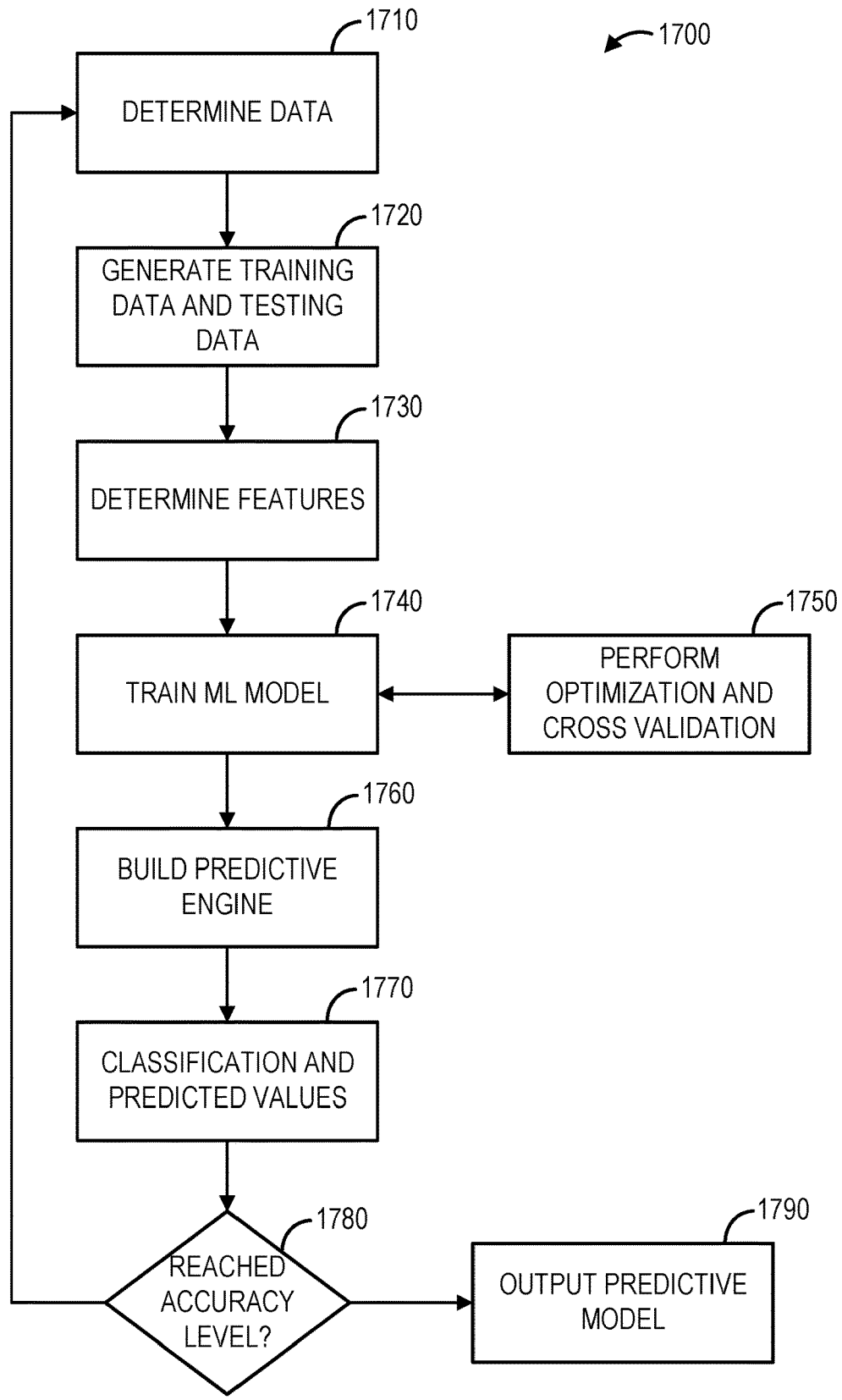
FIG. 17 illustrates a flowchart for an example method, in accordance with one or more embodiments of this disclosure.

FIG. 17 shows a flowchart illustrating an example training method 1700 for generating the machine learning model 1630 using the machine learning module 1620. The machine learning module 1620 may implement supervised, unsupervised, and/or semi-supervised (e.g., reinforcement based) machine learning models 1640A-1640N. The method 1700 illustrated in FIG. 17 is an example of a unsupervised learning method; variations of this example of training method are discussed below, however, other training methods may be analogously implemented to train unsupervised and/or semi-supervised machine learning models. The method 1700 may be implemented by any one of the devices, components, units, or modules shown in FIG. 1-3, 5-7, 9, or 12-16.

At step 1710, the training method 1700 may determine (e.g., access, receive, retrieve, etc.) first media assets and second media assets. The first media assets and the second media assets may each comprise one or more features and a predetermined prediction (e.g., a recommendation, one or more segments associated with one or more content features, etc.). The training method 1700 may generate, at step 1720, a training dataset and a testing dataset. The training dataset and the testing dataset may be generated by randomly assigning media assets from the first media assets and/or the second media assets to either the training dataset or the testing dataset. In some implementations, the assignment of media assets as training or test samples may not be completely random. As an example, only the media assets for a specific feature(s) and/or range(s) of predetermined predictions may be used to generate the training dataset and the testing dataset. As another example, a majority of the media assets for the specific feature(s) and/or range(s) of predetermined predictions may be used to generate the training dataset. For example, 75% of the media assets for the specific feature(s) and/or range(s) of predetermined predictions may be used to generate the training dataset and 25% may be used to generate the testing dataset.

The training method 1700 may determine (e.g., extract, select, etc.), at step 1730, one or more features that may be used by, for example, a classifier to differentiate among different classifications (e.g., predictions/recommendations). The one or more features may comprise a set of features. As an example, the training method 1700 may determine a set features from the first media assets. As another example, the training method 1700 may determine a set of features from the second media assets. In a further example, a set of features may be determined from other media assets of the plurality of media assets (e.g., a third portion) associated with a specific feature(s) and/or range(s) of predetermined predictions that may be different than the specific feature(s) and/or range(s) of predetermined predictions associated with the media assets of the training dataset and the testing dataset. In other words, the other media assets (e.g., the third portion) may be used for feature determination/selection, rather than for training. The training dataset may be used in conjunction with the other media assets to determine the one or more features. The other media assets may be used to determine an initial set of features, which may be further reduced using the training dataset.

The training method 1700 may train one or more machine learning models (e.g., one or more machine learning models, neural networks, deep-learning models, text-based learning models, large language models, natural language processing applications/models, generative pre-trained transformers, etc.) using the one or more features at step 1740. In one example, the machine learning models may be trained using supervised learning. In another example, other machine learning techniques may be used, including unsupervised learning and semi-supervised. The machine learning models trained at step 1740 may be selected based on different criteria depending on the problem to be solved and/or data available in the training dataset. For example, machine learning models may suffer from different degrees of bias. Accordingly, more than one machine learning model may be trained at 1740, and then optimized, improved, and cross-validated at step 1750.

The training method 1700 may select one or more machine learning models to build the machine learning model 1630 at step 1760. The machine learning model 1630 may be evaluated using the testing dataset. The machine learning model 1630 may analyze the testing dataset and generate classification values and/or predicted values (e.g., predictions) at step 1770. Classification and/or prediction values may be evaluated at step 1780 to determine whether such values have achieved a desired accuracy level. Performance of the machine learning model 1630 may be evaluated in a number of ways based on a number of true positives, false positives, true negatives, and/or false negatives classifications of the plurality of data points indicated by the machine learning model 1630.

For example, the false positives of the machine learning model 1630 may refer to a number of times the machine learning model 1630 incorrectly assigned a high prediction to a media asset associated with a low predetermined prediction. Conversely, the false negatives of the machine learning model 1630 may refer to a number of times the machine learning model assigned a low prediction to a media asset associated with a high predetermined prediction. True negatives and true positives may refer to a number of times the machine learning model 1630 correctly assigned predictions to media assets based on the known, predetermined prediction for each media asset. Related to these measurements are the concepts of recall and precision. Generally, recall refers to a ratio of true positives to a sum of true positives and false negatives, which quantifies a sensitivity of the machine learning model 1630. Similarly, precision refers to a ratio of true positives a sum of true and false positives. When such a desired accuracy level is reached, the training phase ends and the machine learning model 1630 may be output at step 1790; when the desired accuracy level is not reached, however, then a subsequent iteration of the training method 1700 may be performed starting at step 1710 with variations such as, for example, considering a larger collection of media assets. The machine learning model 1630 may be output at step 1790. The machine learning model 1630 may be configured to determine predicted predictions for media assets that are not within the plurality of media assets used to train the machine learning model.

Figure 18:
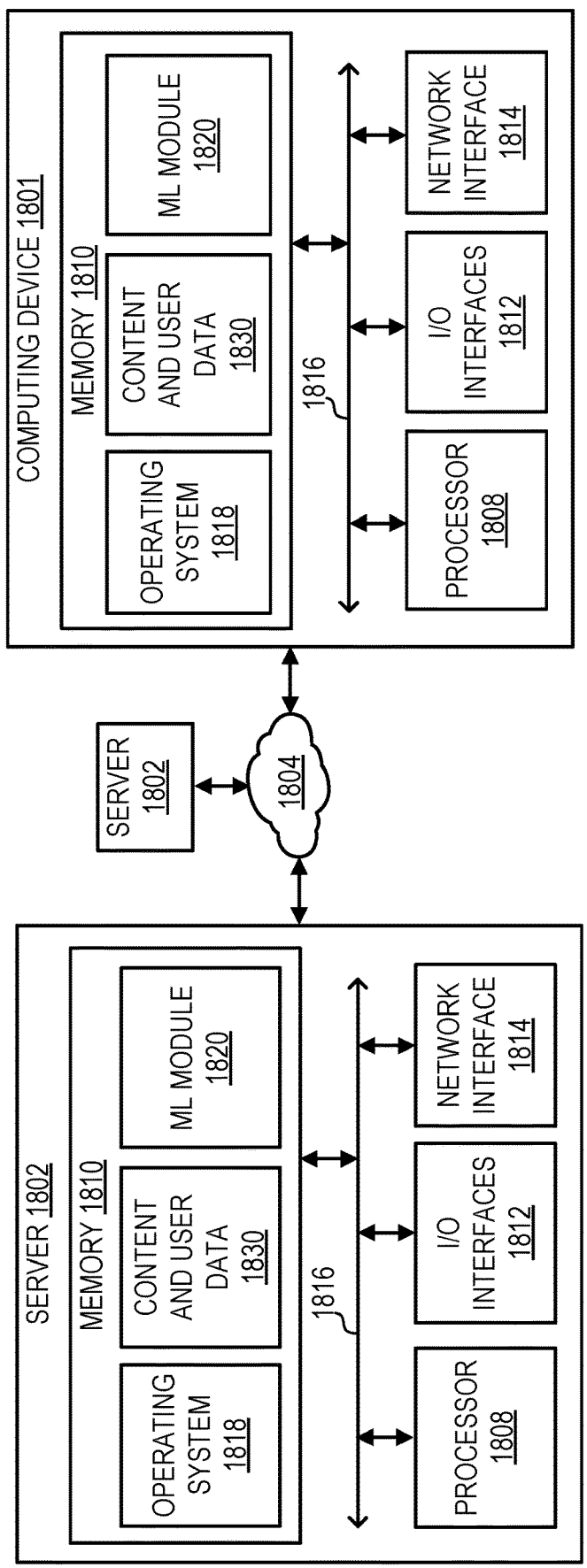
FIG. 18 illustrates an example system, in accordance with one or more embodiments of this disclosure.

As discussed herein, the present methods and systems may be computer-implemented. FIG. 18 shows a block diagram depicting an environment 1800 comprising non-limiting examples of a computing device 1801 and a server 1802 connected via a network 1804. The computing device 1801 and/or the server 1802 may be any one of the devices, components, units, or modules shown in FIG. 1-3, 5-7, 9, or 12-16. In an aspect, some or all steps of any described method herein may be performed on a computing device as described herein. The computing device 1801 may comprise one or multiple computers configured to store one or more of a machine learning module 1820, content and user data 1830, and the like. The machine learning module 1820 may comprise, for example, the machine learning module 1620 and/or the at least one machine learning model 1630 described herein (or a component(s) thereof). The server 1802 may comprise one or multiple computers configured to store one or more of the machine learning module 1820, the content and user data 1815, and the like. Multiple servers 1802 may communicate with the computing device 1801 via the through the network 1804.

The computing device 1801 and the server 1802 may each be a digital computer that, in terms of hardware architecture, generally includes a processor 1808, memory system 1810, input/output (I/O) interfaces 1812, and network interfaces 1814. These components (1808, 1810, 1812, and 1814) are communicatively coupled via a local interface 1816. The local interface 1816 may be, for example, but not limited to, one or more buses or other wired or wireless connections, as is known in the art. The local interface 1816 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1808 may be a hardware device for executing software, particularly that stored in memory system 1810. The processor 1808 may be any custom made or commercially available processor, a central processing unit (CPU), an auxiliary processor among several processors associated with the computing device 1801 and the server 1802, a semiconductor-based microprocessor (in the form of a microchip or chip set), or generally any device for executing software instructions. When the computing device 1801 and/or the server 1802 is in operation, the processor 1808 may be configured to execute software stored within the memory system 1810, to communicate data to and from the memory system 1810, and to generally control operations of the computing device 1801 and the server 1802 pursuant to the software.

The I/O interfaces 1812 may be used to receive user input from, and/or for providing system output to, one or more devices or components. User input may be received via, for example, a keyboard and/or a mouse. System output may comprise a display device and a printer (not shown). I/O interfaces 1812 may include, for example, a serial port, a parallel port, a Small Computer System Interface (SCSI), an infrared (IR) interface, a radio frequency (RF) interface, and/or a universal serial bus (USB) interface.

The network interface 1814 may be used to transmit and receive from the computing device 1801 and/or the server 1802 on the network 1804. The network interface 1814 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi, cellular, satellite), or any other suitable network interface device. The network interface 1814 may include address, control, and/or data connections to enable appropriate communications on the network 1804.

The memory system 1810 may include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 1810 may incorporate electronic, magnetic, optical, and/or other types of storage media. Note that the memory system 1810 may have a distributed architecture, where various components are situated remote from one another, but may be accessed by the processor 1808.

The software in memory system 1810 may include one or more software programs, each of which comprises an ordered listing of executable instructions for implementing logical functions. In the example of FIG. 18, the software in the memory system 1810 of the computing device 1801 may comprise and/or control the machine learning module 1820. The machine learning module 1820 may store and/or have access to training data (content and user data 1830) as described herein. Further, the software in the memory system 1810 may comprise a suitable operating system (O/S) 1818. The operating system 1818 essentially controls the execution of other computer programs and provides scheduling, input-output control, file and data management, memory management, and communication control and related services.

For purposes of illustration, application programs and other executable program components such as the operating system 1818 are illustrated herein as discrete blocks, although it is recognized that such programs and components may reside at various times in different storage components of the computing device 1801 and/or the server 1802. An implementation of the training module 1820 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media". "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

Figure 19A:
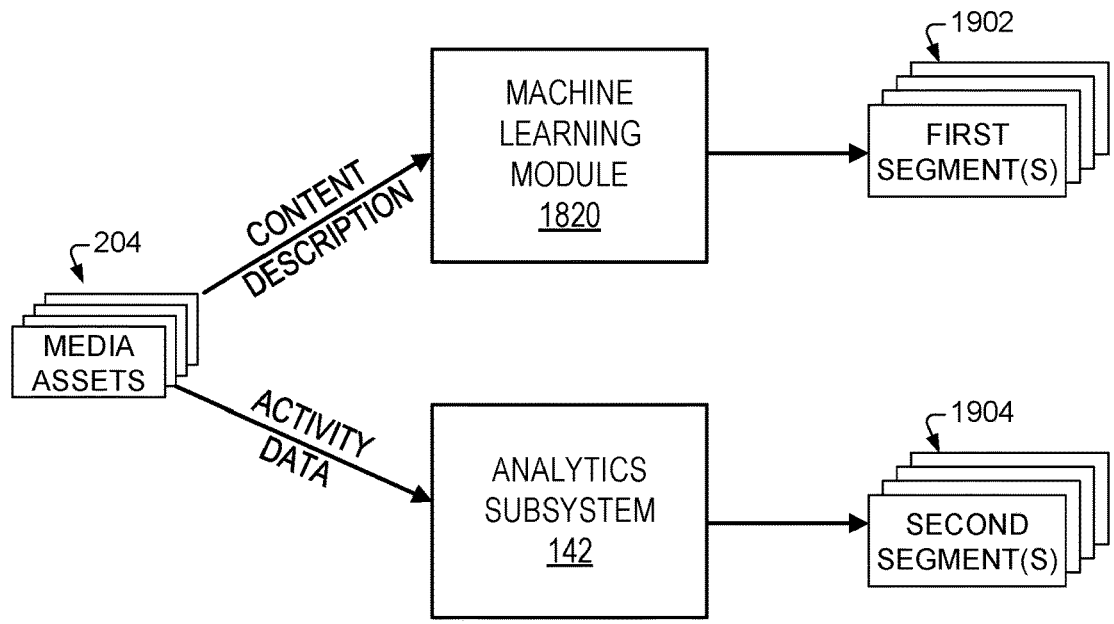
FIG. 19A illustrates an example system, in accordance with one or more embodiments of this disclosure.

FIG. 19A shows an example system comprising the machine learning module 1820 (e.g., the machine learning module 1620) and the analytics subsystem 142. The example of the machine learning module 1820 shown in FIG. 19A may generate, train, output, and/or use a machine learning model(s), a text-based learning model(s), a natural language processing application(s), a generative pre-trained transformer(s), etc.). The machine learning module 1820 may include one or more modules (e.g., sub-modules/sub-components), such as a language model and the at least one machine learning model 1630 (or a component(s) thereof) as described further herein.

The data extracted from the media assets may comprise a content description, a content type, a content rating, content metadata, a date of creation, a content tag, a content category, a transcript, a content filter, a language, text data associated with the media asset, a content description, speaker identification data, talk time data, sentiment data, and/or the engagement data. The machine learning module 1820 may comprise a language model, such as a pre-trained deep-learning AI large language model trained to generate text and/or other types of content or portions of the content from an input such as the content description(s) for a particular media asset(s). As described herein, a content description for a media asset may be determined by the analytics subsystem 142, the captioning module 1302 (e.g., an automated speech recognition engine), and/or a third-party application. Other examples are possible as well. The machine learning module 1820 (e.g., the language model) may be based on one or more of: the OpenAI GPT-3 language model, Google LAMBDA, BigScience BLOOM, Multitask Unified Model (MUM), one or more other transformer-based language models, a combination thereof, and/or the like.

As shown in FIG. 19A, the machine learning module 1820 may receive the content description for a media asset 204 and determine (e.g., identify) one or more first segments 1902 of the media asset representative of a "key moment" of the media asset. For example, a "key moment" may be associated with one or more content topics, content concepts, content subject matter, content themes, etc. The machine learning module 1820 may be configured to determine/select the one or more first segments 1902 in addition to a confidence score (e.g., from 0 to 1) associated with each of the one or more first segments 1902. The confidence score may be indicative of a level of confidence that the particular segment comprises a portion of the media asset representative of a "key moment" of the media asset.

The one or more first segments 1902 may be included within a compilation of segments of the media asset that represent one or more key moment(s) of the media asset. The analytics subsystem 142 may be further configured to determine one or more other/second segments 1904 of the media asset associated with one or more key moment(s) of the media asset. For example, as shown in FIG. 19A, the analytics subsystem 142 may receive the activity data associated with the media asset and determine the one or more second segments 1904. The one or more second segments 1904 of the media asset may be associated with user interactions satisfying a second threshold (e.g., a threshold level of interest or engagement) based on the corresponding engagement data (e.g., derived/determined from the activity data).

Figure 19B:
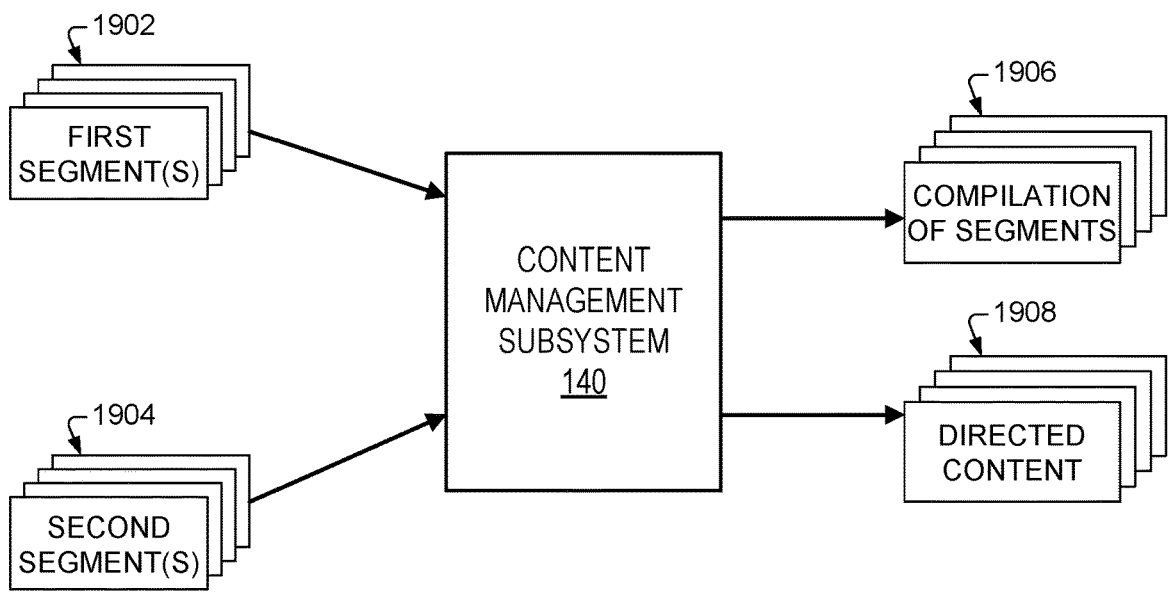
FIG. 19B illustrates an example system, in accordance with one or more embodiments of this disclosure.

As described herein, the content management subsystem 140 can permit creating directed content 1908 as shown in FIG. 19B, such as by generating, curating, and/or disseminating interactive webinar and video experiences and other multimedia content to distributed audience segments with relevant messaging, offers, and calls-to-action (e.g., view video, listen to podcast, signup for newsletter, attend a tradeshow, etc.). The content management subsystem 140 may receive, as shown in FIG. 19B, the one or more first segments 1902 and the one or more second segments 1904. The content management subsystem 140 may include the one or more second segments 1904 that satisfy the second threshold within a compilation of segments 1906 of the media asset (e.g., with the one or more first segments 1902).

Each segment of the media asset may be scored via the machine learning module 1820 and/or the analytics subsystem 142 based on the user engagement data (e.g., engagement data obtained from the activity data 244). For example, the one or more first segments 1902 of the media asset determined via the machine learning module 1820 may be associated with (e.g., assigned) a first score and the one or more second segments 1904 of the media asset determined via the analytics subsystem 142 based on the activity data/engagement data may be associated with (e.g., assigned) a second score. The first score may be determined via the machine learning module 1820 (e.g., text-based learning model, large language model, natural language processing application, a generative pre-trained transformer, etc.). For example, as described herein, the machine learning module 1820 may be configured to determine/select the one or more first segments 1902 in addition to a confidence score (e.g., from 0 to 1) associated with each of the one or more first segments 1902. The confidence score may be indicative of a level of confidence that the particular segment comprises a portion of the media asset representative of a "key moment" of the media asset.

The second score may be determined (e.g., via the analytics subsystem 142) based on a number of interactions associated with each second segment of the one or more second segments 1904. The number of interactions may be compared with a number of expected interactions for each second segment based on the duration of each second segment and a total number of interactions associated with the entire duration of the media asset. Each interaction may be scored based on the comparison, wherein weighting may be applied to each relative score. The relative scores may be summed together based on the applied weighting to determine the second score. Since the one or more first segments 1902 determined via the machine learning module 1820 may not comprise the same segments as the one or more second segments 1904, the first score may be determined by determining each of the one or more first segments 1902 that occur completely or partially within the one or more second segments 1904 and determining the highest score (e.g., highest confidence score) for each of the one or more second segments 1904.

As an example, the second score may be determined based on the number of interactions (e.g., reactions, clicks and/or buying signals, and/or questions) associated with the duration of the media asset. For example, for each second segment, a value T may be determined based on dividing the duration of the second segment by the total duration of the media asset. For example, a value R may be determined based on dividing a number of reactions associated with the second segment by a total number of reactions associated with the media asset, wherein a value RF may be determined based on dividing R by T. For example, a value B may be determined based on dividing a number of clicks and/or buying signals associated with the second segment by a total number of clicks and/or buying signals associated with the media asset, wherein a value BF may be determined based on dividing B by T. For example, a value Q may be determined based on dividing a number of questions associated with the second segment by a total number questions associated with the media asset, wherein a value QF may be determined based on dividing Q by T. As an example, the second score may be determined based on a sum of 2*RF, BF, and QF. In an example, each of the values RF, BF, and QF may disregarded (e.g., set to 0) if each of the total number of reactions, the total number of clicks and/or buying signals, and/or total number of clicks, respectively, do not satisfy one or more thresholds. For example, if the total number of reactions is less than a threshold number of reactions, RF may be set to 0, if the total number of clicks and/or buying signals is less than a threshold number of clicks and/or buying signals, QF may be set to 0, and/or if the total number of questions is less than a threshold number of questions, QF may be set to 0.

As an example, the second score may be determined based on a method similar to the method for determining the engagement scores (e.g., diagram 510, as shown in FIG. 5), as previously discussed above.

Since the first score range may not match the second score range, a first weight may be associated (e.g., assigned) to the first scores of the one or more first segments 1902 and a second weight may be associated (e.g., assigned) to the second scores of the one or more second segments 1904. A constant may then be applied (e.g., added) to the weighted first scores and the weighted second scores to determine a similar range across the weighted first scores and the weighted second scores. A final weighting may be applied to the weighted first scores and the weighted second scores. For example, X % of one weighted score may be determined and (100–X) % of the other score may be determined, and thus, a ratio of the weighted scores may be determined (e.g., 10/90, 20/80, 40/60, 50/50, 60/40, 80/20, 90/10, etc.).

The compilation of segments 1906 may be determined based on the final weighted scores. For example, the one or more first segments 1902 and the one or more second segments 1904 may be ordered based on the final weighted scores. The compilation of segments 1906 may be determined based on the segments associated with the highest scores (e.g., top 5, top 3, etc.). In an example, the compilation of segments 1906 may further include the remaining segments of the one or more first segments 1902 and the one or more second segments 1904 that satisfy a score threshold (e.g., 3.0, 2.0, etc.) and a duration threshold (e.g., a percentage duration of the total duration of the media asset).

In some examples, the studio module 1304 (shown in FIG. 13A) and/or the interface module 1301 (shown in FIG. 13B) may be used to edit the compilation of segments 1906. For example the production environment of the studio module 1304 described herein may enable the administrators and/or presenters of a webinar to customize the compilation of segments 1906. For example, the administrators and/or presenters may use the production environment to select one or more segments of the compilation of segments 1906, remove one or more segments from the compilation of segments 1906, output the compilation of segments 1906, etc. In an example, the administrators and/or presenters may use the production environment to add one or more third segments of the media asset to the compilation of segments 1906. The one or more third segments may comprise a segment(s) that is not within the one or more first segments 1902 and/or the one or more second segments 1904. The production environment may comprise a plurality of customization elements (e.g., customization elements 1301F) that may allow the compilation of segments 1906 to be customized as discussed above.

In an example, the content management subsystem 140 may be configured to generate directed content 1908 based on data associated with a plurality of attributes associated with one or more users, the compilation of segments 1906, and the data extracted from the media asset. Directed content 1908 can include, for example, digital media of various types, such as an advertisement(s); a curated e-mail(s), a survey(s) or other type(s) of questionnaire(s); a motion picture(s), an animation(s), or other types of video segments; a podcast(s); an audio segment(s) of defined durations (e.g., a portion of a speech or tutorial); and similar media.

FIG. 20 shows a flowchart of an example method 2000 for selection of personalized content. Method 2000 may be performed in whole or in part by a single computing device, a plurality of computing devices, and the like. For example, any one of the devices, components, units, or modules shown in FIG. 1-3, 5-7, 9, or 12-16 may be configured to perform the method 2000. The computing device(s) that performs the steps of the method 2000 may comprise a machine learning model, such as the client model 1560, the machine learning model 1630, and/or the machine learning model 1820.

At step 2010, the computing device, via one or more user devices, may receive engagement data associated with a media asset and the one or more user devices. The media asset may comprise one or more of a virtual event, webinar, a video, a document, or a webpage. The engagement data may be associated with a plurality of engagements of one or more user devices with the media asset via a client application (e.g., the client application 106). As an example, the engagement data may be received in real-time corresponding to the plurality of engagements. The engagement data may be associated with a period of time. The plurality of engagements may comprise at least one of: a plurality of user interactions with a user interface of the client application during output of the media asset; a quantity of time that the media asset was output at the one or more user devices; a quantity of mute actions performed by the one or more user devices during output of the media asset; a level of volume associated with output of the media asset at the one or more user devices; or a duration of inactivity of the client application at the one or more user devices during output of the media asset.

At step 2020, the computing device, via a machine learning model, may determine one or more first segments of the media asset associated with one or more content features satisfying a first threshold. For example, data associated with the media asset may be provided to the machine learning model, wherein the machine learning model may determine the one or more first segments associated with the one or more content features satisfying the first threshold based on the data associated with the media asset. The machine learning model may comprise one or more of a text-based learning model, a large language model, a natural language processing application, or a generative pre-trained transformer. The one or more content features may comprise one or more of content topics, content concepts, content subject matter, or content themes. In an example, the data associated with the media asset may be extracted from the media asset. The data associated with the media asset may comprise one or more of a content type, a content rating, content metadata, a date of creation, a content tag, a content category, a transcript, a content filter, a language, text data associated with the media asset, content description, speaker identification data, talk time data, sentiment data, and/or the engagement data.

At step 2030, the computing device may determine one or more second segments of the media asset associated with user interactions satisfying a second threshold based on the engagement data. For example, the computing device may determine one or more second segments having a threshold level of user interest, level of engagement, etc. In an example, the computing device may determine one or more content features associated with interest attributes that meet or exceed an interest threshold. For example, the number of content features may be associated with a content description for each media asset. Accordingly, the interest threshold may comprise a threshold level of interest associated with one or more words of the content description. The interest threshold may include, for example, numerical levels of interest greater than 75% and textual levels of interest including "high" and "medium."

As an example, the computing device may determine the one or more content features that meet or exceed the interest threshold based on at least one content feature (e.g., the content description) and the associated interest attribute of each of the corresponding user interest clouds. The engagement data may be associated with a client identifier. For example, the presentation platform may provide/distribute media assets for a number of different clients (e.g., third-party subsystems as described herein), and each client may be associated with a unique client identifier. The computing device may generate a first interest cloud that is associated with the particular client identifier. For example, the analytics subsystem may generate the first interest cloud based on the interest attribute meeting or exceeding the interest threshold. The interest attribute may be associated with the corresponding content description.

At step 2040, the computing device may generate a compilation of segments of the media asset based on the one or more first segments satisfying the first threshold and the one of more second segments satisfying the second threshold. In an example, a first weight may be associated (e.g., assigned) to the one or more first segments that satisfy the first threshold. In addition, a second weight may be associated (e.g., assigned) to the one or more second segments that satisfy the second threshold. In an example, the first weight and the second weight may be manually assigned to the one or more first segments and the one or more second segments. The computing device may generate the compilation of segments based on the first weight and the second weight. For example, the one or more first segments and the one or more second segments may be compared based on the assigned weights (e.g., first weight and second weight), wherein at least one of the one or more first segments and/or at least one of the one or more second segments may be included in the compilation of segments based on the assigned weights. In an example, the computing device may receive, via a user interface, a selection of one or more segments of the compilation of segments. The computing device may be configured to remove the one or more segments from the compilation of segments or output the one or more segments of the compilation of segments. In an example, the computing device may receive, via a user interface, a selection of one or more third segments of the media asset. The computing device may be configured to add the one or more third segments to the compilation of segments. As an example, the user inputs may be received from one or more client devices via a third party application.

In an example, the computing device may generate directed content. For example, the computing device may generate directed content, via the machine learning, based on data indicative of a plurality of attributes associated with one or more users of the one or more user devices, the compilation of segments, and the data associated with the media asset. The plurality of attributes associated with the one or more users may comprise one or more of an age, a gender, a location, a profile title, an interest, past content consumption, a professional affiliation, a professional experience, an educational background or experience, a professional certification or license, or a BIC keyword. As an example, the computing device may generate the directed content based on data indicative of a plurality of similar user profiles. The computing device may determine the plurality of similar user profiles based on a plurality of attributes associated with one or more users. The computing device may generate the directed content, via the machine learning model, based on the plurality of similar profiles, the compilation of segments, and the data associated with the media asset. In an example, the computing device may determine the plurality of similar user profiles based on a first interest cloud associated with a first user profile, wherein the plurality of similar user profiles are associated with corresponding interest clouds that are similar to the first interest cloud. As an example, the computing device may determine the first interest cloud associated with the first user profile based on data indicative of a plurality of attributes associated with the one or more users of the one or more user devices. As an example, the computing device may determine the interest cloud associated with the first user profile based on a plurality of attributes associated with one or more second users of one or more second user devices. For example, the computing device may determine the plurality of similar user profiles based on users similar to the users that engaged with the media asset or users other than the users that engaged with the media asset.

In an example, the computing device may receive data indicative of one or more user interactions associated with each user of the one or more users based on the directed content. The data indicative of the one or more user interactions may be provided to the machine learning model. The computing device, via the machine learning model, may update the directed content based on the one or more user interactions. For example, the computing device may add or remove content to the directed content for output to one or more users.

At step 2050, the computing device may cause the compilation of segments of the media asset to be output. As an example, the computing device may output the compilation of segments to one or more second computing devices (e.g., client devices), wherein the one or more second computing devices may edit (e.g., removing, adding, etc.) the compilation of segments for further output to one or more user devices. As an example, the computing device may be configured to cause an output of the compilation of segments, send the compilation of segments to the one or more second computing device, and/or cause an output of the compilation of segments via the second computing devices.

In an example, the computing device may receive data indicative of a plurality of attributes associated with one or more users of the one or more user devices. For example, the computing device may tailor the compilation of segments of the media asset for specific segments of user audiences. The computing device, via the machine learning model, may determine one or more third segments of the media asset associated with one or more content features satisfying a third threshold based on the data associated with the media asset and the data indicative of the plurality of attributes associated with the one or more users. The computing device may generate a second compilation of segments of the media asset based on the one or more third segments satisfying the third threshold and the one of more second segments satisfying the second threshold. The computing device may cause the second compilation of segments of the media asset to be output. In an example, the computing device may be configured to cause an output of the second compilation of segments, send the second compilation of segments to the one or more second computing device, and/or cause an output of the second compilation of segments via the second computing devices.

FIG. 21 shows a flowchart of an example method 2100 for selection of personalized content. Method 2100 may be performed in whole or in part by a single computing device, a plurality of computing devices, and the like. For example, any one of the devices, components, units, or modules shown in FIG. 1-3, 5-7, 9, or 12-16 may be configured to perform the method 2100. The computing device(s) that performs the steps of the method 2000 may comprise a machine learning model, such as the client model 1560, the machine learning model 1630, and/or the machine learning model 1820.

At step 2110, the computing device, via one or more user devices, may receive engagement data associated with a media asset and the one or more user devices. The media asset may comprise one or more of a virtual event, webinar, a video, a document, or a webpage. The engagement data may be associated with a plurality of engagements of one or more user devices with the media asset via a client application (e.g., the client application 106). As an example, the engagement data may be received in real-time corresponding to the plurality of engagements. The engagement data may be associated with a period of time. The plurality of engagements may comprise at least one of: a plurality of user interactions with a user interface of the client application during output of the media asset; a quantity of time that the media asset was output at the one or more user devices; a quantity of mute actions performed by the one or more user devices during output of the media asset; a level of volume associated with output of the media asset at the one or more user devices; or a duration of inactivity of the client application at the one or more user devices during output of the media asset.

At step 2120, the computing device may receive data indicative of a plurality of attributes associated with one or more users of the one or more user devices. The plurality of attributes associated with the one or more users may comprise one or more of an age, a gender, a location, a profile title, an interest, past content consumption, a professional affiliation, a professional experience, an educational background or experience, a professional certification or license, or a BIC keyword.

At step 2130, the computing device may determine, via a machine learning model, one or more first segments of the media asset associated with one or more content features satisfying a first threshold. For example, data associated with the media asset and the data indicative of the plurality of attributes may be provided to the machine learning model, wherein the machine learning model may determine the one or more first segments of the media asset associated with one or more content features satisfying the first threshold based on the data associated with the media asset and the data indicative of the plurality of attributes. The machine learning model may comprise one or more of a text-based learning model, a large language model, a natural language processing application, or a generative pre-trained transformer. The one or more content features may comprise one or more content topics, content concepts, content subject matter, or content themes. In an example, the data associated with the media asset may be extracted from the media asset. The data associated with the media asset may comprise one or more of a content type, a content rating, content metadata, a date of creation, a content tag, a content category, a transcript, a content filter, a language, text data associated with the media asset, content description, speaker identification data, talk time data, sentiment data, and/or the engagement data.

At step 2140, the computing device may determine one or more second segments of the media asset associated with user interactions satisfying a second threshold based on the engagement data. For example, the computing device may determine one or more second segments having a threshold level of user interest, level of engagement, etc. In an example, the computing device may determine one or more content features associated with interest attributes that meet or exceed an interest threshold. For example, the number of content features may be associated with a content description for each media asset. Accordingly, the interest threshold may comprise a threshold level of interest associated with one or more words of the content description. The interest threshold may include, for example, numerical levels of interest greater than 75% and textual levels of interest including "high" and "medium."

As an example, the computing device may determine the one or more content features that meet or exceed the interest threshold based on at least one content feature (e.g., the content description) and the associated interest attribute of each of the corresponding user interest clouds. The engagement data may be associated with a client identifier. For example, the presentation platform may provide/distribute media assets for a number of different clients (e.g., third-party subsystems as described herein), and each client may be associated with a unique client identifier. The computing device may generate a first interest cloud that is associated with the particular client identifier. For example, the analytics subsystem may generate the first interest cloud based on the interest attribute meeting or exceeding the interest threshold. The interest attribute may be associated with the corresponding content description.

At step 2150, the computing device may generate a compilation of segments of the media asset for output. For example, the computing device may generate the compilation of segments based on the one or more first segments satisfying the first threshold and the one of more second segments satisfying the second threshold. In an example, first weight may be associated (e.g., assigned) to the one or more first segments that satisfy the first threshold. In addition, a second weight may be associated (e.g., assigned) to the one or more second segments that satisfy the second threshold. In an example, the first weight and the second weight may be manually assigned to the one or more first segments and the one or more second segments. The computing device may generate the compilation of segments based on the first weight and the second weight. For example, the one or more first segments and the one or more second segments may be compared based on the assigned weights (e.g., first weight and second weight), wherein the at least one of the one or more first segments and/or at least one of the one or more second segments may be included in the compilation of segments based on the assigned weights. In an example, the computing device may receive, via a user interface, a selection of one or more segments of the compilation of segments. The computing device may be configured to remove the one or more segments from the compilation of segments or output the one or more segments of the compilation of segments. In an example, the computing device may receive, via a user interface, a selection of one or more third segments of the media asset. The computing device may be configured to add the one or more third segments to the compilation of segments. As an example, the user inputs may be received from one or more client devices via a third party application.

In an example, the computing device may generate directed content. For example, the computing device may generate directed content, via the machine learning, based on data indicative of a plurality of attributes associated with one or more users of the one or more user devices and the compilation of segments and the data associated with the media asset. The plurality of attributes associated with the one or more users may comprise one or more of an age, a gender, a location, a profile title, an interest, past content consumption, a professional affiliation, a professional experience, an educational background or experience, a professional certification or license, or a BIC keyword. As an example, the computing device may generate the directed content based on data indicative of a plurality of similar user profiles. The computing device may determine the plurality of similar user profiles based on a plurality of attributes associated with one or more users. The computing device may generate the directed content, via the machine learning model, based on the plurality of similar profiles, the compilation of segments, and the data associated with the media asset. In an example, the computing device may determine the plurality of similar user profiles based on a first interest cloud associated with a first user profile, wherein the plurality of similar user profiles are associated with corresponding interest clouds that are similar to the first interest cloud. As an example, the computing device may determine the first interest cloud associated with the first user profile based on data indicative of a plurality of attributes associated with the one or more users of the one or more user devices. As an example, the computing device may determine the interest cloud associated with the first user profile based on a plurality of attributes associated with one or more second users of one or more second user devices. For example, the computing device may determine the plurality of similar user profiles based on users similar to the users that engaged with the media asset or users other than the users that engaged with the media asset.

In an example, the computing device may receive data indicative of one or more user interactions associated with each user of the one or more users based on the directed content. The data indicative of the one or more user interactions may be provided to the machine learning model. The computing device, via the machine learning model, may update the directed content based on the one or more user interactions. For example, the computing device may add or remove content to the directed content.

At step 2160, the computing device may cause the compilation of segments of the media asset to be output. As an example, the computing device may output the compilation of segments to one or more second computing devices (e.g., client devices), wherein the one or more second computing devices may edit (e.g., removing, adding, etc.) the compilation of segments for further output to one or more user devices. As an example, the computing device may be configured to cause an output of the compilation of segments, send the compilation of segments to the one or more second computing device, and/or cause an output of the compilation of segments via the second computing devices.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   receiving, by a computing device, via one or more user devices, engagement data associated with a media asset and the one or more user devices, wherein the engagement data is indicative of a plurality of user interactions, via the one or more user devices, with the media asset;
   determining, via a machine learning model and based on the media asset, one or more first segments of the media asset associated with one or more content features satisfying a first threshold, wherein the media asset comprises the one or more content features;
   determining, based on the engagement data, one of more second segments of the media asset associated with one or more user interactions, of the plurality of user interactions, satisfying a second threshold;
   generating, based on the one or more first segments satisfying the first threshold and the one of more second segments satisfying the second threshold, a compilation of segments of the media asset; and
   causing the compilation of segments of the media asset to be output.

2. The method of claim 1, further comprising:
   receiving, via a user interface, a selection of one or more segments of the compilation of segments; and
   causing one or more of removing the one or more segments from the compilation of segments or outputting the one or more segments of the compilation of segments.

3. The method of claim 1, further comprising:
   receiving, via a user interface, a selection of one or more third segments of the media asset; and
   causing the one or more third segments to be added to the compilation of segments.

4. The method of claim 1, wherein the plurality of user interactions are associated with a client application, and wherein the media asset is output via the client application at the one or more user devices.

5. The method of claim 1, wherein the media asset comprises one or more of a virtual event, webinar, a video, a document, or a webpage, and wherein the one or more content features comprise one or more of content topics, content concepts, content subject matter, or content themes.

6. The method of claim 1, wherein the machine learning model comprises one or more of a text-based learning model, a large language model, a natural language processing application, or a generative pre-trained transformer.

7. The method of claim 1, further comprising determining data associated with the media asset, wherein the data associated with the media asset comprises one or more of a content type, a content rating, content metadata, a date of creation, a content tag, a content category, a transcript, a content filter, a language, text data associated with the media asset, or the engagement data.

8. The method of claim 1, wherein determining the one or more first segments of the media asset comprises determining, via the machine learning model, based on data associated with the media asset, the one or more first segments of the media asset associated with the one or more content features satisfying the first threshold.

9. The method of claim 1, further comprising: generating, by the machine learning model, directed content based on; data indicative of a plurality of attributes associated with one or more users of the one or more user devices, the compilation of segments, and the data associated with the media asset.

10. The method of claim 9, wherein the plurality of attributes associated with the one or more users comprises one or more of an age, a gender, a location, a profile title, an interest, past content consumption, a professional affiliation, a professional experience, an educational background or experience, a professional certification or license, or a keyword.

11. The method of claim 9, wherein generating the directed content comprises:
    determining, based on the data indicative of the plurality of attributes associated with the one or more users, data indicative of a plurality of similar user profiles; and
    generating, via the machine learning model, based on the data indicative of the plurality of similar user profiles and the compilation of segments and data associated with the media asset, the directed content.

12. The method of claim 11, wherein determining the data indicative of the plurality of similar user profiles comprises:
    determining, based on the data indicative of the plurality of attributes associated with the one or more users, a first interest cloud associated with a first user profile; and
    determining, based on the first interest cloud associated with the first user profile, the plurality of similar user profiles associated with corresponding interest clouds that are similar to the first interest cloud.

13. The method of claim 11, wherein determining the data indicative of the plurality of similar user profiles comprises:
    determining, based the data indicative of the plurality of attributes associated with one or more second users of one or more second user devices, a first interest cloud associated with a first user profile; and
    determining, based on the first interest cloud associated with the first user profile, the plurality of similar user profiles associated with corresponding interest clouds that are similar to the first interest cloud.

14. The method of claim 9, further comprising:
    receiving, based on the directed content, data indicative of one or more user further user interactions associated with each user of the one or more users; and
    updating, via the machine learning model, based on the data indicative of one or more further user interactions associated with each user, the directed content.

15. The method of claim 1, wherein generating the compilation of segments of the media asset comprises:
    determining a first weight associated with the one or more first segments that satisfy the first threshold;
    determining a second weight associated with the one of more second segments that satisfy the second threshold; and
    generating, based on the first weight and the second weight, the compilation of segments of the media asset.

16. The method of claim 1, wherein causing output of the compilation of segments comprises one or more of: sending the compilation of segments to a second computing device, storing the compilation of segments at the second computing device, or causing an output of the compilation of segments via the second computing device.

17. The method of claim 1, further comprising:
receiving data indicative of a plurality of attributes associated with one or more users of the one or more user devices;
determining, via the machine learning model, based on data associated with the media asset and the data indicative of the plurality of attributes associated with the one or more users, one or more third segments of the media asset associated with one or more content features satisfying a third threshold;
generating, based on the one or more third segments satisfying the third threshold and the one of more second segments satisfying the second threshold, a second compilation of segments of the media asset; and
causing the second compilation of segments of the media asset to be output.

18. An apparatus comprising:
one or more processors; and
a memory storing processor-executable instructions that, when executed by the one or more processors, cause the apparatus to:
receive, via one or more user devices, engagement data associated with a media asset and the one or more user devices, wherein the engagement data is indicative of a plurality of user interactions, via the one or more user devices, with the media asset;
determine, via a machine learning model and based on the media asset, one or more first segments of the media asset associated with one or more content features satisfying a first threshold, wherein the media asset comprises the one or more content features;
determine, based on the engagement data, one of more second segments of the media asset associated with one or more user interactions, of the plurality of user interactions, satisfying a second threshold;
generate, based on the one or more first segments satisfying the first threshold and the one of more second segments satisfying the second threshold, a compilation of segments of the media asset; and
cause the compilation of segments of the media asset to be output.

19. The apparatus of claim 18, wherein the processor-executable instructions that cause the apparatus to determine the one or more first segments of the media asset further cause the apparatus to determine, via the machine learning model, based on data associated with the media asset, the one or more first segments of the media asset associated with the one or more content features satisfying the first threshold.

20. The apparatus of claim 18, wherein the processor-executable instructions that cause the apparatus to generate the compilation of segments of the media asset further cause the apparatus to:
determine a first weight associated with the one or more first segments that satisfy the first threshold;
determine a second weight associated with the one of more second segments that satisfy the second threshold; and
generate, based on the first weight and the second weight, the compilation of segments of the media asset.

* * * * *